Fig. 14.

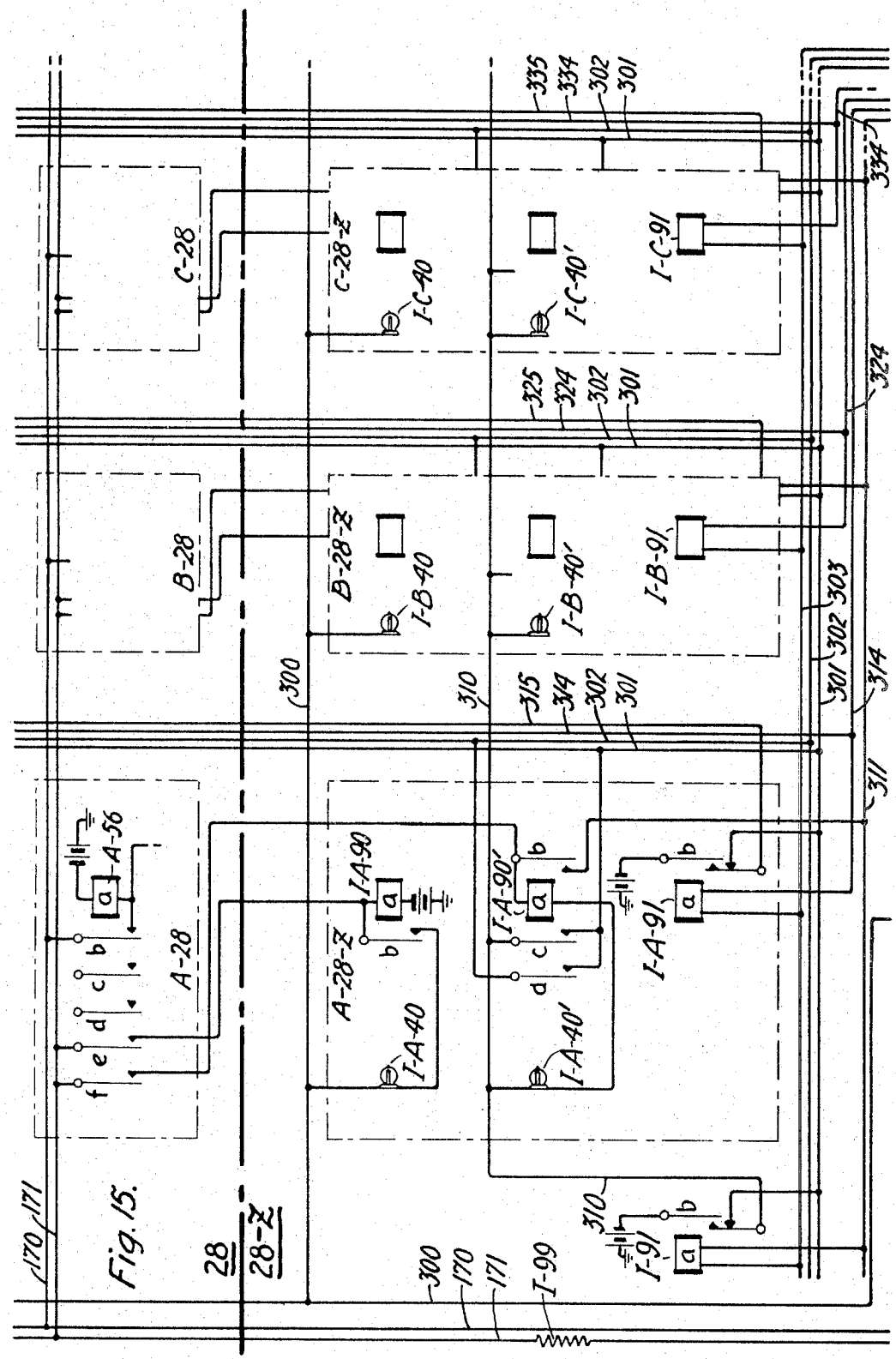

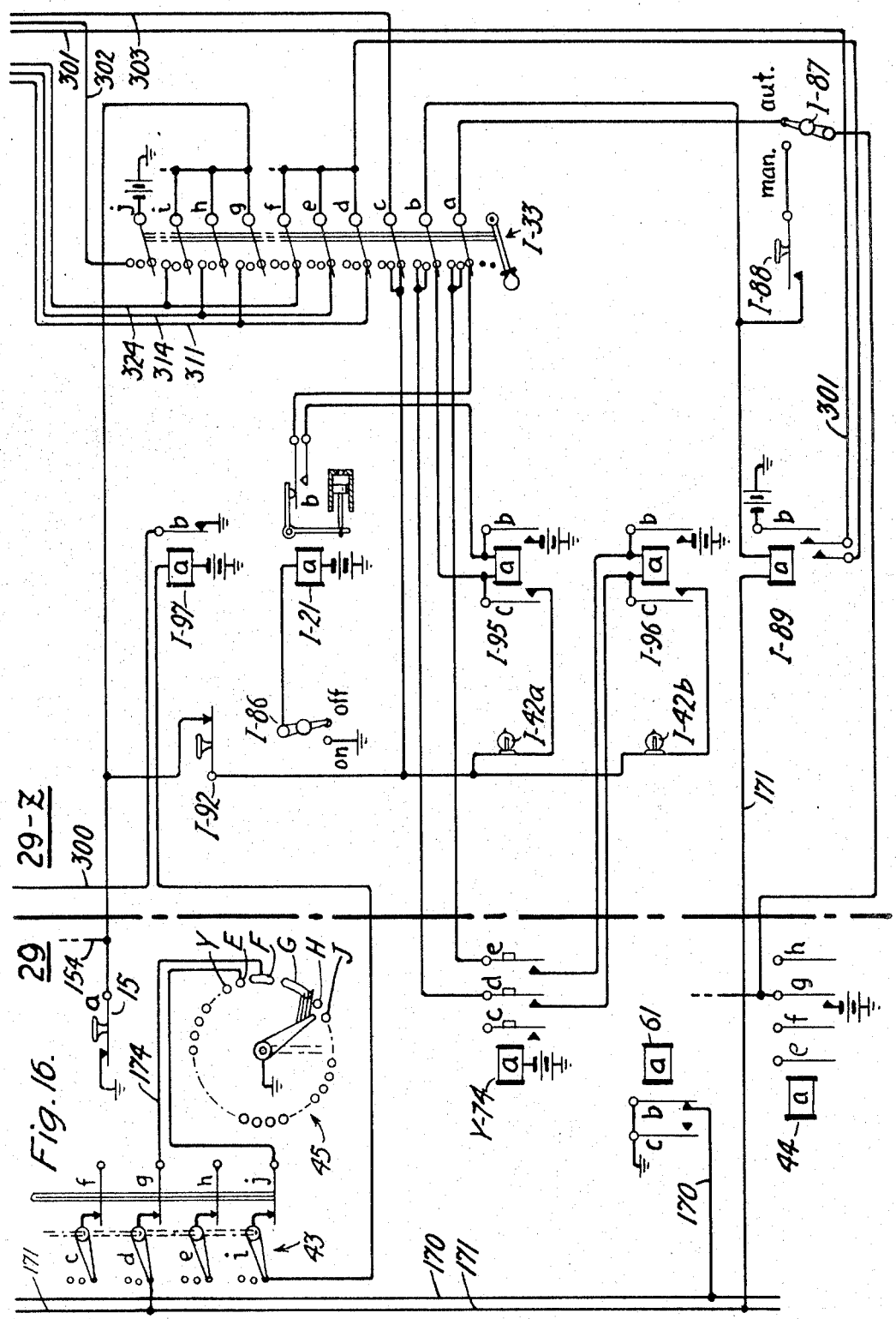

United States Patent Office 3,453,753
Patented July 8, 1969

3,453,753
CONTINUOUS COMPARATOR OF HUMAN RESPONSES FOR TESTS, PRESET COMPARATIVE DATA, AND THE LIKE
Henry M. Farnum, 70 W. 46th St.,
New York, N.Y. 10036
Substituted for abandoned application Ser. No. 416,743, Mar. 17, 1954. This application May 31, 1966, Ser. No. 563,939
Int. Cl. G09b 7/00, 3/00
U.S. Cl. 35—48    6 Claims

ABSTRACT OF THE DISCLOSURE

A system for comparing an answer input to the system by a respondent with a programmed answer already present in the system, with regard to a variety of criteria. A memory device retains a predetermined answer or set of answers, to a problem, represented by a plurality of digits. The respondent, by means of an input device, submits his answer to the system. Comparator and other circuitry compares the respondent's answer with the present correct answer and, by means of other circuitry, displays: (1) the absolute value of the deviation of respondent's answer from the correct answer; (2) the number of digits of the correct answer which appear in the respondent's answer; (3) the number of pairs of digits of the respondent's answer and the preset correct anwser, which appear in the same order as they do in the preset correct answer.

---

This application is a substitute for abandoned application Ser. No. 416,743, filed Mar. 17, 1954.

This invention relates o devices for comparisons between the preset correct answer to a problem, and the attempted selection of such a correct answer by signalling means for human responses.

Means are well known in the art permanently to record a response by inactivating the signalling means of all competitors or "subjects" by a signal from any subject, as disclosed in Patent No. 1,153,737, issued to Van der Hoorn et al. on Sept. 14, 1915; or for such inactivation by the response of any subject corresponding to a preset correct answer comprising a single item, as disclosed in Patent No. 2,562,179, issued to Dorf on July 31, 1951. Also, means are well known in the art permanently to record a correct response by erasing the indications of the responses of all losing subjects, when the irrevocable selections comprising the response of a winning subject exactly correspond to all of the plurality of items of a preset correct answer, such items selectable in any order irrespective of sequence, as disclosed in Patent No. 2,654,163, issued to Reynolds on Oct. 6, 1953.

The present invention has for a principal object the provision of a multi-purpose system for continuous analysis of the accuracy of data in at least one human response which comprises the attempted selection of the plurality of correct items comprising the correct answer to a selected problem—particularly a correct answer comprising such correct items in a desired sequence, or a multiple choice of any combination of such items, or selection of items to approximate a desired numerical-total. The system further contemplates continuous analysis among a plurality of such responses, as from a plurality of local or remote stations, or combined groups of stations, the output of such analysis repetitively to determine and to indicate at least one leading and nearest correct response, its degree of accuracy, and its respective margin of leadership over its closest competitors, for whom similar indications are provided. It is the further object of many of such preset correct answers comprising sequential or numerical-total items, to test the ability of the subject to "recall" data such as words, as contrasted with his "recognition" of data comprising multiple choice items; selectively with provision that each subject may erase his response.

For the purpose of accomplishing the desired objects this invention involves a number of novel features.

This invention features its sequential, multiple choice, and numerical-total types of response functions, and its selectivity among them. It features means to determine the three alternative conditions of each item in each response, "correct," "incorrect," or "unanswered." Features of the invention economize upon the necessary means: thus to require only one "bit" (binary digit) of preset information common to all channels and groups in the system, for each preset correct item; to require only one bit of information and associated means for each response item whether correct, incorrect, or unanswered; to use many of the same means for each of a plurality of channels, groups, and combinations, for each of a plurality of response functions, in each of a plurality of cycles, multiple-cycles, and programs; and in a continuous plurality of comparisons, to economize in duplication of input control, signalling, and analyzer means, by recording each desired analyzer output by permanent recording means without its interference with any other means.

The system additionally features its continuous comparator indications with reference to individual station responses in each of a plurality of groups of stations, and also with reference to group combinations of station responses. Without interference with such continuous indications, the system additionally features means to record indications of such outputs at any time or interval, and similarly to record the time and chronological order of responses achieving preset standards of accuracy.

The system additionally features means to provide a predetermined relationship between inputs comprising station responses, and the corresponding outputs of the analyzers; despite, for example, signal variations caused by each such station "remotely" situated, such variations including the number of pulses.

Other features of the invention will be described and claimed hereinafter.

The objects and features of the system described in this specification may be clarified in terms of its uses in many expanding industries and services.

Human responses may comprise the answer or reaction of an individiual. designated as a contestant or "subject," in response to a question or situation, designated as a "problem." "The examiner" conducting the test or the analysis of comparative data, may desire selectively to segregate each subject into separate or overlapping groups of subjects. The examiner's testing methods, and grouping of subjects, may be based upon the personal characteristics of each subject; the kind of problem confronting each subject; and any statistical, scientific, psychological, economic, entertainment, or other factors of which control is desired.

Industry and education, for office, shop, classroom, and military purpoes, need to analyze effectiveness of techniques for production, management, teaching, training, and personnel; to test intelligence and aptitudes for guidance in choice of education and career; and to examine human responses for purposes of competition, recognition of merit, progressive education, etc.

Military and scientific activities also need means to achieve similar results, for example, for each officially listed function of each branch of the Psychological Sciences Division, Office of Naval Research. Functions of the Physiological-Psychology Branch include "human engineering, physiological correlates of behavior, audition, vision, other special senses, and perception and spatial orientation"; the Human Relations Branch, "leadership, group behavior, and social psychology"; and the Personnel and Training Branch, "selection, classification and training of personnel; learning theory; differential psychology; and criteria of performance."

Research divisions of entertainment and advertising media need to analyze media effectiveness in commercial or sponsor impact, promotion of product acceptability, and sales motivation; technical and production proficiency; entertainment value; audience measurement and rating; and other criteria of the media.

Market and industrial research, public opinion polling, and related activities emphasize individual and group opinions, degree of conviction, correlation with previous opinons and actions, statistical organization of data, probabilities, etc.

Human responses may comprise or motivate the entertainment in a television or radio studio, theatre, or other entertainment medium; whereby subjects or groups on stage, in the audience, or at remote locations, respond to problems and situations in competitive contests, testing of panels of experts, audience participation stunts, public affairs and opinion analysis, topical comedy, variety, "jackpot giveaway," talent judging, qualitative reaction, and similar formats. Each subject remotely situated may need to receive the problem, for example, via his usual television or radio receiver situated near his telephone dial; and to respond, for example, by dialing during a long distance telephone line connection to the central network studio, from which the contest results instantaneously are transmitted to the subject's receiver.

Obviously, many other industries and services need similar means. Unqualified use of terms as defined in this specification is intended to be qualified, to the extent that their meaning may be varied without departure from the spirit or intention of the invention.

A "local" subject is one whose response means or "station," such as a telephone-type dial, is connected directly to an "analyzer," as by direct electrical connection. The station response device of a "remote" subject similarly is associated indirectly, as by a telephone line connected to the earpiece of a telephone headset near the analyzers, with the earpiece inductively associated with a coil in the analyzer of the subject's "channel," connected to "master" analyzer means.

A "channel" and its component station comprise the necessary means to transmit and record the response of a subject. Analyzers, including channel or master means, may be situated centrally, and comprise the means to compare station responses with the preset "correct answer," and with the responses of other stations. Means used in common by a plurality of channels may be "common to" a plurality of other means or functions. Substantial components of such "common" means will function cooperatively; for example, the timing track and associated circuits of a magnetic drum are common to all tracks and segments of the drum.

A "correct answer" comprises the "data" in the complete, preset solution to a problem posed by the examiner to the subject, for his selection by signals via the station response means. Such a preset solution may comprise controversial, hypothetical, valid, or purposely invalid data, or data determined by uncontrolled conditions. When a station response is designated as "correct" or "incorrect," the designation refers to the degree with which the response conforms to the preset solution.

A correct answer may comprise a plurality of "correct items." Each correct item may comprise a letter in a word; one of a plurality of figures in a number; a symbol for any word, description, or answer; a "qualitative" response such as a degree of opinion according to a scoring scale; or any other logical representation.

If such a correct item is represented in the station response by a single signal, such as an electrical pulse or measurable unit, then such an item may be described as a "unit." If such representation selectively may be a plurality of such units, the item may be a "digit." Thus station "response items"—"units" or "digits"—may be correct or incorrect, when compared with the corresponding preset item by "item analyzer" means.

The number of correct, incorrect, and unanswered items in the responses of the stations in each respective channel may be "scored" by the "net scorer" in the "master analyzer" comprising the "group analyzers" and the "system analyzer." The group analyzers comprise selecting and connecting means, both for "inter-group" comparisons among "combinations" of groups, and also for "intra-group" comparisons among the individual channels comprising each respective group. The "system analyzer" comprises means for all inter-group and intra-group comparisons in all combinations of groups. Thus an "item comparison" refers to a comparison between a preset item and a response item, and results of such item comparisons may be scored competitively in "master comparisons" to determine the "relative accuracy" of the competitive responses of certain channels or groups.

The results of such comparisons may actuate recording means which represent a "stable state" or a "bit" of information. A "stable state" comprises means to record a single discrete condition, such as one of the two conditions of a "bit" (binary digit), or one of the plurality of positions of a stepping switch.

An "integer" comprises measurable means to represent a single channel; for example, the number of integers in each group in an inter-group comparison will represent the number of channels in the respective group.

Each "cycle" of the system analyzer may comprise a revolution of a means such as a commutator or magnetic drum, sampling certain intra-group and inter-group net scores. Multiple cycles, such as a "double-cycle" or "quadruple-cycle," may determine whether each sampled net score is higher than, equal to, or less than any other sampled net score. A "combination" means may connect preset combinations of groups for a series of multiple cycles of comparisons. A "series of multiple cycles" may comprise the necessary cycles for successive comparisons among each combination of groups. A "program" may comprise the plurality of series of multiple cycles needed to determine the leaders of all comparisons within all connected combinations. A "continuous" program may comprise a series of programs.

The types of comparisons may be designated as "leading," "time," "accuracy," and "speed." A program of "leading" comparisons may comprise intra-group and inter-group comparisons to determine the leaders with the "nearest correct" net scores, and the margin of leadership over each nearest competitor. A "time" comparison may comprise the operation of means to indicate permanently the subjects leading when a preset time period expires. An "accuracy" comparison may comprise the operation of means to indicate permanently each subject whose response equals or exceeds a preset "standard of accuracy"; a competitive "speed" comparison similarly may indicate the chronological order of such responses. Thus a "time" comparison refers to relative accuracy at a controlled time, and does not refer to the uncontrollable point of time when a response may attain a certain standard of accuracy. A "standard of accuracy" may comprise any preset degree of accuracy up to 100%.

This plan is adopted to designate the means in this specification.

Each through connector is designated by its respective three-digit basic number (100, 200, etc.).

Corresponding means each are designated by the same two-digit basic number, which may have prefixes and suffixes.

The prefixes are these.

If a means functions in association with less than all segments of the system:

a Roman numeral designates the respective combination;

a capital letter designates the respective group; and a single digit number designates the respective channel.

Thus prefixes, in designating the respective segment of the system as shown, also designate the addresses at which the means function in the program.

The suffixes are these.

If a means is common to less than all three "response functions," it is designated according to the response function in which it may be connected:

—SEQ designates sequential;
—MC designates multiple choice; and
—NT designates numerical-total.

Lower case letters (*a, b,* etc.) designate sub-components.

Upper case letters designating certain figures are hereinafter described in association with the respective figures.

The correctness of each item in a "sequential" response may be determined by whether each respective item in the response, in sequence, is the same as the corresponding items in the preset sequence. For example, in a preset word, each letter comprises one sequential item. Similarly, an (SEQ) response may comprise the digits in a number, or a series of events in chronological order.

The correctness of each item in a "multiple choice" response is determined by whether each respective item in the response, irrespective of sequence, is the same as any preset item. For example, if each of ten digits represents alternative choices, and seven of the ten digits each are preset as correct, the first corresponding item selected in a response will comprise one correct item. It is important to note that "multiple choice' 'in this specification means the obverse of "sequential"—i.e., "*unlimited* number of items selected from a plurality of alternatives irrespective of sequence." In this specification "multiple choice" does not mean "a selection limited to a *single* choice among a plurality of alternatives."

In a "numerical-total" response, the correctness of each item comprising one "unit" may be determined by whether the items in the response cumulatively *approximate* or equal the preset "numerical-total" of units. For example, if the preset numerical-total is fifty-six units, each corresponding item in the response up to and including fifty-six will comprise one correct item, and each deficient or excessive item in the response will comprise one incorrect item, so that responses "thirty-nine" and "seventy-three" will comprise equivalent approximations.

In a cyclical program of intra-group and inter-group comparisons between preset items and corresponding response items, one or more portions of each program corresponding to each channel, group, preset standard of accuracy, cycle, or combination of groups, each is designated as its respective "address." Each channel address may comprise a plurality of "sub-addresses."

In such a cyclical program, any data recorded and erased in each digit of a human response, in each program, or in each program segment, may be designated as "temporarily" recorded, in contrast to "permanently" recorded data erased by means external to such responses or to such programs. Such recorded data may comprise representations of information such as output indications and net scores.

Such recorded data may "preset" the control of subsequent events. For example at the time that a channel is recorded as attaining a certain standard of accuracy, such recording may "preset" such channel in a new group comprising all similar channels, for subsequent programs of comparisons.

Means for such data recording may respond to "resetting" means, for example to operate the "reset coil" of a stepping switch thereby released to its normal position at rest.

The features of the invention upon which patent protection is sought are set forth in the appended claims. The invention itself together with further objects and the many advantages thereof will best be understood by reference to the following specification of illustrative embodiments thereof which will be better visualized with the aid of the accompanying drawings in which:

FIGS. 1 and 2 represent a "Schematic Diagram of Channels 1 and 2 of an Intra-Group Response Device Embodiment, In Group A and Combination I, Arranged by Participant Functions," for the purpose of permitting ready visualization of the functions of the principal elements and their inter-relations;

FIGS. 3 and 4 similarly represent a "Schematic Diagram—Plurality of Channels, Groups, and Combinations";

FIGS. 5 to 13 inclusive represent one illustrative detail layout of various circuits and elements comprising a "continuous comparator" which will implement the objects of the invention and the functional desiderata indicated by FIGS. 1, 2, 3, and 4 together with further circuits and elements in the nature of auxiliaries refining the performance of the system;

FIGS. 14, 15, and 16 similarly represent one illustrative detail layout of various circuits and elements comprising temporary and permanent recording means for leading indications and other output data of such a continuous comparator, with analyzers designated by the suffix Z comprising such additional recording means;

FIG. 17 represents a diagram of the inter-relationship of each of FIGS. 5 to 13;

FIG. 18 represents a diagram of the inter-relationship of each of FIGS. 14, 15, and 16;

Figure 19:
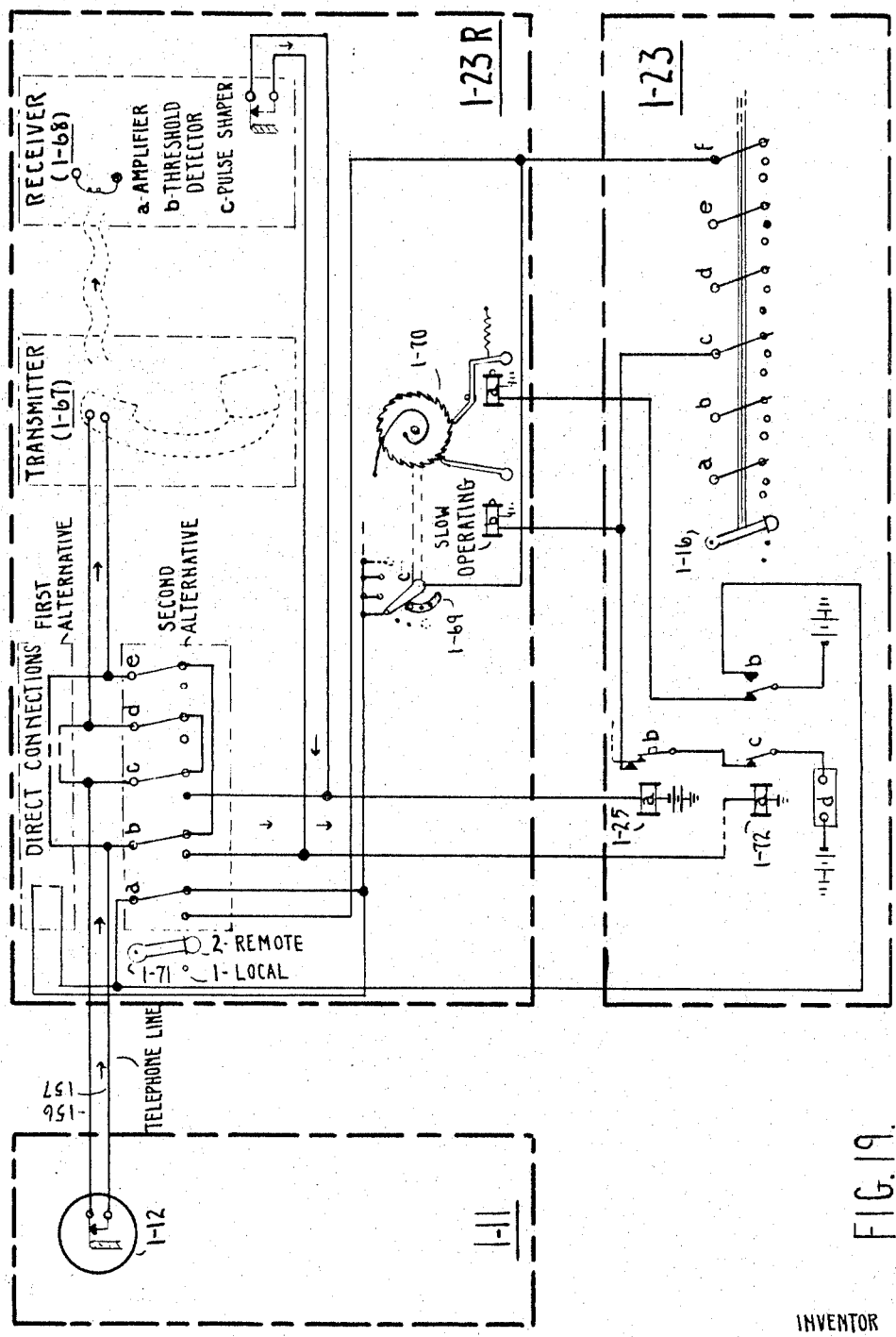
Figure 20:
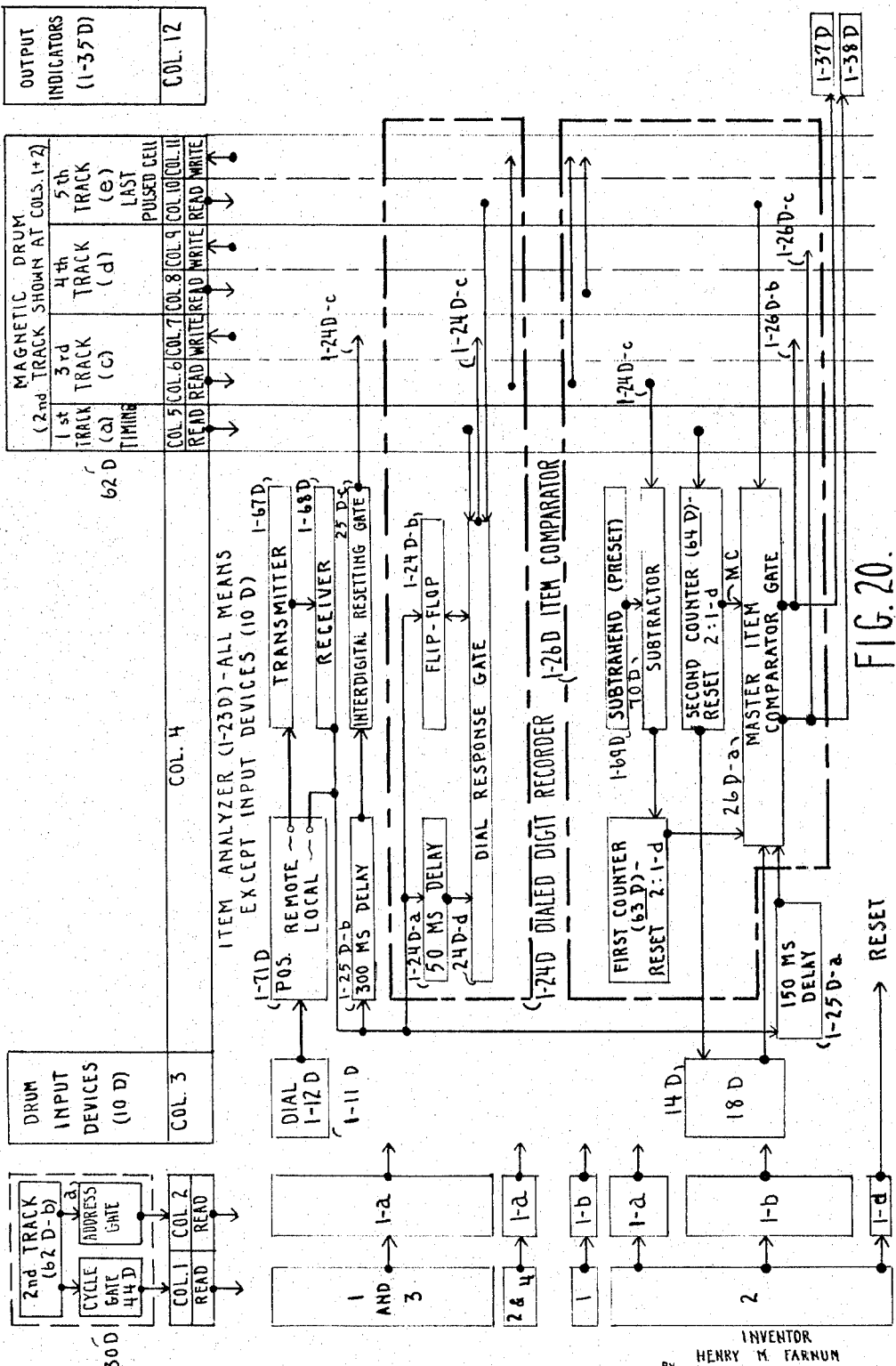
Figure 21:
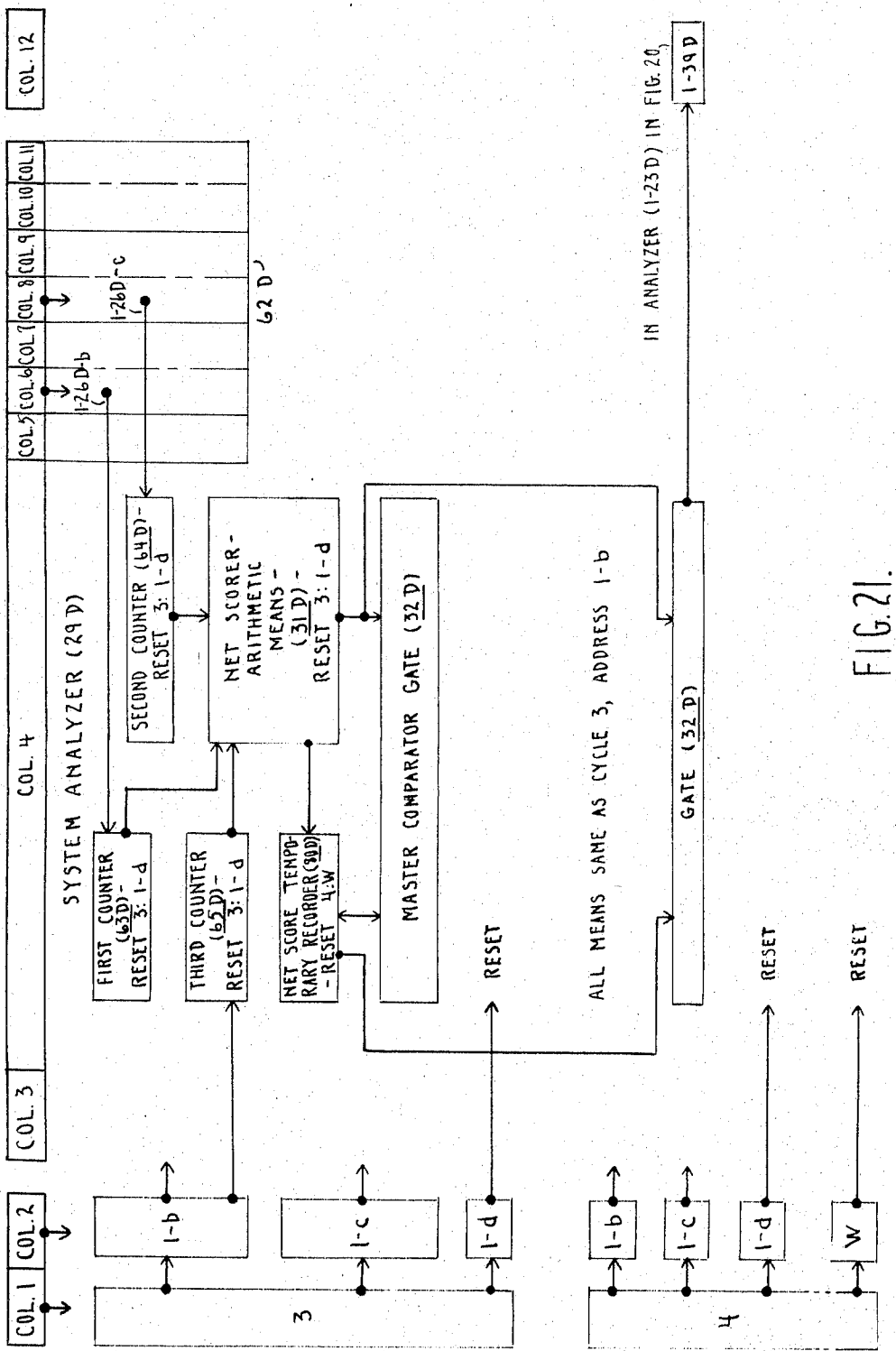

FIG. 19 represents one illustrative detail layout of a "remote" response station associated with such a continuous comparator, with analyzers designated by the suffix R comprising additional means associated with such remote station; and FIGS. 20 and 21 represent a schematic layout of magnetic drum means corresponding to means shown in such a continuous comparator, with each such magnetic drum means designated by the suffix D.

THE SYSTEM IN GENERAL

Figure 1:
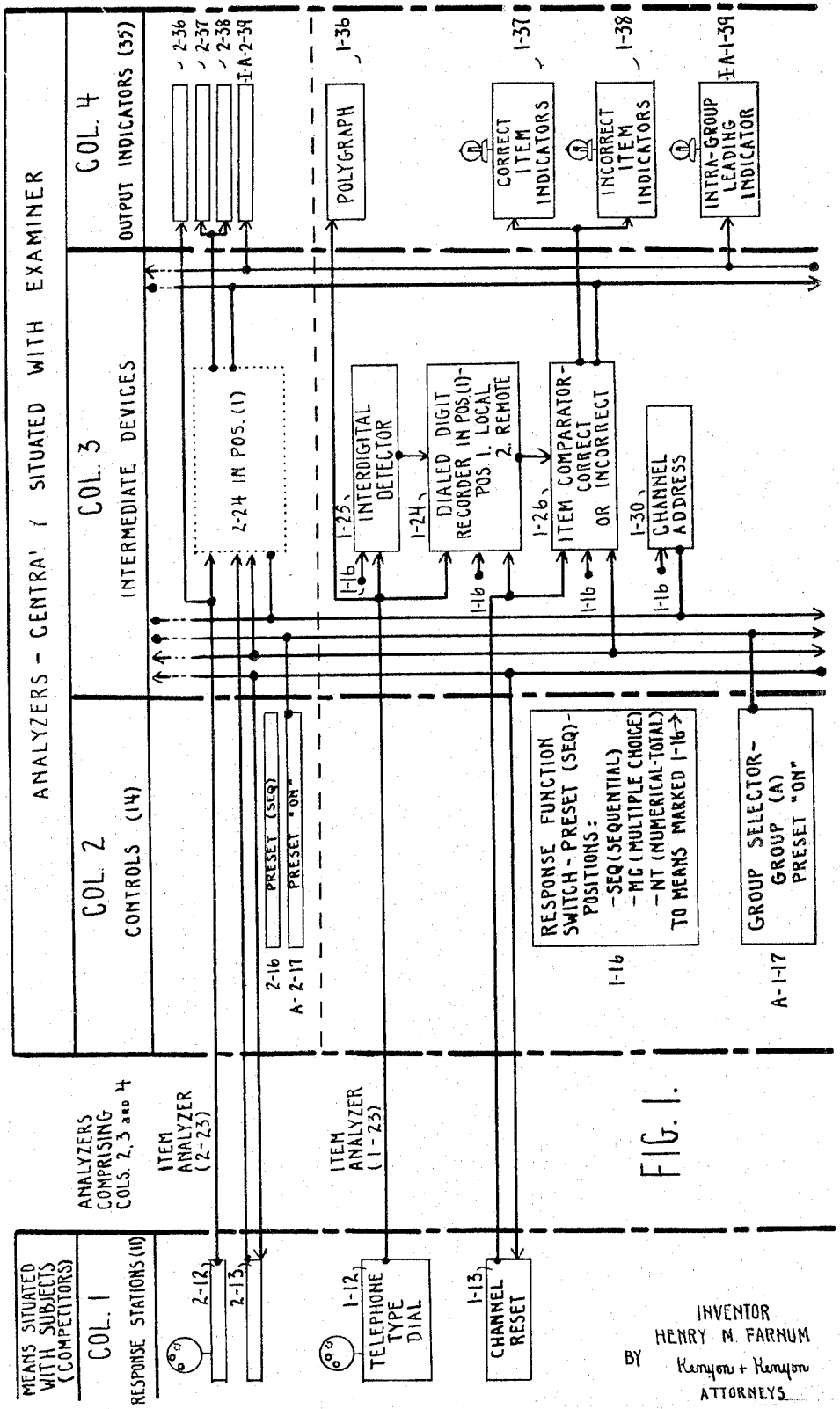
Figure 2:
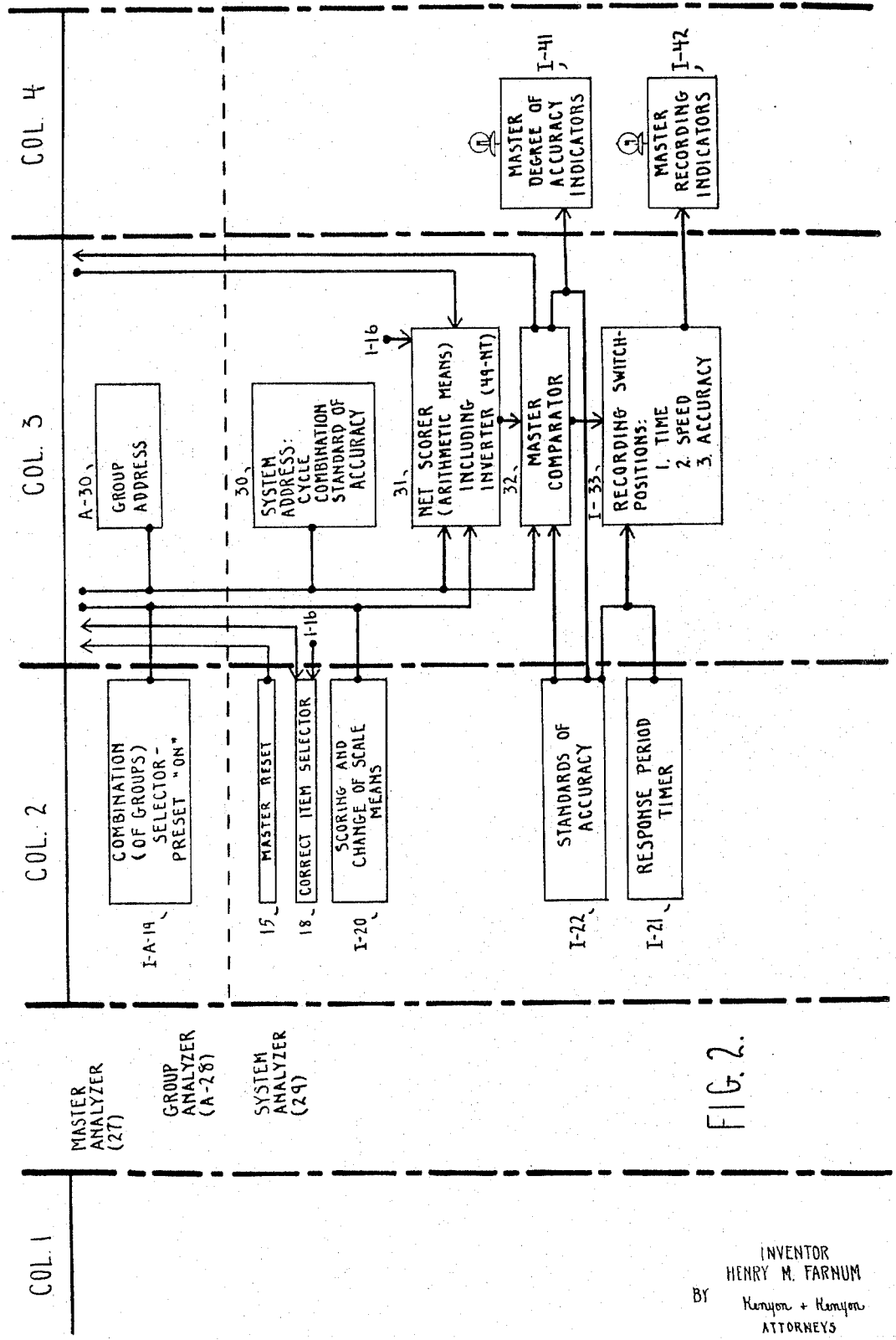

FIGS. 1 and 2 comprise a "Schematic Diagram of Channels 1 and 2 of an Intra-Group Response Device Embodiment, In Group A and Combination I, Arranged by Participant Functions." With FIG. 1 placed above FIG. 2, the respective means of each figure and the interconnections between the two figures will be shown in correct relationship. This system is suitable for connection into the system hereinafter shown in FIGS. 3 and 4.

Such "Combination I" in FIGS. 1 and 2 comprises the necessary means to function in cycles of intra-group comparisons, and to indicate its outputs. The system is divided vertically into "response station" 11 in Col. 1, and "analyzers—centrally situated with examiner" in Cols. 2, 3, and 4. Each analyzer means common to a plurality of response functions may be distinguished by its suffixes. Each means in item analyzer 1–23, group analyzer A–28, and system analyzer 29, common to a plurality of channels, and each master analyzer means 27 common to a plurality of groups, may be distinguished by its prefixes. Col. 2 comprises "controls" 14, Col. 3 comprises "intermediate devices," and Col. 4 comprises "output indicators" 35.

"Input devices" 10 comprise "response stations" 11 situated with the subject in each of channels 1 and 2, in Col. 1; and "controls" 14 which may be situated with the examiner, in Col. 2. All other means may be situated with the examiner.

FIG. 1 shows response stations 11, and item analyzers 23.

FIG. 2 shows master analyzer 27.

Response station 1–11 comprises telephone-type dial 1–12 and channel reset 1–13. Means 1–12 obviously may comprise a device with more selections than the usual ten digits of a telephone dial. Response station 2–11 comprises dial 2–12 and reset 2–13 similar to corresponding means in station 1–11. Controls 14 comprise these analyzer means which may be preset by the examiner.

Components of item analyzer 1–23 comprise these controls. "Response function switch" 1–16 selects one of the three general types of correct answers: sequential, multiple choice, or numerical-total. Switch 1–16 is associated with each of these means: in Col. 2, correct item selector 18; in Col. 3, each means of item analyzers 1–23 and 2–23, and "net scorer" 31 in "system analyzer" 29. Group selector A–1–17 preset "on," thereby selects channel 1 to be in Group A. Item analyzer 2–23 comprises switch 2–16, and selector A–2–17 preset "on," each means similar to corresponding means in item analyzer 1–23. Group analyzer A–28 is controlled by combination selector I–A–19 preset "on," selecting group A to be in combination I.

Components of system analyzer 29 comprise these controls. "Correct item selector" 18 comprises switches each selecting one of the correct items in a correct answer, and each comprising recording means for a single bit of information common to a plurality of channels. By presetting each of ten such switches, item analyzers 23 in Col. 3 will be prepared to detect whether each of ten items in each channel response is correct, incorrect, or unanswered. "Scoring and change of scale switches" I–20 may select scoring weights and logic for each condition including response functions, groups, combinations, and each correct, incorrect, and unanswered item. Preset "response period timer" I–21 is associated with "time" position 1 of recording switch I–33 in Col. 3, which determines the relative accuracy among any plurality of channels at any time. Preset "standard of accuracy" I–22 in Col. 2 is associated with "speed" position 2 of recording switch I–33, which determines the chronological order of channels signalling the correct selection with predetermined accuracy; or with position 3 or switch I–33 designated "accuracy," which determines each channel signalling the correct selection with predetermined accuracy. The position of switch I–33 may be selected at any time. Master reset 15 is associated with all means associated with channel resets 1–13 and 2–13.

Intermediate devices in Col. 3 and output indicators 35 in Col. 4 comprise these means.

Item analyzer 1–23 comprises these additional means.

In Col. 3, "dialed digit recorder" 1–24, preset either in its "local" or "remote" position, records the response digits from dial 1–12. Each interdigital pause in the input from dial 1–12 is represented by the output of "interdigital detector" 1–25 to recorder 1–24. Recorder 1–24 is adjustable for predetermined signal variations between a local station, and a remote station. The comparison between each item in the response and the corresponding preset item is detected and recorded by item comparator 1–26 by comparing its inputs from dialed digit recorder 1–24 and correct item selector 18. For each item, each correct item indicator 1–37 and incorrect item indicator 1–38 in Col. 4 may respond to recording means for a single bit of information in item comparator 1–26, to indicate whether the respective response item is correct, incorrect, or unanswered. "Channel address" means 1–30 represents the segments of its associated means in master analyzer 27 which correspond to channel 1.

Master reset 15, or its associated channel reset 1–13, selectively may erase the responses recorded in these means of item analyzer 1–23: recorder 1–24, and item comparator 1–26.

In Col. 4, "polygraph" 1–36 is shown responding to dial 1–12; if desired, connections may be added to each recording means in Cols. 3 and 4. Each recording means in polygraph 1–36 may comprise a usual device for recording automatically a continuous line by pen and ink on moving paper fed from a roll, whereby a pulse from each associated means causes a distinctive deviation in a normally straight line. Also shown in Col. 4 is intra-group leading indicator I–A–1–39.

Item analyzer 2–23 in Col. 3 comprises means not shown similar to corresponding means in item analyzer 1–23, and in Col. 4 comprises polygraph 2–36, correct item indicators 2–37, incorrect item indicators 2–38, and intra-group leading indicator I–A–2–39, each means associated with master means similarly to corresponding means in item analyzer 1–23.

Group analyzer A–28 comprises in Col. 3 "group address" means A–30 representing the segments of its associated means in system analyzer 29 which correspond to group A.

System analyzer 29 comprises these additional means.

In Col. 3, "system address" means 30 represents the segments of each program of comparison which correspond to each respective cycle of master comparator 32, to each combination of groups, and to each standard of accuracy I–22. The inputs of "net scorer" 31 are shown as comprising group selectors A–1–17 and A–2–17, combination selection I–A–19, scoring and change of scale switches I–20, item comparators 1–26 and 2–26, channel address means 1–30 and 2–30, group address means A–30, and system address means 30. The "arithmetic means" of net scorer 31 determines its output to master comparator 32. In a program of repetitive comparison between channels 1 and 2 in group A, in successive cycles of adresses represented by the address means 30 heretofore described, master comparator 32 analyzes whether each channel net score is higher than, equal to, or less than the net score of any other channel. For that purpose, a "master sampler" may scan the plurality of channels cyclically, to analyze the respective net scores by means for recording during one cycle the maximum score attained among certain channels, and for selecting during a following similar cycle those channels which attained the maximum score. These outputs respond to master comparator 32: intra-group leading indicators I–A–1–39 and I–A–2–39, master degree of accuracy indicators I–41 associated with standards of accuracy I–22, and recording switch I–33 associated with master recording indicators I–42.

Various means may be used for the recording, measuring, and comparator functions.

Recording means include electromagnetic "relays," "magnetic drums" and tapes with associated recording heads, "condensers," and transistors. Each of those three terms in quotation marks is hereinafter used to designate alternative systems predominately using the respective recording means.

The measuring function may be performed by series connection of units of resistance, by electronic counting decades, or by transistors, etc. Each resistance means described in this specification may be replaced by other impedance means, including inductance or capacitance, suitable for the particular device that responds to it.

The comparator functions may be performed by discriminators, including thyratron tubes in association with resistances; by arithmetic use of counting decades; by groups of ten condensers, with an electrical discharge by the condenser with the highest stored electrical charge; by servosystems; by transistors; etc.

All functions, such as comparisons, may be "simultaneous," as by parallel means for each channel or address; or serial or "cyclical," as by successive segments or tracks of a revolving magnetic drum with one segment or track per channel, or by successive contacts of a rotating sampler. Comparisons may be "programmed," as by successive connection of combinations of groups to common comparator means.

Means situated with the examiner may be located in a central position, for example in a laboratory or classroom, or on stage in a radio or telecasting studio. Such means are associated with the telephone dials of stations 1–11 and 2–11 each at spaced locations on stage, in the experimental group or audience, or remotely situated.

To prepare the device for use, the examiner may preset the controls as heretofore described, including the complete correct answer to the selected problem.

The question then will be posed to the subjects at their respective stations; for example orally, or by written test, or by a usual broadcast or telecast to a home receiver situated near the telephone dial of a remote subject. The subjects then will dial their responses, which will be recorded by dialed digit recorder 1–24 associated with interdigital detector 1–25 in Col. 3 and by corresponding means of item analyzer 2–23. Channel resets 1–13 and 2–13, and master reset 15, selectively may permit erasure of responses, for example to rectify a mistake.

In a program of intra-group comparisons, at each respective address 30 the response of each of channels 1 and 2 will be scored by arithmetic means in net scorer 31, and analyzed by master comparator 32. In Col. 4, each correct indicator 37 and incorrect indicator 38 of each of channels 1 and 2 will respond to item comparators 1–23 and 2–23 respectively. If an item is unanswered, neither of the corresponding indicators will be energized. According to the net score of each channel, these indicators may respond to master comparator 32: intro-group leading indicators I–A–1–39 and I–A–2–39, master degree of accuracy indicators 1–41, and master recording indicator 1–42. In a continuous program of comparisons, if the examiner desires to record permanently the status of each intra-group leading indicator I–A–39 at any time, each such indicator may be paired with a similar indicator designated ('), for such permanent recordation without interference with the continuous program of comparisons.

*Sequential response function*

If the examiner should desire to set the system for comparing channel sequential responses, he will preset the response function switch 16 of each channel in its position SEQ, its connected means functioning in this manner.

Each preset correct digit successively corresponds to one of ten selector switches in 18–SEQ, each such switch with ten active positions and selecting a correct item in association with item comparator 1–26-SEQ which comprises one 10-position permanent recorder for "item number" with each such position associated with one of ten permanent "comparator recorders." Item comparator 1–26 is associated with 10-position dialed digit recorder 1–24–SEQ for the "units" digit.

If the correct sequential response is "dial five, then dial six, then dial five again, in that sequence," the examiner will preset each of the first three switches in selector 18–SEQ at its respectively numbered pole corresponding to the respective correct digit. In the embodiment described, ten digits or less thus may be preset. If the digits represent the letters in words similarly to a usual telephone dial, the space between each word may be represented by the digit "one." As an alternative, an embodiment with twenty-seven positions may be used.

In selector 18–SEQ, the 10 successively numbered positions of each of the ten switches correspond to each other, and to the similarly numbered position of the "units" recodrer in 1–24–SEQ. Each of the ten switches correspond to the similarly-numbered component of these means: to the position of the "item number" permanent recorder in item comparator 1–26–SEQ, and to its associated correct item indicator in 1–37 and incorrect item indicator in 1–38. Each such indicator comprises one measurable unit.

Each dialed digit will be recorded temporarily by recorder 1–24–SEQ. When the time interval between each dialed digit is detected by interdigital detector 1–25, item comparator 1–26–SEQ then will record the respective digit permanently as one of ten successive "items," in this manner. If a digit temporarily recorded in 1–24–SEQ corresponds to the preset digit in the correspondingly numbered switch in item selector 18–SEQ, at the corresponding position of the "item number" recorder in item comparator 1–26–SEQ, that condition will be recorded therein by its corresponding comparator recorder, thereby energizing the corresponding correct item indicator 1–37, and adding one measurable unit to the channel's correct items. If the digit in 1–24–SEQ is not preset, the incorrect item similarly will be recorded permanently, energizing incorrect item indicator 1–38, and adding one measurable unit to the channel's incorrect items.

Interdigital detector 1–25 then may erase the digit temporarily recorded in dialed digit recorder 1–24–SEQ.

The means of item analyzer 2–23 function similarly to the corresponding means of analyzer 1–23.

The measurable units will be scored by the arithmetic means in net scorer 31–SEQ by the preset scoring logic of scoring and weighting switches I–20; for example, by adding one unit for each correct item, and subtracting one unit for each incorrect item.

Master comparator 32, in its first cycle connected by address means 30, successively will be connected to the units comprising the net score of each channel, and will record the highest net score.

In its second cycle, master comparator 32 successively will compare each intra-group net score with the previously recorded highest net score which, whenever equalled, will cause to be energized each connected leading indicator I–A–39.

In the second cycle also, each standard of accuracy I–22 will be compared, similarly to energize the corresponding degree of accuracy indicator I–41 whenever the respective preset standard is equalled by the recorded highest net score.

In a continuous program of such comparisons, such leading indications and associated analyzer output data may be recorded permanently by any of the four conditions (1) time, (2) speed, (3) accuracy, or (4) manual operation, without interfering with the continuous program.

*Multiple choice response function*

If the examiner should desire to set the system for comparing channel multiple choice responses, he will preset the response function switch 16 of each channel in its position MC, its connected means functioning similarly to the sequential response function, except as hereinafter described.

Each preset correct digit will correspond to one of ten successively numbered, 2-position selector switches, comprising correct item selector 18–MC, preset in association with item comparator 1–26–MC comprising the ten permanent comparator recorders heretofore described in comparator 1–26–SEQ. Each permanent recorder will be connected to the corresponding selector switch, associated with the corresponding position of the 10-position dialed digit temporary recorder 1–24–MC, which may comprise the similar recorder heretofore described in item comparator 1–26–SEQ.

If the correct multiple choice response is "dial one and three, in any sequence," the two corresponding switches in selector 18–MC will be preset "on," and the other eight switches preset "off."

A digit dialed for the first time, and temporarily recorded in recorder 1–24–MC, will operate the corresponding permanent recorder in 1–26–MC, thus energizing the corresponding indicator 1–37 or 1–38, depending upon whether the corresponding digit was preset "on." After each item comparison, the temporarily recorded digit in the channel response may be erased by interdigital detector 1–25.

The correct, incorrect, and unanswered items will be scored by net scorer 31–MC similarly to scorer 31–SEQ, and will be compared by master comparator 32 in the same manner as heretofore described for response function SEQ.

*Numerical-total response function*

If the examiner should desire to set the system for comparing channel numerical-total responses, he will preset the response function switch 16 of each channel in its position NT, its connected means functioning similarly to the sequential response function, except as hereinafter described.

The presetting and response means may function similarly to a usual decade system counting by "tens" and "units," by presetting the correct numerical-total by either of two alternative methods.

In either method, the correct item selector 18–NT will comprise means similar to selector 18–MC, which may correspond to the "units" digit. The first and all successive switches included in the number of the corresponding digit of the correct numercial-total may be preset "on," and the other switches "off." Each switch may be associated with the means for permanent recording heretofore described for response function SEQ, comprising item comparator 1–26–NT. Such permanent recording means may be associated with dialed digit recorder 1–24–NT. Each dialed digit may energize permanently each recorder included in its number.

In the first method, an additional similar decade of selectors may be provided for the "tens" digit, with additional "tens" permanent recording means similar to the "units" permanent recording means provided in dialed digit recorder 1–24–NT. All "tens" means may be connected similarly to corresponding "units" means.

In the second, alternative method the first dialed digit, the "tens" digit in the numerical-total, may be recorded permanently in 1–24–NT by a second 10-position recorder which may be the same recording means described in 1–24–SEQ.

In either method, the recorder for the "tens" digit will be associated with additional means whereby each successive position comprises 10 additional measurable units. Thus the total number of units recorded with equal the numerical-total comprising the channel's dialed response.

In scoring and comparisons, each dialed unit up to the preset numerical-total will comprise a correct unit, and each excessive or deficient pulse in the dialed response will comprise an incorrect unit. A certain standard of accuracy 22 will preset a number of units equal to the correct numerical-total, associated with an inverter 49–NT in net scorer 31–NT to determine whether the preset number is larger than the dialed number, with the smaller number then substracted from the larger. The difference in measurable units will comprise the number of incorrect items which, subtracted from the correct numerical-total, will leave a second difference in measurable units comprising the number of correct items. This data will comprise the input to the arithmetic means in net scorer 31–NT similar to response function SEQ.

*Combination of groups*

Figure 3:
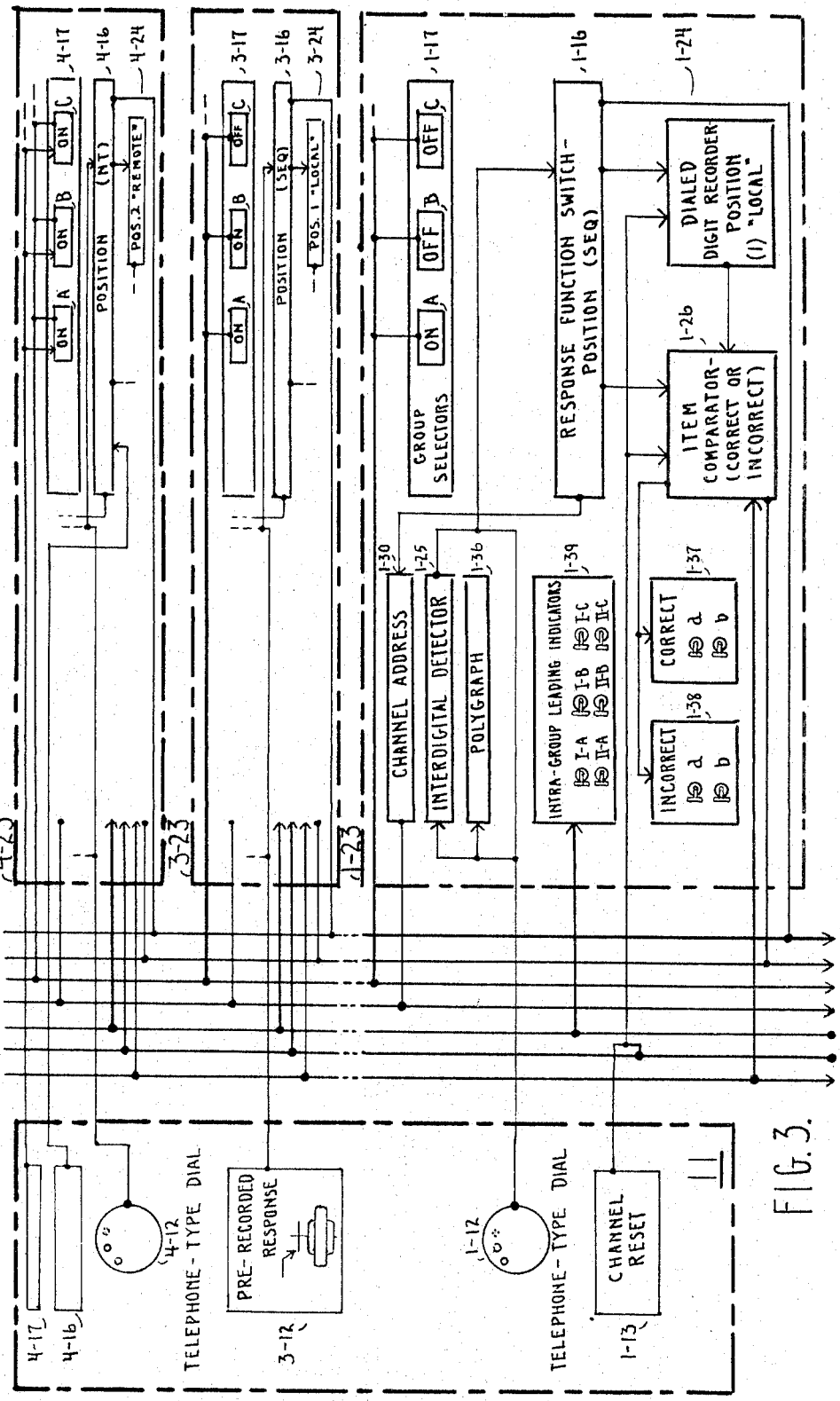
Figure 4:
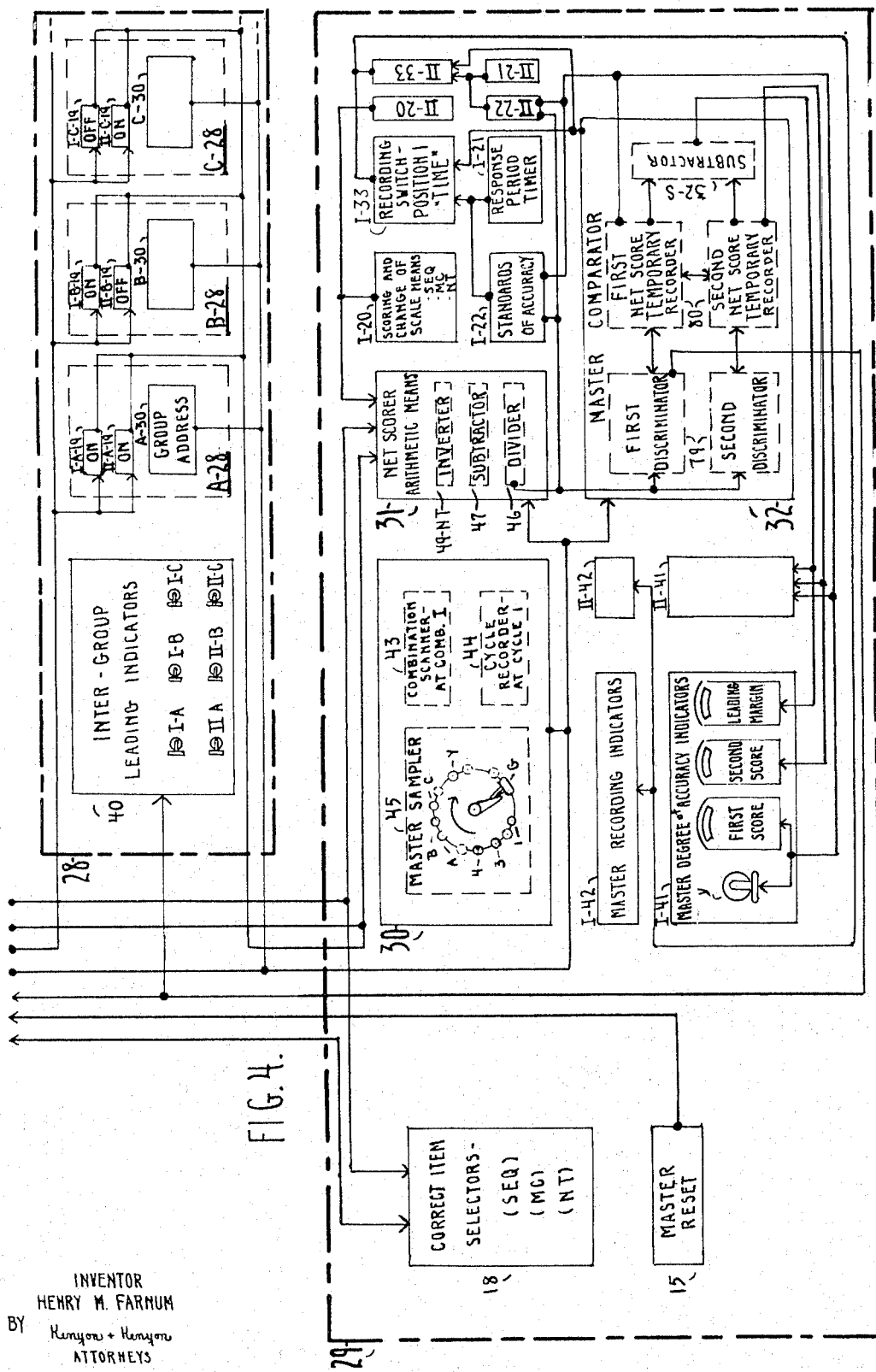

FIGS. 3 and 4 show a "Schematic Diagram—Plurality of Channels, Groups, and Combinations," with three alternative types of response stations 11. The means in its respective channels are associated similarly to corresponding means in FIGS. 1 and 2. With FIG. 3 placed above FIG. 4, the respective means of each figure and the inter-connections between the two figures will be shown in correct relationship.

FIG. 3 is divided vertically in this manner.

At the left are shown response stations 11, each situated with its respective subject. At the right of stations 11 are shown the item analyzers 23 for each of the respective channels. Each analyzer 23 comprises the means shown in these columns of FIG. 1: Col. 4, output indicators 35; Col. 2, controls 14; and Col. 3, intermediate devices. Means comprising output indicators 35, although normally situated with the examiner, each may be situated at any response station 11, or at any other position such as a TV control room or camera, etc.

FIG. 3 is divided into three horizontal segments comprising the means of each channel, in this order from the top; channels 4, 3, and 1.

FIG. 4 shows the means corresponding to master analyzer 27 in FIG. 2, such means normally situated with the examiner, and divided into two horizontal segments comprising group analyzer 28 and system analyzer 29, each such analyzer comprising its output indicators 35, controls 14, and intermediate devices.

In FIG. 3, response station 1–11 comprises a usual telephone-type dial 1–12 and channel reset 1–13; station 3–11 comprises a signalling means for a pre-recorded response to provide an input corresponding to the input from dial 1–12; and station 4–11 comprises dial 4–12, controls for response function switch 4–16, and controls for group selectors A–4–17, B–4–17, and C–4–17 each preset "on."

The means in item analyzer 1–23 are preset: selector A–1–17 "on"; selectors B–1–17 and C–1–17 "off"; switch 1–16 in its position SEQ; and dialed digit recorder 1–24 in its "local" position 1. Indicators 35 in channel 1 comprise polygraph 1–36; correct item indicators 1–37 and incorrect item indicators 1–38 for each of items $a$ and $b$; and leading indicators 1–39 for each of groups A, B, and C in each of combinations I and II. Other means in analyzer 1–23 comprise channel address means 1–30, interdigital detector 1–25, and item comparator 1–26.

The means in analyzer 3–23 are preset: switches 3–17, A and B "on"; and C "off"; switch 3–16 in its position SEQ; and recorder 3–24 in its "local" position 1.

The means in analyzer 4–23 are preset: switches 4–17, each "on"; switch 4–16 in its position NT; and recorder 4–24 in its "remote" position 2. Such preset means may comprise relays associated with control switches in response station 4–11.

The other means in analyzers 3–23 and 4–23 are similar to corresponding means in analyzer 1–23.

In FIG. 4, group analyzer 28 comprises these means. Indicators 35 comprise inter-group leading indicators 40 for each of groups A, B, and C, in each of combinations I and II. Analyzer A–28 comprises combination selectors A–19 preset "on" for each combination I and II, and group address means A–30. Analyzer B–28 comprises combination selectors B–19 preset "on" for combination I, and "off" for combination II; and group address means B–30. Analyzer C–28 comprises combination selectors C–19 preset "off" for combination I, and "on" for combination II; and group address means C–30.

In FIG. 4, system analyzer 29 comprises these means. Means which may be preset comprise correct item selectors 18–SEQ, 18–MC, and 18–NT; scoring and weighting switches I–20 and II–20; standards of accuracy I–22 and II–22; response period timers I–21 and II–21; and recording switches I–33 and II–33.

Indicators 35 comprise these means. Master degree of accuracy indicators I–41 comprise indicators for first score, second score, and leading margin, and corresponding indicators II–41. Master recording indicators comprise indicators I–42 and II–42.

In master address means 30, combination scanner 43 is shown connecting combination I; cycle recorder 44 is shown connecting the first cycle; and master sampler 45 is shown comprising, in one cycle, its addresses 1, 3, 4, A, B, C, $y$, and G shown connected with sampler 45 at rest. Net scorer 31 comprises subtractor 47, divider 46, and inverter 49–NT. Master comparator 32 comprises these means: first and second discriminators 79, first and second net score temporary recorders 80, and subtractor 32–$s$.

The preset means in FIGS. 3 and 4 may function in this manner. Each of correct item selectors 18–SEQ, 18–MC, and 18–NT may be preset with the correct answer to one of three different problems. The respective correct, incorrect, and unanswered items in such answers each may be preset with its respective weight in first combination I by scoring and change of scale means I–20–SEQ, I–20–MC, and I–20–NT. Other weights and scoring logic similarly may be preset in combination II by similar means II–20. Preset group selectors A–1–17, B–1–17, and C–1–17 in channel 1, and similar selectors in each additional channel, connect the respective channel to net scorer 31. Response function switch 1–16, and corresponding switches in each additional channel, connect the respective channel to net scorer 31, and to other means associated with specific response functions.

Preset standards of accuracy I–22, associated master degree of accuracy indicators I–41, and associated recording switch I–33 are shown for combination I, and corresponding means for combination II.

Combination selectors I–A–19 and II–A–19 in analyzer A–28, and corresponding means in analyzers B–28 and C–28, preset each respective group to be "on" or "off" in each respective combination.

Thus the conditions which control the comparisons by system analyzer 29 may vary between combinations I and II, in each preset manner.

The flexibility of the system is shown by the special, broad situation wherein competing stations each may respond to different problems comprising correct answers each with different weights. In the more usual situation, such differences will be preset in different combinations, so that competing stations each will respond to the same problem, as shown in FIGS. 5 to 13 comprising response stations 1–11 and 2–11 and associated means.

The program of the system in FIGS. 3 and 4 may comprise these multiple cycles. Combination scanner 43 successively will connect each combination for its first multiple cycle comprising, for example, two cycles each connected by cycle recorder 44.

In the first cycle of combination I, master sampler 45 successively will connect each of channels 1, 3, and 4 to be analyzed in its respective intra-group comparisons, and will connect the combined channels of each of groups A, B, and C to be analyzed in its respective inter-group comparisons; causing the first highest and second highest intra-group or inter-group net scores to be recorded in the respective recorders of temporary recorder 80. In an inter-group comparison, the average net score of the channels combined in the respective group will be analyzed similarly to a net score in an intra-group comparison as described for FIGS. 1 and 2.

In the second cycle, with each channel and group successively connected similarly to the first cycle, the highest net score will be compared with the net score of each channel and group, and also with each standard of accuracy I–22; and all indicators will function in association with their respective means similarly to corresponding means in FIGS. 1 and 2.

In the second cycle, the output of subtractor 32–s, representing the "leading margin," will comprise the output of the second net score temporary recorder 80 subtracted from the output of the first similar recorder 80, with each such output represented by corresponding master "degree of accuracy" indicators 41 of combination I. Only first discriminator 79, first recorder 80, and first indicators I–41 and II–41 are shown in corresponding means in FIGS. 12 and 13, as the manner of connection of additional similar means will be apparent to persons skilled in the art, with the teaching of this specification.

After the first series of multiple cycles, scanning each of combinations I and II, it is apparent that leaders may not have been determined in all intra-group and inter-group comparisons in each combination. Respective "cut-off" means will have responded to all such comparisons in which leaders have been determined.

In the second series of multiple cycles, for the unresolved comparisons, additional leaders, usually with lower scores, similarly will be determined, and the respective cut-off means will respond. Additional series of multiple cycles will continue until leaders have been determined in each inter-group and intra-group comparison, whereupon master program means of system analyzer 29 will disengage all cut-offs, and the system will repeat its series of multiple cycles in a continuous series of programs. Recording switch I–33 or II–33 will record permanently the condition of any leading indicator 39 or 40 at any time, similarly to the system shown in FIGS. 1 and 2.

A DETAILED RELAY EMBODIMENT

A system for a continuous program of comparisons is shown in FIGS. 5 to 15 inclusive in a relay embodiment comprising channels 1 and 2, groups A, B, and C, and combinations I and II, with switches 16 preset in their positions SEQ, and all means shown normally at rest.

Figure 5:
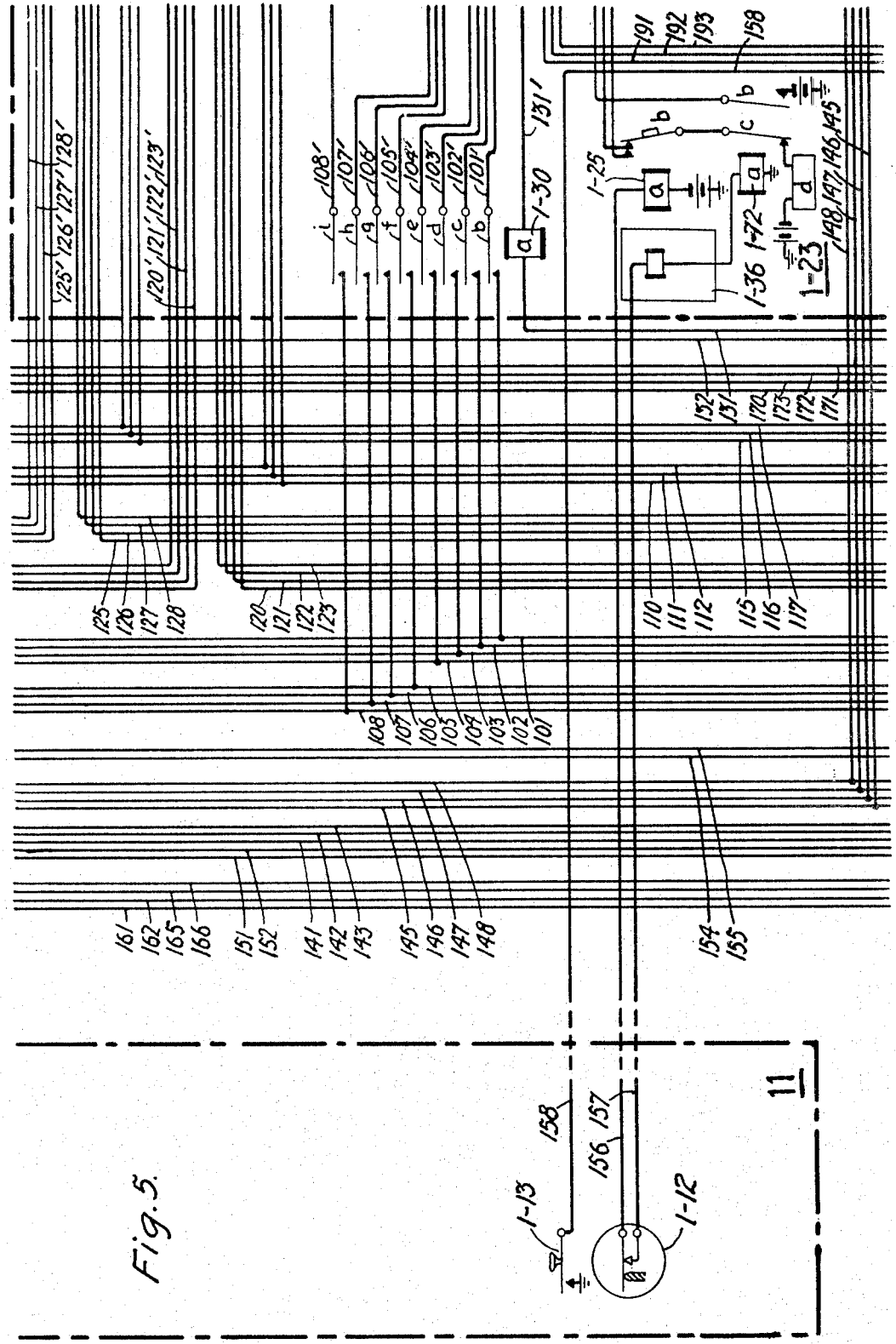
Figure 9:
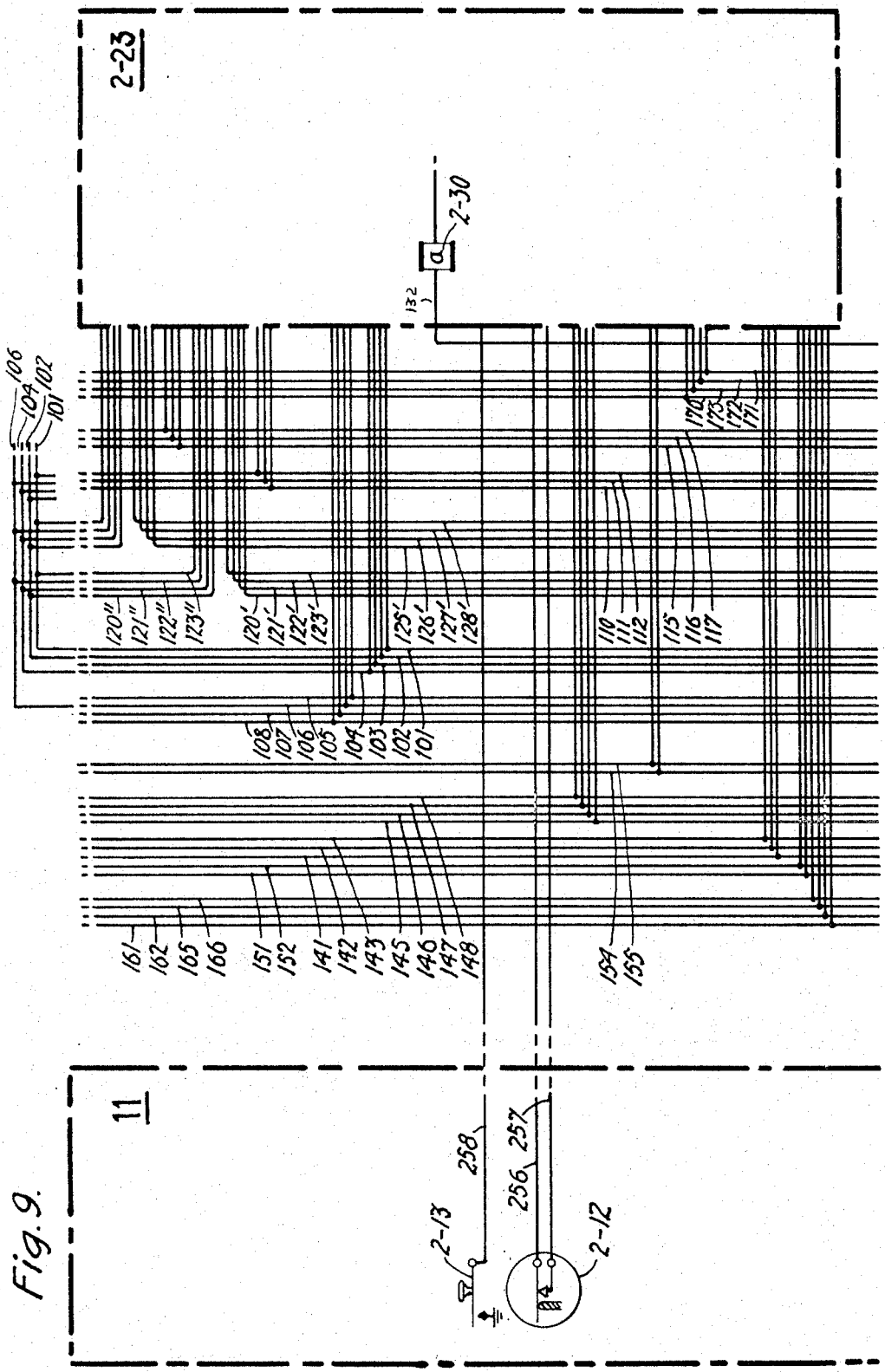

Means in response station 11, for channels 1 and 2, are shown at the extreme left of FIGS. 9 and 5. In FIG. 5 response station 11 is connected to item analyzer 1–23 by conductors 156, 157, and 158. In FIG. 9, response station 11 is connected to item analyzer 2–23 by conductors 256, 257, and 258.

Item analyzer 1–23 is shown in FIGS. 5, 6, 7, and 8. Item analyzer 2–23 is shown in FIG. 9. These conductors, common to all channels, connect analyzers 23 to system analyzer 29 in FIG. 12: 101 to 108 inclusive; 141 to 143, and 145 to 148, inclusive; 151, 152, 154, 155, 161, 162, 165, and 166; and 170 to 173 inclusive. Conductor 131 connects analyzer 1–23 to analyzer 29, and conductor 132 connects analyzer 2–23 to analyzer 29.

Figure 10:
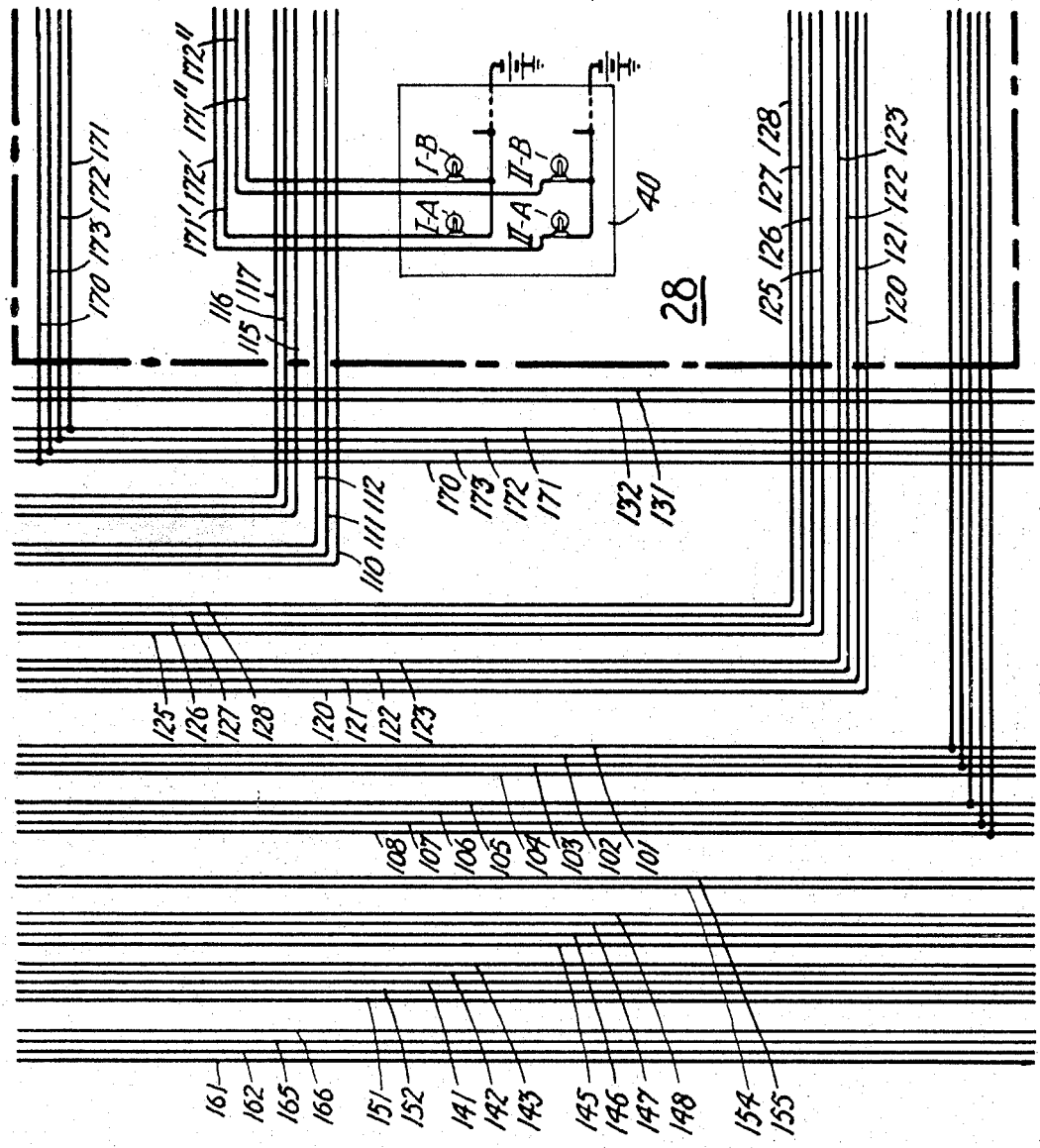
Figure 11:
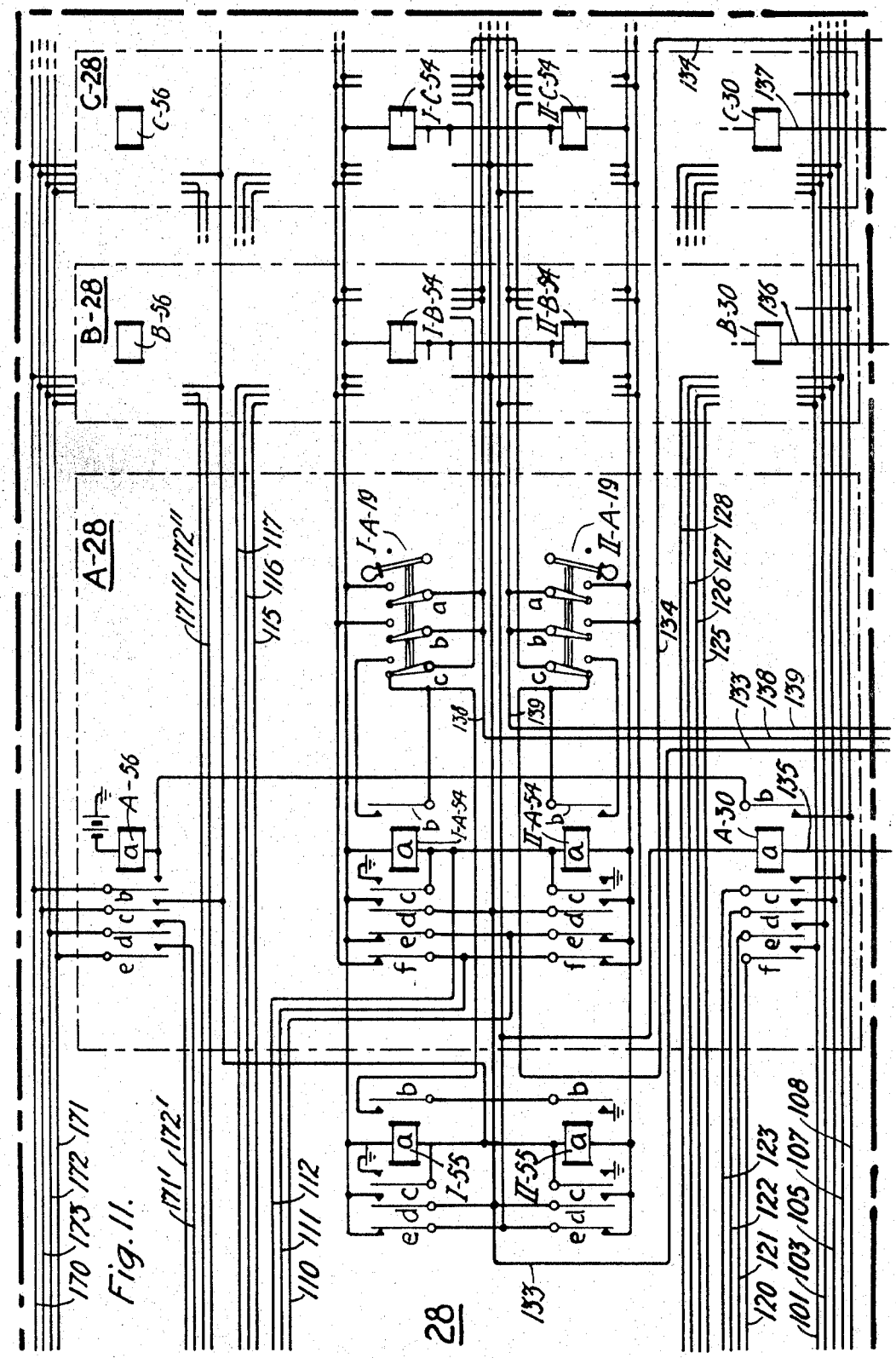

Group analyzer 28 is shown in FIGS. 10 and 11. These conductors, common to all channels, connect group analyzer 28 in FIG. 10 to channel analyzers 23: 110, 111, 112, 115, 116, and 117. These conductors connect analyzer 1–23 to analyzer 28: 120 to 123 inclusive, and 125 to 128 inclusive; corresponding conductors between analyzers 1–23 and 2–23 are designated ('), and between analyzers 2–23 and 3–23 not shown, are designated (").

Figure 12:
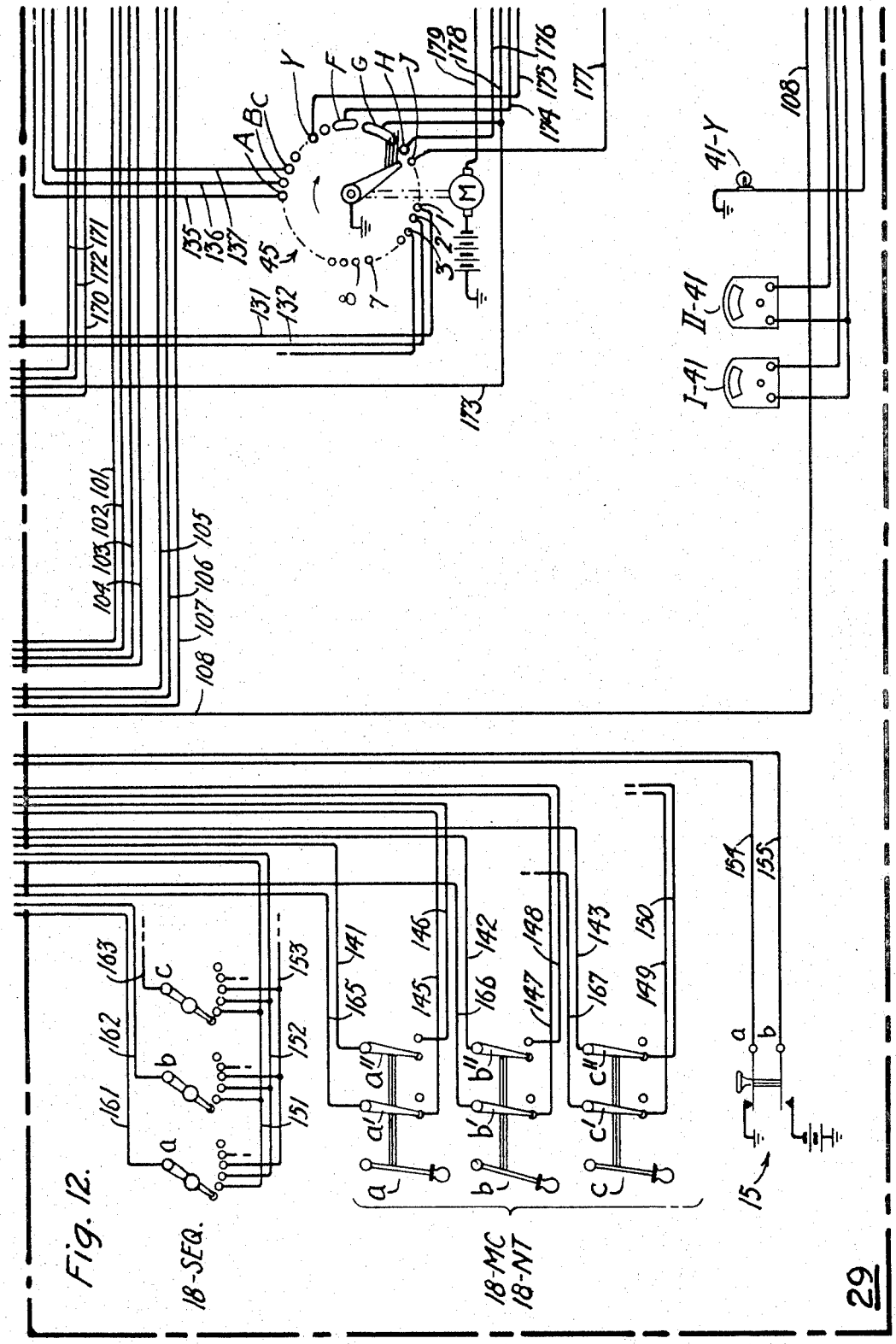
Figure 13:
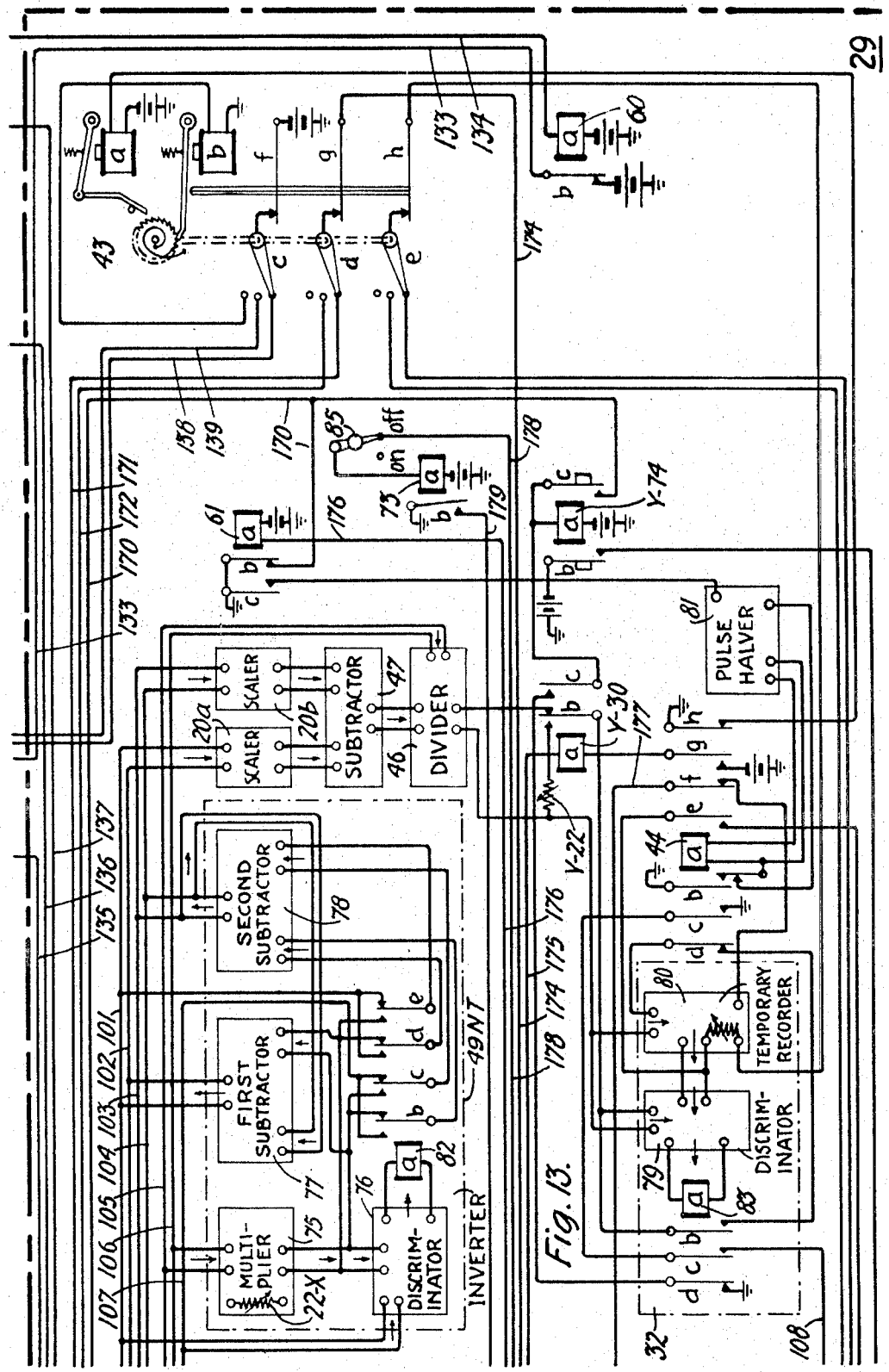

System analyzer 29 is shown in FIGS. 12 and 13. Conductors between analyzer 29, and analyzer 28 in FIG. 11, comprise 133 to 139 inclusive.

Response station 11 comprises these means: in FIG. 5, dial 1–12 and channel reset 1–13; in FIG. 9, dial 2–12 and channel reset 2–13.

Item analyzer 1–23 comprises the following means.

Item analyzer 1–23 comprises these means in FIG. 5: interdigital detector relay 1–25 comprising its slow-operating and fast-releasing coil $a$ normally operated, which when operating closes its armature and first front contact $b$ before closing its second front contact $b$; channel address relay 1–30 comprising its coil $a$ and eight associated armatures and front contacts successively designated $b$ to $i$; the coil of polygraph 1–36; and pulsing relay 1–72 normally operated and comprising its coil $a$, armature and back contact $b$, armature and front contact $c$, and associated "attention" means $d$.

Figure 6:
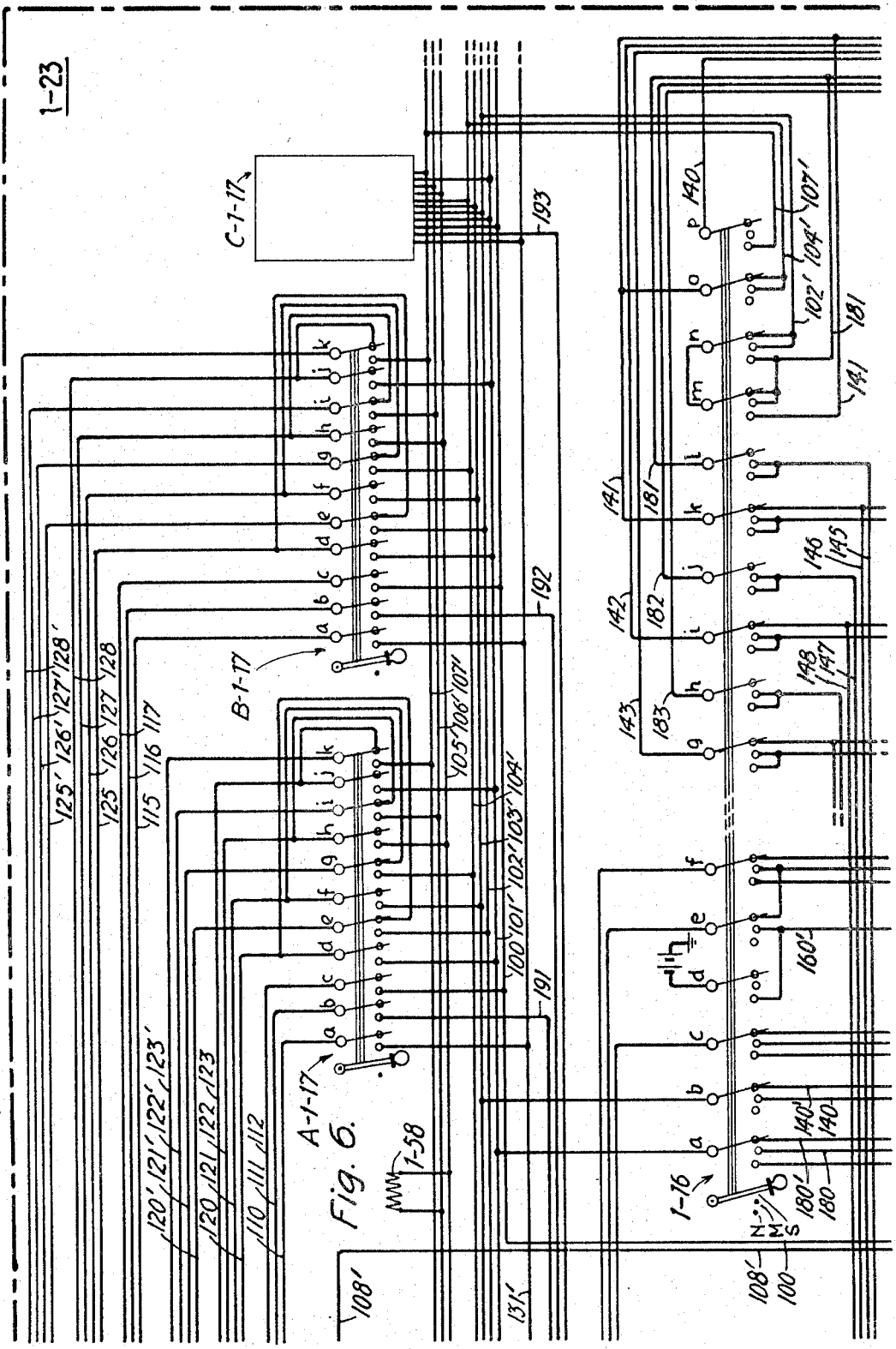
Figure 7:
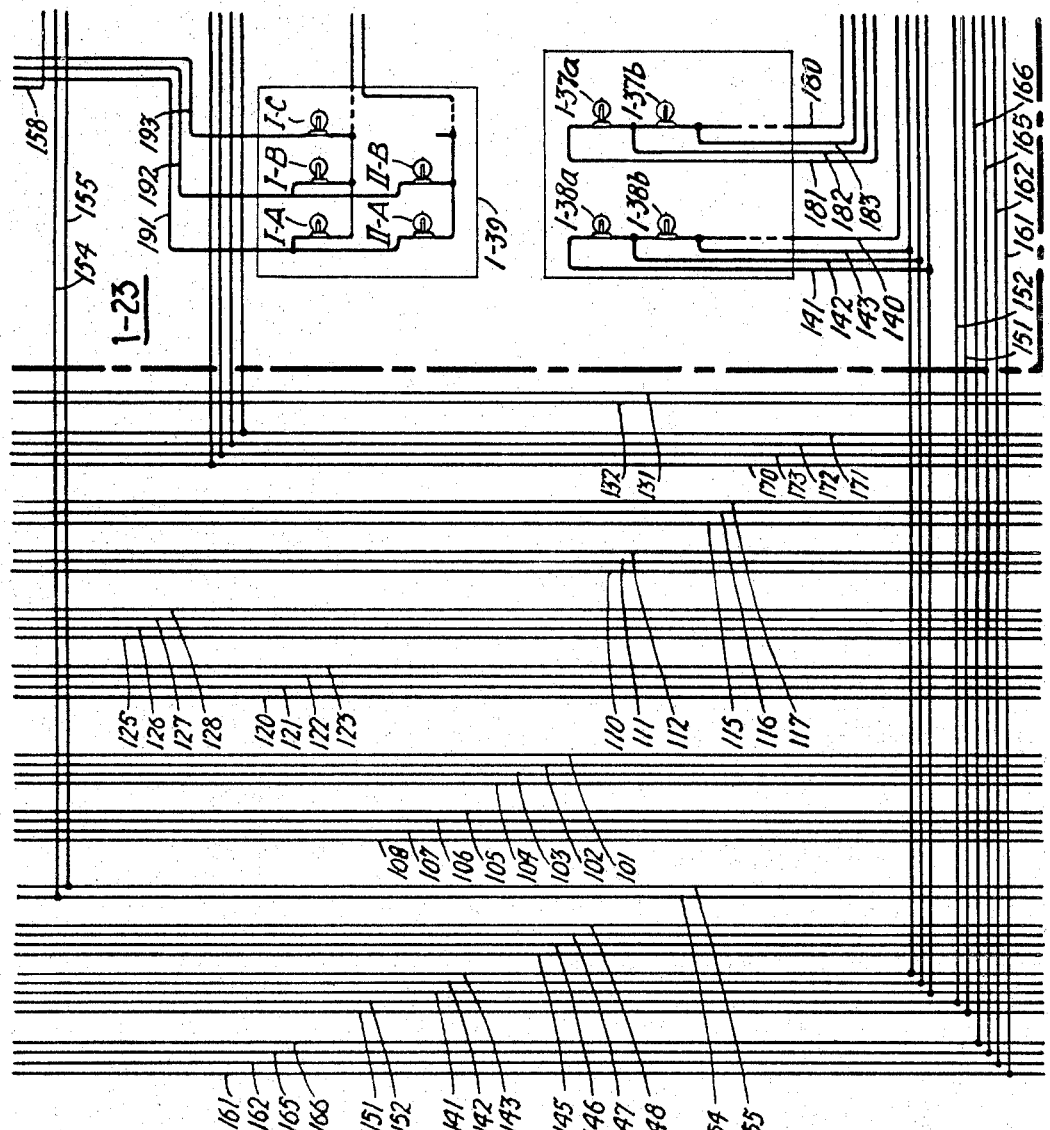
Figure 8:
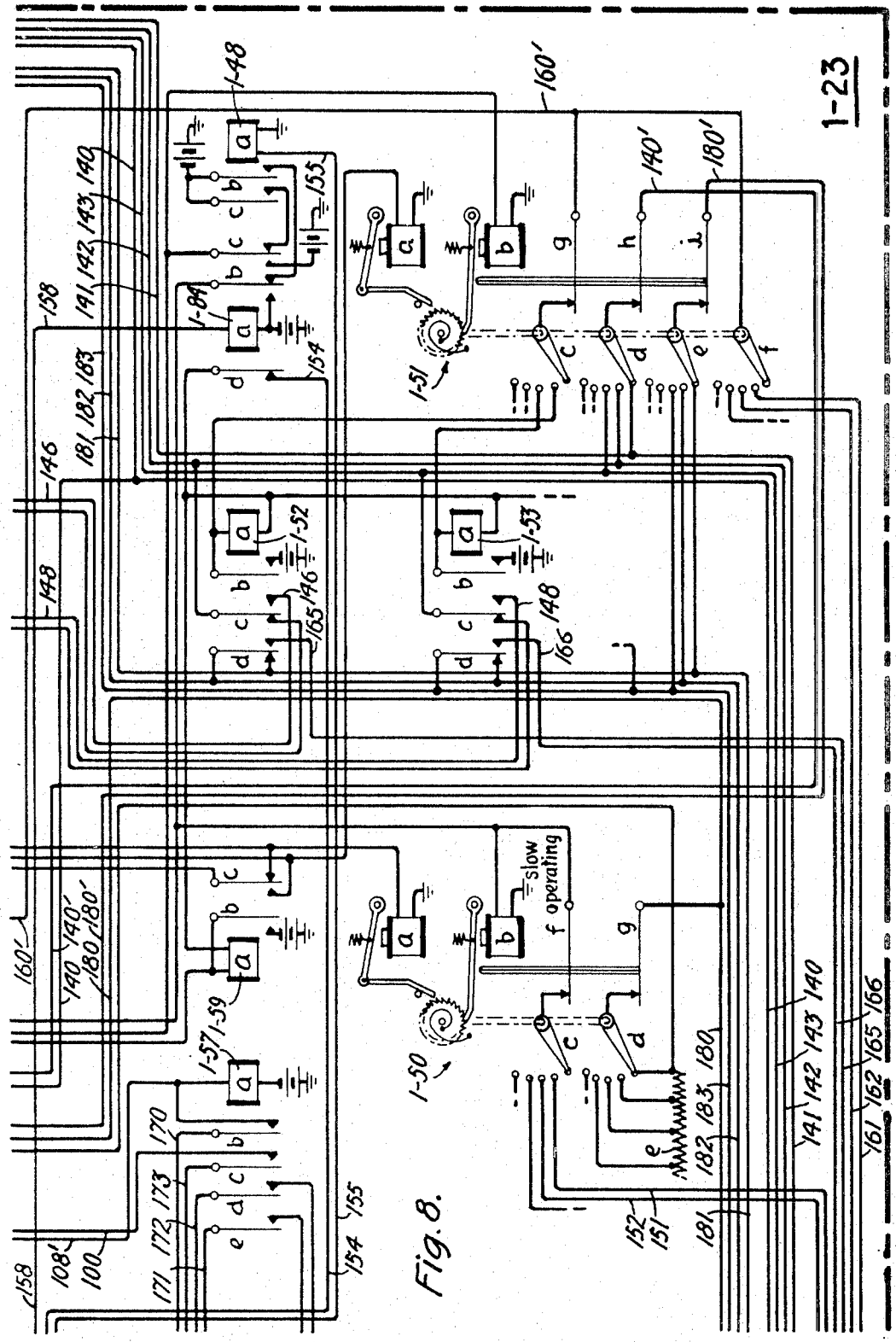

Item analyzer 1–23 comprises these means in FIG. 7: one correct indicator 1–37–$a$ and one incorrect indicator 1–38–$a$ each associated with first comparator recorder relay 1–52 in FIG. 8, similar correct and incorrect indicators designated $b$ associated with second comparator recorder 1–53 in FIG. 8, and similar indicators not shown, associated each with its respective additional comparator recorder not shown; and leading indicators 1–39 connected for each of groups A and B in each of combinations I and II, and also similar indicator I–C–1–39. Additional connectors between means in FIGS. 6 and 7 comprise conductors 191, 192, and 193, and between FIGS. 7 and 8 comprise 140, and 180 to 183 inclusive.

Item analyzer 1–23 comprises these means in FIG. 6: group selector A–1–17, a two position switch, each of its eleven gangs double pole, single throw and successively designated $a$ to $k$; similar switches B–1–17 and C–1–17;

channel integer resistor 1–58; and response function switch 1–16 with three positions as in FIG. 1, each of its sixteen gangs shown triple pole, single throw, and respectively designated *a* to *p*, with fourteen additional similar gangs not shown. Additional connectors between FIGS. 6 and 8 comprise conductors 140 to 143 inclusive, 140′, 160′, 180 to 183 inclusive, and 180′.

Item analyzer 1–23 comprises these means in FIG. 8. These means in FIG. 8 are common to all response functions: intra-group leading relay 1–57 comprising its coil *a* and four associated armatures and front contacts *b*, *c*, *d*, and *e*; channel reset relay 1–84, comprising its coil *a*, armatures *b* and *c* each with front and back contacts, and armature *d* with back contact; and reset relay 1–48 comprising its coil *a*, and armatures *b* and *c* each with front contact.

These means in FIG. 8 are connected by switch 1–16. Dialed digit recorder 1–24–SEQ comprises eleven-pole stepping switch 1–50 comprising stepping coil *a*, slow-operating reset coil *b*, first gang *c* shown at rest and shown with its poles comprising its position at rest and its positions 1 and 2 comprising the first two of its ten similar positions. Auxiliary means of switch 1–50 comprise contacts *f* of the armature of its coil *b*. Also, dialed digit recorders 1–24–MC and 1–24–NT comprise eleven-pole stepping switch 1–51 similar to the foregoing means of switch 1–50; and recorder 1–24–NT also comprises additional means of switch 1–50 comprising its gang *d* similar to its gang *c*, its contacts *g* similar to its contacts *f*, its associated means comprising tens resistor *e*, and tens switching relay 1–59 comprising its coil *a*, and its armatures *b* with front contact and *c* with front and back contacts.

Item comparator 1–26 for all three response functions comprises first and second comparator recorder relays 1–52 and 1–53 shown connected, and eight additional similar means not shown, each such relay comprising its coil *a* and armatures *b* with front contact and *c* and *d* each with front and back contacts. Item comparator 1–26–SEQ also comprises stepping switch 1–51 including its means heretofore described in recorder 1–24–MC, its additional gangs *d*, *e*, and *f* each similar to its gang *c*, and its additional contacts *h* and *i* each similar to its contacts *g*. Inter-connection by switch 1–16 of these means, to reduce duplication of means for each response function, is tabulated below.

| Means | Response function Corresponding to FIGS. 1 and 2 | | |
|---|---|---|---|
| | SEQ | MC | NT |
| 1–50—*a*, *b* | 1–24 | | 1–24 |
| *c* | 1–24 | | |
| *d*, *e* | | | 1–24 |
| 1–51—*a*, *b*, *c* | 1–26 | 1–24 | 1–24 |
| *d*, *e*, *f* | 1–26 | | |
| 1–52, 1–53, etc. | 1–26 | 1–26 | 1–26 |
| 1–59 | | | 1–24 |

Analyzer 2–23 in FIG. 9 comprises means corresponding to similar means in analyzer 1–23, including channel address relay 2–30.

Master analyzer 27 comprises group analyzer 28 and system analyzer 29.

Means of group analyzer 28 in FIG. 10 comprise inter-group leading indicators 40, comprising one indicator for each of groups A and B for each of combinations I and II.

Groups analyzer 28 comprises means in FIG. 11 common to all groups, and additional means similarly for each of groups A, B, and C. Means common to all groups comprise inter-group cut-off relays I–55 and II–55, each comprising its coil *a*, armatures *b*, *c*, and *d*, each with its front contact, and armature *e* with its back contact. Group analyzer A–28 comprises these similar means for each of combinations I and II: combination selector A–19, each selector comprising a triple-throw hand-set switch with gangs *a*, *b*, and *c*, each gang with its two positions designated "on" and "off"; intra-group cut-off relay A–54 comprising coil *a*, armatures *b*, *c*, and *d* each with its front contact, and armatures *e* and *f* each with its back contact. Analyzer A–28 also comprises group address relay A–30 comprising coil *a* and armatures *b*, *c*, *d*, *e*, and *f* each with its front contact; and inter-group leading relay A–56 comprising coil *a* and armatures *b*, *c*, *d*, and *e* each with its front contact.

System analyzer 29 comprises these means in FIG. 12. Correct item selector 18–SEQ comprises ten single-throw hand-set switches normally at rest, each switch also comprising 10 positions, each similar; connections shown to two only of the ten similar switches, each switch corresponding to one of ten successively numbered items; first switch *a*, corresponding to the first item, shown with connections to its first two positions only, and second switch *b* corresponding to the second item and similarly shown. Means used for both selectors 18–MC and 18–NT comprise ten two-position double-throw manual switches successively designated *a*, *b*, *c*, etc., each switch comprising its gangs designated (′) and (″), again two of ten similar switches shown connected, the positions of each switch designated "on" and "off." One of the means corresponding to address means 30 in FIGS. 1 and 2, master scanner 45, comprises a rotor driven by its motor M, which successively contacts these poles: one pole correspondingly designated for each of channels 1 and 2, and for each of groups A, B, and C; pole *y* corresponding to standard of accuracy *y*–22; and poles designated F, G, H, and J, for certain master control functions. Degree of accuracy indicators 41 comprise meters I–41 and II–41, and indicator 41–*y*. Additional connections between system analyzer means in FIGS. 12 and 13 comprise conductors 174 to 179 inclusive.

System analyzer 29 comprises these means in FIG. 13. Scalers 20 comprise correct scaler *a*0–*a* and incorrect scaler 20–*b*.

The variable resistor comprising standard of accuracy *y*–22 is associated with its address relay *y*–30 comprising its coil *a*, armature *b* with front and back contacts, and armature *c* with front contact; and accuracy relay *y*–74 comprising its slow-operating coil *a*, and armatures *b* and *c* each with front contact.

Additional master means corresponding to address means 30 in FIGS. 1 and 2, comprise combination scanner 43, cycle recording relay 44, and its associated pulse halver 81. Combination scanner 43 comprises a stepping switch with stepping coil *a*, reset coil *b*, and gangs *c*, *d*, and *e*, each gang with one position corresponding to each of combinations I and II, and with one additional position from which it is reset. Auxiliary means of switch 43 comprise contacts *f*, *g*, and *h* of the armature of its coil *b*. Cycle address means 44 comprises relay coil *a*, armatures *b*, *c*, *e*, and *g* each with front contact, and armatures *d*, *f*, and *h* each with back contact. Pulse halver 81 comprises means with output alternately to lock relay 44 operated, and to release relay 44, by each successive pulse of input.

Means corresponding to net scorer 31 in FIG. 2 comprise divider 46, subtractor 47, and inverter 49–NT. Divider 46 comprises usual means whereby its output equals its first input divided by its second input. Subtractor 47 comprises usual means whereby its output equals its second input subtracted from its first input. Inverter 49–NT comprises these means: multiplier 75, comprising means to multiply the output of the variable resistor 22–*x* representing 100% standard of accuracy, by the input of multiplier 75, the resultant product comprising its output; discriminator 76 comprising means with its output dependent upon its determination of the larger of its two inputs; first subtractor 77 and second subtractor 78, each similar to subtractor 47; and relay 82 comprising its coil *a*, and armatures *b*, *c*, *d*, and *e*, each with front and back contacts.

Means corresponding to master comparator 32 in FIG.

2 comprise these means: discriminator 79 similar to discriminator 76; temporary recorder 80 comprising means temporarily to record its first input, which is erased by grounding of its resetting input; and relay 83, comprising its armatures $b$ and $c$ each with front contact, and armature $d$ with back contact.

Numerous types of arithmetic means well known in the art, and adapted to respond to impedance and other electrical characteristics, are described in Electronic Instruments, by Ivan Greenwood, Jr., New York, McGraw-Hill Book Co., Inc., 1948, 821 pp.; particularly in its chapter 3, "Arithmetic Operations," p. 32. The book was prepared by the MIT Radiation Laboratory, under the supervision of NDRC. Discriminator means are therein described in chapter 3–10, p. 42, "Discriminators," and in chapter 13–4, p. 511, "Comparison Circuits." "Temporary" recording means such as servomechanisms are therein described in part II, "Instrument Servomechanisms," p. 215. The further manner of connection of these means will be apparent to persons skilled in the art.

These additional means are shown in FIG. 13: program index relay 60 comprising coil $a$, and armature $b$ with back contact; cycle index relay 61 comprising coil $a$, armature $b$ with back contact, and armature $c$ with front contact; master cut-off relay 73 normally operated when the system is at rest, comprising coil $a$, and armature $b$ with back contact; and "program disconnect" manual switch 85, its two poles designated "off" and "on," usually in its off position, when the system is at rest.

For all response functions, in the dial response pulsing circuit, the normally-closed contacts of the vibrator in dial 1–12 are connected to enable the subject selectively to signal a series of one to ten electrical pulses representing a digit, with the duration of each pulse comprising a time interval shorter than the operating time of the coil $a$ of slow-operating interdigital detector relay 1–25. Its delay in operating to close its armature and front contacts $b$ during the dialing of a digit disconnects its associated means until the longer interdigital delay intervals. The dial circuit connections comprise battery, coil $a$ of relay 1–25, conductor 156, vibrator of dial 1–12, conductor 157, coil of polygraph 1–36, coil $a$ of pulsing relay 1–72, and ground; all coils normally energized, and all means connected to armature $b$ of relay 1–72 normally deenergized. When the vibrator in dial 1–12 opens, coil $a$ of each of relays 1–25 and 1–72 will be released.

*Sequential response function*

If switch 1–16 is preset by the examiner in its position SEQ, abbreviated S in FIG. 6, for the sequential response function, the means will function in this manner.

Each dialed pulse will be recorded by advancing one step the brush in gang $c$ of stepping switch 1–50, by these circuit connections: battery, back contact and armature $b$ of relay 1–72, gang $f$–SEQ of switch 1–16, coil $a$ of switch 1–50, and ground.

During and after each dialed digit, when coil $a$ of relay 1–72 releases and then operates, and then slow-operating coil $a$ of relay 1–25 operates, these events will occur. "Attention" means $d$ associated with relay 1–72 will energize front contact $c$ of relay 1–72. The recording means for the "item number" in the sequence comprising stepping switch 1–51 will be advanced one step. Then the corresponding "comparator recorder" relay will be operated if the dialed digit is the same as the corresponding preset digit in the sequence. Then switch 1–50 will be reset to its normal position at rest.

"Attention" means $d$ not shown in detail and associated with relay 1–72 comprises usual means such as a relay, operated by the disconnection of front contact and armature $c$ of relay 1–72 by the first pulse of the first digit, and remaining operated until reset by independent means such as channel reset 1–13 or master reset 1–15 in a manner similar to such resetting of other means hereinafter described. Operated attention means $d$ of relay 1–72 will connect battery to armature $c$ of relay 1–72, in a manner apparent to persons skilled in the art.

The "item number" circuit connections comprise battery, attention means $d$ of relay 1–72, its front contact and armature $c$, the armature and first front contact $b$ of relay 1–25, gang $e$–SEQ of switch 1–16, coil $a$ of switch 1–51, and ground; thus advancing switch 1–51 to its next step.

If the first dialed digit is "one," comprising one pulse, the "item comparison" will comprise these circuit connections in series: battery, attention means $d$ associated with relay 1–72, its front contact and armature $c$, the armature and second front contact $b$ of relay 1–25 which closes after the closing of its first front contact, gang $c$–SEQ of switch 1–16, closed contacts $f$ of the armature of coil $b$ of stepping switch 1–50 and its gang $c$ at its operated first position corresponding to the dialed digit "one," conductor 151, the corresponding first active position of switch $a$ in selector 18–SEQ, such switch corresponding to the first item with its arm connected by conductor 161 to the corresponding "item number" position comprising the first operated position of gang $f$ of switch 1–51, closed contacts $g$ of the armature of reset coil $b$ of such switch and its gang $c$ with its first operated position connecting coil $a$ of first comparator recorder relay 1–52, armature and back contact $d$ of channel reset relay 1–84, conductor 154, gang $a$ of master reset switch 15, and ground. If switch $a$ of selector 18–SEQ has been preset in its first position corresponding to the digit "one," relay 1–52 will be operated by the item comparator circuit, and locked up by the front contact of its armature $b$ connecting battery. Each first active position of switch $b$ and each additional switch of selector 18–SEQ is connected in parallel, to conductor 151. The single arm of switch $b$ of selector 18–SEQ is connected by conductor 162 to the corresponding second operated position of gang $f$ of switch 1–51 with the second operated position of its gang $c$ connected to coil $a$ of second comparator recorder relay 1–53 and to corresponding associated means. Each additional means not shown of switch 1–50, selector 18–SEQ, switch 1–51, and the additional associated comparator recorder relays, is connected to corresponding means similarly to the means shown.

After the item comparison, the slow-operating coil $b$ of stepping switch 1–50 will reset the switch to its normal position at rest, by battery connected by gang $c$–SEQ of switch 1–16 to this circuit: coil $b$ of switch 1–50, and ground. To prevent the transient energization of the contacts of gang $c$ of switch 1–50 during its resetting, its contacts $f$ are opened by the armature of its energized reset coil $b$, to disconnect its gang $c$.

With reference to each answered item, switch 1–51 and associated means will connect or by-pass each respective correct item indicator 1–37 or incorrect item indicator 1–38, according to whether each dialed digit is similar or dissimilar to the corresponding preset item. Each indicator comprises one unit of electrical resistance.

With switch 1–51 at rest, the input of "correct resistance" to scaler 20–$a$ comprises this circuit by-passing all units of resistance: scaler 20–$a$, conductor 101, the front contact of armature $b$ of relay 1–30, conductor 101′, gang $a$–SEQ of switch 1–16, conductor 180′, closed contacts $i$ of the armature of coil $b$ of switch 1–51 and its gang $e$, conductor 181, gangs $m$–SEQ and $n$–SEQ of switch 1–16, conductor 102′, armature and front contact $c$ of relay 1–30, conductor 102, and scaler 20–$a$.

With relay 1–52 released, the first operated position of gang $e$ of switch 1–51 will be series connected to conductor 182, the armature and back contact $d$ of relay 1–52, conductor 181, and gang $m$–SEQ of switch 1–16, thus by-passing first correct item indicator 1–37–$a$. With relay 1–52 operated to open its back contact $d$, the first operated position of gang $e$ of switch 1–51 will be series connected to conductor 182, indicator 1–37–$a$, and conductor 181.

With relay 1–53 released, the second operated position of gang *e* of switch 1–51 will be series connected to conductor 183, the armature and back contact *d* of relay 1–53, and conductor 182, by-passing second indicator 1–37–*b*, and connecting the same means connected by the first position of gang *e* of switch 1–51. With relay 1–53 operated to open its back contact *d*, the second position of gang *e* of switch 1–51 will be series connected to conductor 183, indicator 1–37–*b*, and then to the same means connected by the first position of gang *e* of switch 1–51. Its each additional position similarly connects corresponding means now shown.

With switch 1–51 at rest, the input of "incorrect resistance" to scaler 20–*b* comprises this circuit by-passing all units of resistance: scaler 20–*b*, conductor 103, the front contact of armature *d* of relay 1–30, conductor 103', gang *b*–SEQ of switch 1–16, conductor 140', closed contacts *h* of coil *b* of relay 1–51 and its gang *d*, conductor 141, gang *o*–SEQ of switch 1–16, conductor 104', armature and front contact *e* of relay 1–30, conductor 104, and scaler 20–*b*.

With relay 1–52 released, the first operated position of gang *d* of switch 1–51 will be connected in series to conductor 142, first incorrect item indicator 1–38–*a*, conductor 141, and gang *o*–SEQ of switch 1–16.

With relay 1–52 operated, the first operated position of gang *d* of switch 1–51 will be connected in series to conductor 142, the armature and front contact *c* of relay 1–52, conductor 146, gang *k*–SEQ of switch 1–16, conductor 141, and gang *o*–SEQ of switch 1–16, thus by-passing indicator 1–38–*a*.

With relay 1–53 released, the second operated position of gang *d* of switch 1–51 will be connected in series to conductor 143, second indicator 1–38–*b*, and then to the same means connected by the first operated position of gang *d* of switch 1–51.

With relay 1–53 operated, the second operated position of gang *d* of switch 1–51 will be connected in series to conductor 143, the armature and front contact *c* of relay 1–53, conductor 148, gang *i*–SEQ of switch 1–16, and conductor 142, to by-pass indicator 1–38–*b*, and then to connect the same means connected by the first operated position of gang *d* of switch 1–51. Its each additional position similarly connects corresponding means not shown.

If it is desired to avoid certain transient indications by means 1–38 during the time interval between the closing of the first and the second front contacts *b* of relay 1–25, each indicator 1–38 may comprise delay means for such time interval.

The input to divider 46 of one unit of "integer" resistance will be connected by this circuit: divider 46, conductor 105, front contact and armature *f* of relay 1–30, conductor 105', integer resistor 1–38, conductor 106', armature and front contact *g* of relay 1–30, conductor 106, and divider 46.

In summary, when for example the first digit preset in selector 18–SEQ is dialed by means 1–12 and recorded by means 1–24–SEQ, and channel address relay 1–30 is operated, item comparator 1–26–SEQ will connect these inputs of units of resistance to system analyzer 29: one unit in the "correct" circuit, zero units in the "incorrect" circuit, and one unit in the "integer" circuit. If the first dialed digit does not correspond to the first preset digit, the "correct" input will comprise zero units, and the "incorrect" input will comprise one unit.

In system analyzer 29, energized motor M of master sampler 45 is shown disconnected from ground by the back contact and armature *b* of master cut-off relay 73 which, when the system is at rest, normally is operated by this circuit: battery, coil *a* of relay 73, program disconnect switch 85 in its "off" position, conductor 178, position *g* of sampler 45, and ground. The examiner's selection of the "on" position of switch 85 will disconnect ground to release relay 73 and to operate motor 45–M by this circuit: battery, motor 45–M0, conductor 179, back contact and armature *b* of relay 73, and ground.

If group selector A–1–17 is preset "on," and group A is preset in combination I by selector I–A–19, then relay 1–30 will be operated when motor 45–M moves its rotor to its position corresponding to channel 1. The circuit will be: battery, closed contacts *f* of the armature of coil *b* of combination scanner 43, position I of its gang *c*, conductor 138, gang *a* of selector I–A–19, the back contact and armature *c* of relay I–A–54, conductor 110, gang *a* of selector A–1–17, conductor 131', coil *a* of relay 1–30, conductor 131, position 1 of sampler 45, and ground.

When combination scanner 43–*a* is advanced to its position (II), similar conditions of corresponding means comprising conductor 139, selector II–A–19, and armature and back contact *c* of relay II–A–54, will operate relay 1–30.

If group selector B–1–17 is preset "on," then relay 1–30 similarly will be operated by similar connections among these corresponding means: gang *a* of selector I–B–19 or II–B–19 not shown, means *c* of relay I–B–54 or II–B–54 not shown, conductor 115, and gang *a* of selector B–1–17.

In the first cycle of scanner 45, at its position 1, operated relay 1–30 will close its associated armatures connecting the input to system analyzer 29 comprising current through the channel's resistances representing "correct," "incorrect," and "integer" data. The "correct" and "incorrect" currents, comprising the inputs to scalers 20–*a* and 20–*b* respectively, each may be changed in scale thereby, the resultant outputs comprising the two inputs of subtractor 47, which will subtract the incorrect from the correct current; the resultant current comprising the input of divider 46, divided therein by current through the channel's integer resistance. The resultant current, representing the channel's net score and comprising the output of divider 46, may be connected as the first input of discriminator 79.

It is apparent that a negative current representing a score as the output of subtractor 47 may be avoided by addition to the channel resistance of a selected constant master resistance for all response functions. Such resistance will protect from overload any means comprising indicators 37 and 38. If it is desired to establish different resistance values for each response function, such resistances may be connected by an additional gang not shown of switches 16. Equivalent resistance should be added to each means 22. These additional resistances and associated means are not shown, and their manner of connection will be apparent to persons skilled in the art.

The first input of discriminator 79 comprises first connector to the output of divider 46, and second connector to the armature and back contact *b* of relay *y*–30, connecting divider 46. The second input of discriminator 79 comprises two connections from temporary recorder 80. The output of discriminator 79 comprises two connections to coil *a* of relay 83. The first input of temporary recorder 80 comprises first connector to divider 46, and second connector to the armature and back contact *d* of relay 44, front contact and armature *b* of relay 83, and armature *b* of relay *y*–30.

Ground connected at position H of sampler 45 by conductor 176 will operate the coil *a* of cycle index relay 61 connected to battery. Its armature and front contact *c* then will connect ground for one pulse to pulse halver 81, comprising a usual "W–Z shunt type" of pulse halver as shown in FIG. 7, p. 19, of Monograph B–1688, by the Bell Telephone System. The "W" relay comprises coil *a* of cycle recording relay 44, with two connectors to pulse halver 81; the make-before-break front contact and armature *b* of relay 44 connecting its coil *a* to locking ground; and the break-after-make back contact of its armature *b* connecting pulse halver 81.

Each double-cycle comprises two complete revolutions of the rotor of sampler 45. In its first cycle, at its position H, the first pulse input to pulse halver 81 will operate and lock up relay 44. The second similar pulse, in the second cycle of sampler 45, will release relay 44.

If the net score of one unit of resistance is the highest recorded in net score temporary recorder 80 in the first cycle of first combination I, the system in its second cycle will function in this manner.

The second output of recorder 80 will comprise two connections by which the meter comprising indicator I–41 will read the degree of accuracy represented by the current through the variable resistor in recorder 80. The circuit will be: recorder 80, the armature and front contact $e$ of relay 44, indicator I–41, gang $e$ of combination scanner 43 at its position I, closed contacts $h$ of the armature of coil $b$ of scanner 43, and recorder 80.

At position 1 of sampler 45, the output of divider 46, and the first and second inputs and the output of discriminator 79 will comprise means functioning in the same manner as in the first cycle.

Discriminator 79 will operate relay 83. The back contact of armature $d$ of relay 44 will disconnect temporary recorder 80 from divider 46, and armature $c$ of relay 83 will operate leading relay 1–57 by this circuit: battery, coil $a$ of relay 1–57, conductor 108′, armature and front contact $i$ of relay 1–30, conductor 108, front contact and armature $c$ of relay 83, front contact and armature $c$ of relay 44, and ground. Locking ground for relay 1–57 will be connected by its front contact and armature $b$, conductor 170, and back contact and armature $b$ of cycle index relay 61.

At address $y$ of sampler 46, the coil $a$ of address relay $y$–30 will be operated by this circuit: battery, front contact and armature $g$ of relay 44, coil $a$ of relay $y$–30, conductor 175, position $y$ of sampler 45, and ground.

The first input to discriminator 79 then will connect variable resistor $y$–22, representing a preset standard of accuracy, by this circuit: discriminator 79, resistor $y$–22, front contact and armature $b$ of relay $y$–30, and discriminator 79. Discriminator 79 then will compare its two inputs.

If relay 83 continues released, the slow-operating coil $a$ of accuracy relay $y$–74 will be operated by this circuit: battery, coil $a$ of relay $y$–74, armature and front contact $c$ of relay $y$–30, armature and back contact $d$ of relay 83, and ground; with relay $y$–74 locked up by its armature and front contact $c$, conductor 170, back contact and armature $b$ of relay 61, and ground. Standard of accuracy indicator 41–$y$ will be operated by this circuit: battery, armature and front contact $b$ of relay $y$–74, indicator 41–$y$, and ground.

At position F of sampler 45, if the resistance representing the net score of channel 1 equals or exceeds that of any other channel in a group, leading relay 1–57 will have been operated previously, and the intra-group leading indicator 1–39 corresponding to the group will be energized by the corresponding one of these parallel circuits. If channel 1 leads group A with selectors A–1–17 and I–A–19 both preset "on," the circuit will be battery, closed contacts $f$ of the armature of coil $b$ of scanner 43, its gang $c$ at its position I, conductor 138, gang $b$ of selector I–A–19, back contact and armature $f$ of relay I–A–54, conductor 111, gang $b$ of selector A–1–17, conductor 191, indicator I–A–1–39, front contact and armature $e$ of relay 1–57, conductor 171, position I of gang $d$ of scanner 43, its closed contacts $g$ of the armature of its coil $b$, conductor 174, position F of sampler 45, and ground. If channel 1 leads group B with selectors B–1–17 and I–B–19 both preset "on," the circuit will comprise these corresponding means connected between position I of gang $c$ of sampler 43–$c$, and front contact and armature $e$ of relay 1–57: conductor 138; gang $b$ of selector I–B–19 and back contact and armature $f$ of relay I–B–54, means not shown; conductor 116; gang $b$ of selector B–1–17; conductor 192; and indicator I–B–1–39.

At position G of sampler 45, if relay 1–57 has been operated, the connected intra-group cutoff relays 54 will be operated by these parallel circuits. If selectors A–1–17 I–A–19 are preset "on," battery again will be connected by conductor 138 to this circuit: gang $a$ of selector I–A–19, coil $a$ of intra-group cut-off relay I–A–54, conductor 112, gang $c$ of selector A–1–17, conductor 100, armature and front contact $c$ of relay 1–57, conductor 173, position G of sampler 45, and ground.

If selectors B–1–17 and I–B–19 are preset "on," the circuit will comprise these corresponding means connected between conductor 138 and front contact $c$ of relay 1–57: gang $a$ of selector I–B–19, and coil $a$ of relay I–B–54, means not shown; conductor 117; gang $c$ of selector B–1–17; and conductor 100.

Each operated cut-off relay 54 will lock up on its similar corresponding means: the ground input to its coil $a$ will lock up on its armature and front contact $c$ connecting ground; and the battery input of its coil $a$ will lock up on its front contact and armature $d$, conductor 133, armature and back contact $b$ of program final relay 60, and battery.

At position H of sampler 45, in the second and final revolution of its double-cycle, the lock-up of intra-group leading relay 1–57 will be disconnected in this manner. Cycle indexing relay 61 will be operated by the circuit comprising battery, coil $a$ of relay 61, conductor 176, position H of sampler 45, and ground; armature $b$ of relay 61 thereby disconnecting its back contact to break the lock-up of coil $a$ of relay 1–57. The armature and front contact $c$ of relay 61 again will connect one pulse to pulse halver 81, in a manner similar to the first cycle heretofore described, thereby releasing cycle recording relay 44.

At position J of sampler 45, net score temporary recorder 80 will be reset to its normal position at rest, by this circuit: ground, position J of sampler 45, conductor 177, armature and back contact $f$ of relay 44, and temporary recorder 80.

In each response function and combination of groups, at position 2 of sampler 45, channel address relay 2–30 will be operated by this circuit: battery connected by means corresponding to the means associated with relay 1–30, coil $a$ of relay 2–30, conductor 132, position 2 of sampler 45, and ground.

In each response function and combination of groups, the means in item analyzer 2–23, and the means in analyzer 23 of each additional channel not shown, are connected to corresponding means similarly to the means shown in item analyzer 1–23. Alternative connections are shown schematically in FIGS. 3 and 4 for channels 3 and 4.

In the second double-cycle of sampler 45, sampling the second combination of groups, designated combination II, the system will function similarly to the first double-cycle of first combination I, except for the following substitutions of corresponding means in the second cycle of sampler 45.

The meter comprising indicator II–41 will be connected by this circuit similar to combination I: recorder 80, the armature and front contact $e$ of relay 44, indicator II–41, gang $e$ of scanner 43 at its position II and closed contacts $h$ of the armature of its coil $b$, and recorder 80.

At position F of sampler 45, the circuits for intra-group leading indications will comprise these means. If channel 1 leads in group A, and selectors A–1–17 and II–A–19 are preset "on," battery will be connected to this circuit by position II of gang $c$ of scanner 43: conductor 139, gang $b$ of selector II–A–19, back contact and armature $f$ of relay II–A–54, conductor III, gang $b$ of switch A–1–17, conductor 191, indicator II–A–1–39, front contact and armature $d$ of relay 1–57, conductor 172, position II of gang $d$ of scanner 43 and closed contacts $g$ of the armature of its coil $b$, conductor 174, position F of sampler 45, and ground. If channel 1 leads in group B, and selectors B–1–17 and II–B–19 are both preset "on," the circuit will comprise these corresponding means connected between conductor 139 and front contact *d* of relay 1–57: gang *b* of selector II–B–19 and back contact and armature *f* of relay II–B–54, means not shown; conductor 116; gang *b* of selector B–1–17; conductor 192; and indicator II–B–1–39.

At position G of sampler 45, intra-group cut-off relays will be connected by these corresponding circuits. If selectors A–1–17 and II–A–19 are preset "on," battery will be connected by conductor 139 to this circuit: gang *a* of selector II–A–19, coil *a* of intra-group cut-off relay II–A–54, and conductor 112 with connections similar to first combination I. If selectors B–1–17 and II–B–19 are preset "on," the circuit will comprise these corresponding means, with their other connections similar to first combination I: conductor 139, gang *a* of selector II–B–19, and coil *a* of relay II–B–54, connections not shown; and conductor 117.

*Multiple choice response function*

If switch 1–16 is preset by the examiner in its position MC, abbreviated M in FIG. 6, for the multiple choice response function, all means will function similarly to the sequential response function heretofore described, except means hereinafter described which are connected by switch 1–16.

Each dialed pulse will be recorded by advancing one step the brush in gang *c* of stepping switch 1–51, by this circuit connected to gang *f*–MC of switch 1–16: coil *a* of switch 1–51, and ground.

When interdigital detector relay 1–25 is operated by the end of any dialed digit, the compartor recorder corresponding to the digit will be operated, and then the dialed pulse recorder will be reset, by these circuits.

The comparator recorder circuits comprise these means connected to gang *e*–MC of switch 1–16: conductor 160', closed contacts *g* of the armature of coil *b* of switch 1–51, its gang *c* at its position corresponding to the dialed digit with each position connected to the corresponding comparator recorder relay and with each operated recorder relay locking up similarly to response function SEQ.

The ten correct item indicators 1–37 are successively connected in series, connections not shown from the third and additional indicators. Gang *m*–MC of switch 1–16, similarly to its position SEQ, connects first indicator 1–37–*a* by conductor 181; and gang *a*–MC of switch 1–16 connects the tenth indicator by conductor 180.

The ten incorrect item indicators 1–38 are connected in series connections not shown for the third and additional indicators. Gang *o*–MC of switch 1–16, similarly to response function SEQ, connects first indicator 1–38–*a* by conductor 141, and gang *b*–MC of switch 1–16 connects the tenth indicator by conductor 140.

When a comparator recorder relay is released, its corresponding correct and incorrect indicators will be by-passed.

When a comparator recorder relay is operated, the corresponding incorrect indicator 1–38 will be by-passed if the respective dialed digit corresponds to a present digit, the corresponding correct indicator 1–37 will be connected in the channel's correct resistance, and the by-pass of such correct indicator will be disconnected. If the dialed digit does not correspond to a preset digit, the conditions of the indicators will be reverse. In all connections and by-passes of correct indicators 1–37 and incorrect indicators 1–38, each of the third to tenth indicators, connections not shown, are connected to corresponding means similarly to the second indicator.

For example, prior to the first dialed digit, first comparator recorder relay 1–52 and all other comparator recorder relays will be unoperated.

First relay 1–52 then will by-pass first correct indicator 1–37–*a* by this circuit: gang *m*–MC of switch 1–16, conductor 181, the back contact and armature *d* of first relay 1–52, connecting the back contact and armature *d* of second relay 1–53 which similarly by-passes second correct indicator 1–37–*b*. Each additional recorder relay similarly will be connected in series to conductor 180 and gang *a*–MC of switch 1–16.

The incorrect indicators 1–38 will be by-passed by this circuit connected to gang *o*–MC of switch 1–16: conductor 141, gang *k*–MC of switch 1–16 and back contact and armature *c* of first relay 1–52 to by-pass first incorrect indicator 1–38–*a*; conductor 142, gang *i*–MC of switch 1–16, the back contact and armature *c* of second relay 1–53, and conductor 143, to by-pass second incorrect indicator 1–38–*b*; and similar connections not shown of each additional recorder relay to corresponding means. The tenth by-pass will connect in series conductor 140 and gang *b*–MC of switch 1–16.

It is apparent that all by-passes of released comparator recorder relays and associated means are unaffected by the present position of ech corresponding switch in selector 18–MC.

If relay 1–52 is operated, and switch 18–MC–*a* preset "off," correct indicator 1–37–*a* will be by-passed by this circuit connected to gang *m*–MC of switch 1–16: conductor 181, gang L–MC of switch 1–16, conductor 145, gang *a'* of switch 18–MC–*a*, conductor 165, front contact and armature *d* of relay 1–52, and conductor 182.

Gang *o*–MC of switch 1–16 will connect conductor 141, and first incorrect indicator 1–38–*a*, which will connect either second incorrect indicator 1–38–*b*, or conductor 142. Similarly, if recorder 1–53 is operated, and switch 18–MC–*b* preset "off," correct indicator 1–37–*b* will be by-passed by conductor 182, gang *j*–MC of switch 1–16, conductor 147, gang *b'* of switch 18–MC–*b*, conductor 166, front contact and armature *d* of relay 1–53, and conductor 183; and the disconnected by-pass will leave second incorrect indicator 1–38–*b* connected in series between first incorrect indicator 1–38–*a* and the other incorrect indicators 1–38, connections not shown, the tenth such indicator connected to conductor 140 and gang *b*–MC of switch 1–16.

If relay 1–52 is operated, and switch 18–MC–*a* preset "on," gang *m*–MC of switch 1–16 will connect conductor 181 and first correct indicator 1–37–*a*, which will connect either second correct indicator 1–37–*b* or conductor 182. First incorrect indicator 1–38–*a* will be by-passed by this circuit: gang *o*–MC of switch 1–16, conductor 141, gang *a''* of switch 18–MC–*a*, conductor 146, front contact and armature *c* of relay 1–52, and conductor 142. Similarly, if relay 1–53 is operated, and selector 18–MC–*b* preset "on," the disconnected by-pass will leave second correct indicator 1–37–*b* connected in series between first correct indicator 1–37–*a* and the other correct indicator 1–37, connections not shown, the tenth such indicator connected to conductor 180 and gang *a*–MC of switch 1–16; and second incorrect indicator 1–38–*b* will be by-passed by this circuit: conductor 142, gang *b''* of switch 18–MC–*b*, conductor 148, front contact and armature *c* of relay 1–53, and conductor 143.

After such comparisons, this reset circuit will be connected to the delayed second front contact *b* of relay 1–25 by gang *c*–MC of switch 1–16: reset coil *b* of switch 1–51, and ground.

*Numerical-total response function*

If switch 1–16 is preset by the examiner in its position NT, abbreviated N in FIG. 6, for the numerical-total response function, each means in the system will function similarly to the sequential response function, except means connected by switch 1–16 and hereinafter described.

In a preset numerical-total comprising the two digits of a number, the first dialed digit will represent the "tens" digit, and the second dialed digit will represent the "units" digit.

In the first digit, each dialed pulse will be recorded by advancing one step the brush in second gang *d* of stepping switch 1–50, by battery connected to this circuit by gang *f*–NT of switch 1–16: the armature and back contact *c* of relay 1–59, coil *a* of switch 1–50, and ground. Each of the ten operated positions of gang *d* of switch 1–50 successively connects one of ten taps of its associated resistor *e*, the first tap cannecting ten units of resistance, such resistance increased ten units by each additional tap. Thus the first dialed digit connects resistance equalling ten times the digit. Gang *d* at rest bypasses resistor *e*. It is apparent that an indicator, not shown, could comprise each ten units of resistance.

When detector relay 1–25 is operated by the end of the first dialed digit, gang *c*–NT of switch 1–16 will connect battery to this circuit: coil *a* of tens switching relay 1–59, armature and back contact *d* of channel reset relay 1–84, conductor 154, gang *a* of switch 15, and ground; relay 1–59 then locked operated by its armature and front contact *b* connecting battery.

In the second digit, each dialed pulse will be recorded by advancing one step the brush in first gang *c* of stepping switch 1–51, by battery connected to this circuit by the front contact of armature *c* of relay 1–59: coil *a* of switch 1–51, and ground. Each operated step of switch 1–51 will connect and operate its corresponding comparator recorder relay, the circuit comprising battery, gang *d*–NT of switch 1–16, conductor 160′, closed contacts *g* of the armature of coil *b* of switch 1–51 and its gang *c*, and coil *a* of the respective comparator recorder relay and its associated means connected similarly to response function SEQ.

Position NT of gangs L, *k*, *j*, *i*, *h*, and *g* of switch 1–16 connect correct indicators 1–37 and incorrect indicators 1–38 similarly to response function MC. Thus each released comparator recorder relay by-passes both of its associated indicators, and each operated recorder relay disconnects the by-pass of one only of its respective correct and incorrect indicators responding to the associated switch in selector 18–NT, such switch preset "on" or "off."

Each connecting and by-passing means will be operative in association with the following circuit. At position 1 of sampler 45 with relay 1–30 operated in its usual manner, resistor *e* associated with switch 1–50, correct indicators 1–37, and incorrect indicators 1–38 will be connected in series by this circuit to comprise the input of inverter 49–NT: discriminator 76 of inverter 49–NT; conductor 101; front contact and armature *b* of relay 1–30; conductor 101′; gang *a*–NT of switch 1–16; resistor *e* of switch 1–50, its gang *d*, and closed contacts *g* of the armature of its coil *b*; conductor 180; successively connected in series, the tenth to the third correct indicators 1–37, not shown, and the second and first correct indicators 1–37–*b* and 1–37–*a*; conductor 181; successively gangs *n*–NT and *m*–NT of switch 1–16; conductor 141; first incorrect indicator 1–38–*a*, second incorrect indicator 1–38–*b*, and eight additional incorrect indicators 1–38, not shown; conductor 140; gang *p*–NT of switch 1–16; conductor 107′; armature and front contact *h* of relay 1–30; conductor 107; and discriminator 76 of inverter 49–NT.

Thus the inputs of each of scalers 20–*a* and 20–*b* will comprise only two conductors at any point of time. Conductor 101 comprises a common conductor for all response functions. For response functions SEQ and MC, conductor 107′ connecting inverter 49–NT will be disconnected by gang *p* of switch 1–16. For response function NT, the outputs of first subtractor 77 and second subtractor 78 of inverter 49–NT will comprise the respective inputs of scalers 20–*a* and 20–*b*, with conductors 102′, 103′, and 104′ respectively disconnected by gangs *a*, *b*, and *c* of switch 1–16.

If it is desired to delay the inputs of scalers 20 until after each input of inverter 49–NT has operated the means responding to it, or has been disconnected, such delay and disconnected means not shown may be associated with each such input means, connected in a manner apparent to persons skilled in the art.

The "tens" and "units" digits in a numerical-total dialed response comprise a two-digit numerical-total of items, each item correct or incorrect depending upon the similarity between the dialed and the preset numerical-total. Each dialed item up to and including the preset numerical-total comprises a correct item. Each excessive or deficient item in the response, in comparison with the preset numerical-total, comprises an incorrect item. Each dialed item in a NT response is represented by one unit of channel resistance.

For example, if the correct numerical-total is "fifty-six," the system will be preset in this manner. Variable resistor 22–*x* will be preset at fifty-six units of resistance, representing 100% standard of accuracy. The units digit will be preset by first switch *a*, second switch *b*, and the next four switches of correct item selector 18–NT preset "on," with its other four switches preset "off." Corresponding means in selector 18–NT for the "tens" digit are not shown; if such means are desired, they will comprise indicators and associated means substituted for tens resistor *e* associated with switch 1–50, connected to corresponding means similarly to the units digit.

If "seventy-three" is the NT response of channel 1, its channel resistance will comprise seventy units in resistor *e* of switch 1–50, and one unit each in the first three correct item indicators 1–37 comprising indicators *a*, *b* and third indicator not shown, totaling seventy-three units of resistance.

One unit of integer resistance will be connected as the second input of multiplier 75 by this circuit: conductor 105, front contact and armature *f* of relay 1–30, conductor 105′, resistor 1–58, conductor 106′, armature and front contact *g* of relay 1–30, and conductor 106.

If it is desired to provide an integer input to multiplier 75 separate from the similar input of divider 46, such separate integer input may comprise additional parallel means not shown, similarly connected to means corresponding to the integer input means of divider 46. Any other desired parallel input of inverter 49–NT may be provided in a similar manner.

Discriminator 76 of inverter 49–NT comprises means biased to operate by its first output its associated coil *a* of relay 82 only if the resistance connected by the first input to discriminator 76 is equal to or less than the resistance connected by its second input. First subtractor 77 and second subtractor 78 of inverter 49–NT each comprises means whereby its output of current equals its first current input minus its second current input.

In this example, when relay 1–30 is operated, the resistance connected to the first current input of discriminator 76 by conductors 101 and 107 will comprise seventy-three units, and the resistance connected to its second current input will comprise fifty-six units in standard of accuracy 22–*x* multiplied by current through the one unit of integer resistance comprising the second input of multiplier 75.

With relay 82 released, the subtractors will be connected in this manner. First input of second subtractor 78 will comprise current through seventy-three units, connected by this circuit: subtractor 78, armature and back contact *c* of relay 82, conductor 107 connecting the NT resistance of channel 1, common conductor 101, armature and back contact *e* of relay 82, and subtractor 78. Its second input will comprise current through fifty-six units, connected by this circuit: subtractor 78, armature and back contact *b* of relay 82, multiplier 75, back contact and armature *d* of relay 82, and subtractor 78. Thus the output of second subtractor 78 will comprise current through seventeen units of resistance, connected both as the input of incorrect scaler 20–*b* through conductors 103 and 104, and also by parallel connections as the second input of first subtractor 77. Its first input will comprise current through fifty-six units connected by this circuit: first subtractor 77, multiplier 75, and first subtractor 77. Thus the output of first subtractor 77 will comprise current through thirty-nine units of resistance, connected as the input of scaler 20–a, through conductors 101 and 102.

If "thirty-nine" is the NT response of channel 1, its channel resistance will comprise thirty units in resistor e of switch 1–50; one unit each in the first six correct item indicators 1–37; and one unit each in the seventh, eighth, and ninth incorrect item indicators 1–38; totaling thirty-nine units of resistance and comprising the resistance to the first current input of discriminator 76, with the resistance to its second current input again fifty-six units.

With relay 82 thereby operated, the subtractors will be connected in this manner. The inputs of second subtractor 78 will be inverted, so that its first input will comprise current through fifty-six units, connected by this circuit: subtractor 78, armature and front contact c of relay 82, multiplier 75, front contact e of relay 82, and subtractor 78. Its second input will comprise thirty-nine units, connected by this circuit: subtractor 78, armature and front contact b of relay 82, conductor 107 connecting the NT resistance of channel 1, common conductor 101, front contact and armature d of relay 82, and subtractor 78. Thus the output of second subtractor 78 again will comprise current through seventeen units of resistance. The outputs of both subtractors 78 and 77, and both inputs of first subtractor 77, will be connected similarly to the connections with relay 82 released. Thus the input of scaler 20–a again will comprise current through thirty-nine units of resistance, and the input of scaler 20–b again will comprise current through seventeen units.

Thus dialed NT responses of seventy-three and thirty-nine will result in the same two inputs to scaler 20, because each of the two responses is equally divergent from the preset correct numerical-total, fifty-six.

If the examiner desires to score channel responses by adding one unit for each correct item, and subtracting one unit for each incorrect item, the output of subtractor 47 will comprise current through thirty-nine units minus current through seventeen units, or a net score comprising a positive current through twenty-two units as the input of divider 46. Inasmuch as the integer input of divider 46 will comprise current through one unit connected by conductors 105 and 106, similarly to response function SEQ, the output of divider 46 will be the same as its input.

*Inter-group comparisons*

Group A will comprise the channels with their respective switches A–17 preset "on." For example, if group selector A–1–17 is preset "on," the system will be connected to channel 1 in the manner hereinafter described. Corresponding means in each item analyzer 23 are connected similarly to the means shown in item analyzer 1–23.

In group A, if its respective channel switches 16 are preset in their SEQ or MC positions, the inter-group correct resistance will be connected as the input of correct scaler 20–a by this circuit, when group address relay A–30 is operated: scaler 20–a, conductor 101, front contact and armature f of group address relay A–30, conductor 120, gang d of group selector A–1–17, conductor 101′, gang a of switch 1–16 and its connected means similar to an intra-group comparison, gang n of switch 1–16, conductor 102′, gang c of selector A–1–17, conductor 120′, the corresponding means of item analyzer 2–23, conductor 120″, the corresponding means of all other channels, conductor 102, and scaler 20–a. If selector A–1–17 is preset "off," the correct resistance of channel 1 is by-passed by these connections: conductor 120, gang e of selector A–1–17, and conductor 120′.

In group A, the inter-group incorrect resistance will be connected at the input of scaler 20–b by this similar circuit: scaler 20–b, conductor 103, front contact and armature e of relay A–30, conductor 121, gang f of selector A–1–17, conductor 103′, gang b of switch 1–16 and its connected means similar to an intra-group comparison, gang o of switch 1–16, conductor 104′, gang g of selector A–1–17, conductor 121′, the corresponding means of item analyzer 2–23, conductor 121″, the corresponding means of all other channels, conductor 104, and scaler 20–b. If selector A–1–17 is preset "off," the incorrect resistance of channel 1 is by-passed by similar connections to means corresponding to the correct resistance by-pass.

In group A, the inter-group integer resistance will be connected as the second inputs in parallel of multiplier 75 and divider 46, by this similar circuit through conductor 105, front contact and armature d of relay A–30, conductor 122, gang h of selector A–1–17, conductor 105′, resistor 1–58, conductor 106′, gang i of selector A–1–17, conductor 122′, the corresponding means of item analyzer 2–23, conductor 122″, the corresponding means of all other channels, conductor 106, and the second connection to multiplier 75 and to divider 46. If selector A–1–17 is preset "off," the integer resistance of channel 1 is by-passed by similar connections to means corresponding to the correct resistance by-pass.

In group A, if its respective channel switches 16 are preset in their NT positions, the inter-group numerical-total resistance will be connected as the first input of discriminator 76 by this similar circuit: discriminator 76, conductor 107, front contact and armature c of relay A–30, conductor 123, gang j of selector A–1–17, conductor 101′, gang a of switch 1–16 and its connected means similar to an intra-group comparison, gang p of switch 1–16, conductor 107′ gang k of selector A–1–17, conductor 123′, the corresponding means of item analyzer 2–23, conductor 123″, the corresponding means of all other channels, conductor 101, and discriminator 76. If selector A–1–17 is preset "off," the numerical-total resistance of channel 1 is by-passed by similar connections to means corresponding to the correct resistance by-pass.

In connecting group B resistances, the following means associated with group B correspond to the respective means associated with group A: address relay B–30, to relay A–30; conductors 125, 126, 127, and 128, to conductors 120, 121, 122, and 123 respectively; selector B–1–17, to selector A–1–17; conductors 125′, 126′, 127′, and 128′, to conductors 120′, 121′, 122′, and 123′ respectively; and similar means in additional channel analyzers 23.

Conductors 101, 102, 103, 104, 105, 106, and 107 are common to all groups.

Means of group B and all other groups are connected to corresponding means similarly to means of group A.

If group A is preset in combination I by selector I–A–19 preset "on," then relay A–30 will be operated when the rotor of master sampler 45 contacts its position A corresponding to first group A. The circuit will be: battery, closed contacts f of the armature of coil b of scanner 43 and position I of its gang c, conductor 138, gang a of selector I–A–19, back contact and armature e of relay I–55, coil a of relay A–30, conductor 135, position A of sampler 45, and ground.

When gang c of combination scanner 43–c advances to its position II, similar conditions of corresponding means comprising conductor 139, selector II–A–19 and back contact and armature e of relay II–A–55, will operate relay A–30.

If selector I–B–19 is preset "on," then relay B–30 similarly will be operated at position B of sampler 45 by these similar connections among corresponding means not shown in group analyzer B–28: the usual connection of battery by conductor 138, gang a of selector I–B–19, back contact and armature e of relay I–55, coil a of relay B–30, conductor 136, position B of sampler 45, and ground. Combination II comprises similar connections among means corresponding to means of combination I.

Position C of sampler 45, and conductor 137, are connected to corresponding means of analyzer C-28 similarly to the means of analyzer A-28.

In inter-group comparisons, sampler 45 will connect the same means as in an intra-group comparison except for these corresponding means, similarly connected.

In the first cycle of the first double-cycle of sampler 45, at its position A, relay A-30, if operated, will close its armatures and contacts similarly to the intra-group comparison of channel 1 and will connect to scalers 20-a and 20-b their inputs comprising the group's correct and incorrect resistances, and to divider 46 and to inverter 49-NT their inputs comprising the integer resistance of group A.

The net score of group A will be averaged by divider 46 to determine its output comprising an average net score comparable to its output in an intra-group comparison.

At positions B and C of sampler 45, similarly to its position A, relays B-30 and C-30 if operated, successively will connect the resistances of groups B and C.

If the net score of group A equals or exceeds the highest inter-group or intra-group score recorded in net score temporary recorder 80 in the first cycle of first combination I, the system in its second cycle will function similarly to an intra-group comparison.

At position A of sampler 45, corresponding to its position 1 in an intra-group comparison, front contact and armature $c$ of relay 83 will operate relay A-56 by this circuit: battery, coil $a$ of relay A-56, armature and front contact $b$ of relay A-30, conductor 108, and its usual connected means; with locking ground for relay A-56 connected by its front contact and armature $b$, conductor 170, and its usual connected means.

If the respective selector 19 for combination I has been preset "on," and the respective leading relay 56 has been operated, the system will function in this manner at positions F and G of sampler 45.

At position F of sampler 45, the inter-group leading indicator A-40 corresponding to combination I will be energized by this circuit: battery, indicator I-A-40, conductor 171', front contact and armature $c$ of relay A-56, conductor 171, position I of gang $d$ of scanner 43 and the closed contacts $g$ of the armature of its coil $b$, conductor 174, position F of sampler 45, and ground.

Leading indicator I-B-40 will be energized by similar connections among corresponding means comprising relay B-56 and conductor 171", with such connections not shown in group analyzer B-28.

At position G of sampler 45, inter-group cut-off relay I-55 will be operated by this circuit: battery and its usual connection by conductor 138, gang $a$ of selector I-A-19, coil $a$ of relay I-55, front contact and armature $c$ of relay A-56, and conductor 173 and its associated means similar to an intra-group comparison. Coil $a$ of relay I-55 may be operated by parallel connections not shown, to means in analyzer B-28 or C-28 corresponding to similar means in analyzer A-28.

Operated relay I-55 will lock up on its associated means corresponding to the means for the lock-up of intra-group cut-off relays 54.

At position H of sampler 45, in the second and final revolution of its first double-cycle, the lock-up of leading relay A-56 by its front contact and armature $b$ and conductor 170, will be disconnected similarly to intra-group leading relay 1-57.

In the second double-cycle of sampler 45, sampling group combination II, the system will function similarly to combination I, with these substitutions of corresponding means.

In the first cycle of sampler 45, relays 30 will be operated at their respective positions A, B, and C, similarly to combination I, if relays 30 are connected by corresponding means of combination II heretofore described.

If the respective selector II-19 has been preset "on,"
and the respective leading relay 56 has been operated, the system will function in this manner at positions F and G of sampler 45.

At position F of sampler 45, this circuit will energize indicator II-A-40: battery indicator II-A-40, conductor 172', front contact and armature $d$ of relay A-56, conductor 172, and position II of gang $d$ of scanner 43 connecting ground similarly to its position I.

For group B, the corresponding parallel means will comprise indicator II-B-40, conductor 172", and relay B-56.

At position G of sampler 45, the circuit for group A will comprise battery connected as usual by conductor 139, gang $a$ of selector II-A-19, coil $a$ of inter-group cut-off relay II-55, front contact and armature $c$ of relay A-56, conductor 173, and its associated means similar to an intra-group comparison.

Coil $a$ of relay II-55 may be operated by parallel connections not shown, to means in analyzer B-28 or C-28 corresponding to the similar means of analyzer A-28.

Operated relay II-55 will lock up on its associated means corresponding to the means for lock-up of intra-group cut-off relays 54.

In FIGS. 5 to 13, a group may comprise channels with each respective switch 16 preset in its position SEQ or MC, or a group may comprise channels similarly preset in position NT. If it is desired to combine in one group channels preset in position NT with channels preset in positions SEQ and MC, their respective outputs may be analyzed separately, and thereafter combined, by provision of additional means not shown, in this manner. Channels preset NT may be connected to inverter 49-NT, with its correct and incorrect outputs each connected to its respective intermediate adder. The outputs of channels preset SEQ and MC similarly may be connected respectively to the same intermediate adders. A third such adder may also be provided for the integer outputs of all channels. These means may be connected by additional similar parallel means not shown, corresponding to means shown in analyzers 23 and 28. The outputs of the respective intermediate adders for correct, incorrect, and integer resistances, representing the outputs for the combined channels in the group, may comprise the inputs of scalers 20 and divider 46, similarly to an intra-group comparison.

In numerical-total, inter-group comparisons, to determine correct and incorrect items separately for each channel, rather than for each group as a single entity, means corresponding to inverter 49-NT may be provided in each item analyzer 23, with means provided in group analyzer 28 to combine the respective channel outputs to comprise inputs of analyzer 29 similarly to response function SEQ.

*Programs of comparisons*

A program comprises these events, at the respective cycles and positions of sampler 45.

In the first cycle of the first double-cycle of sampler 45, with the first combination connected by scanner 43 by its gangs at their respective positions I, the address relay 30 of each selected channel and group will be operated at its respective position of sampler 45. The highest net score will be recorded by temporary recorder 80.

At position H, cycle recording relay 44 will be operated and locked up.

In the second cycle of the first double-cycle, each respective leading relay 56 and 57 will be operated and locked up at the address of sampler 45 corresponding to each channel or group with a net score equaling the highest net score as indicated by master degree of accuracy indicator I-41.

At position $y$, master degree of accuracy indicator 41-$y$ will be energized if its preset standard of accuracy is equalled or exceeded by the highest net score.

At position F, the respective connected leading indicators 39 and 40 corresponding to each intra-group and inter-group comparison in combination I will be energized for each channel and group with the highest net score.

At position G, the respective cut-off relays 54 and 55 will be operated and locked up, corresponding to each intra-group and inter-group comparison for which at least one leader has been determined in that double-cycle.

At position H, the lock-up of cycle recording relay 44, and of all leading relays 56 and 57, will be disconnected.

Figure 14:
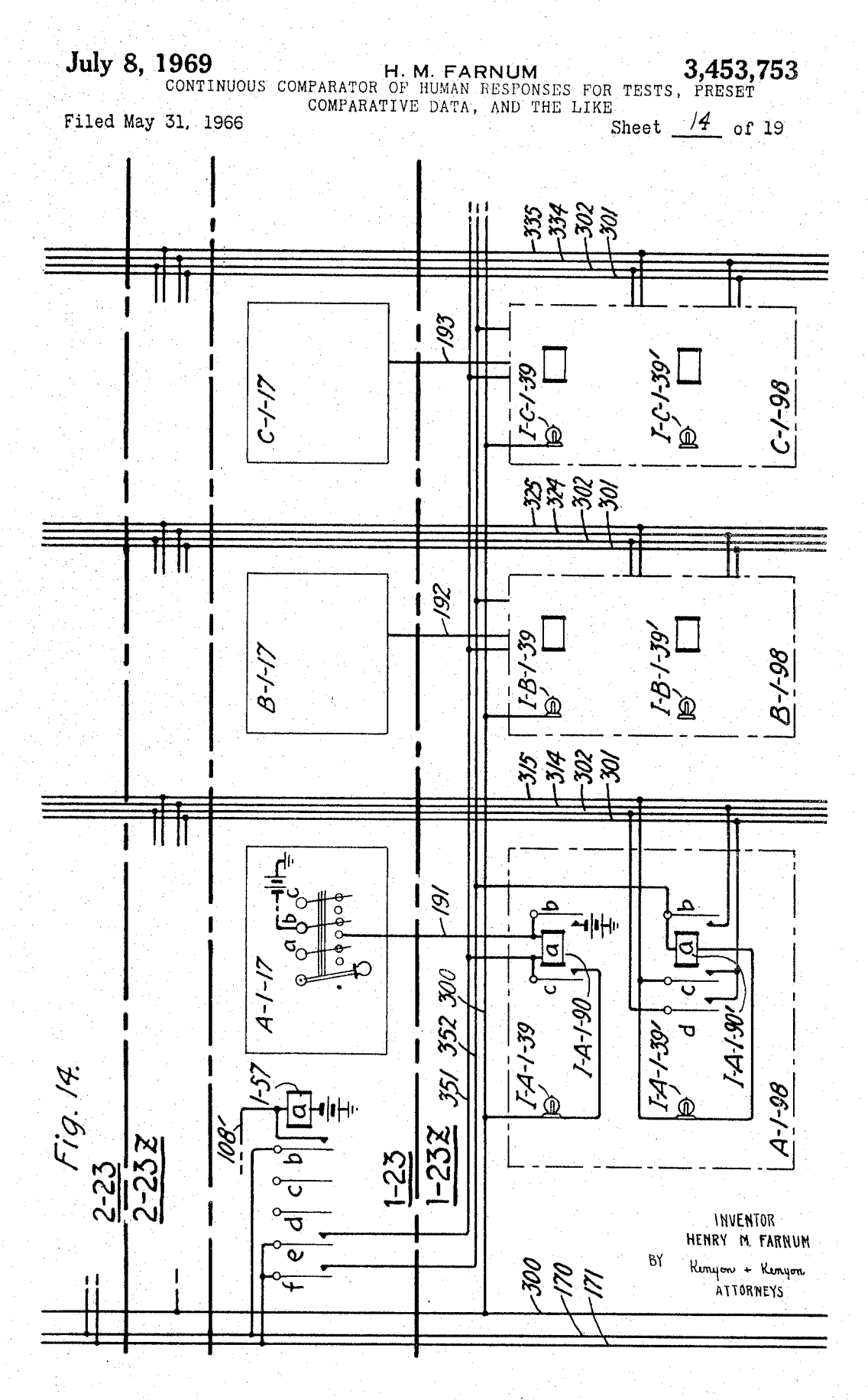

Thus inter-group leading indicator 40 will have been energized during the time interval between positions F and H of sampler 45; and leading indicators 39, between positions F and G. If desired, means may be provided to hold the indications for an additional time interval, for example until position H of the second cycle of the next double-cycle, as shown in FIGS. 14 to 16.

Released relay 44 will index each of the gangs of combination scanner 43 to position II by this circuit: battery, coil $a$ of scanner 43, back contact and armature $h$ of relay 44, and ground.

At position J of sampler 45, temporary recorder 80 will be reset to its zero position by this circuit to ground: recorder 80, back contact and armature $f$ of relay 44, conductor 177, position J of sampler 45, and ground.

In the second double-cycle of sampler 45, with combination II connected by scanner 43 with its gangs at their respective positions II, all means will be connected to corresponding means similarly to the first double-cycle of combination I.

At position H of the second cycle, combination scanner 43 will be indexed to its next and final position, and thereby reset to its initial position I by this circuit: battery, closed contacts $f$ of the armature of coil $b$ of scanner 43, its gang $c$ at its final position, its reset coil $b$, and ground. Means not shown, associated with its operated coil $b$, will disengage both the indexing and resetting ratchets of scanner 43 until it is completely reset.

If it is desired to provide that selectively the leaders of only one combination will be determined in a program, additional gangs $d$ not shown may be provided in each combination selector 19, with an additional front contact and armature of each of inter-group cut-off relays 55 connected and by-passed thereby similarly to the connections between front contact and armature $b$ of each of relays 54 and associated gang $c$ of the corresponding selector 19.

At position G of sampler 45 in the second cycle of any double-cycle, if all cut-off relays are operated or by-passed, coil $a$ of program index relay 60 will be operated by this circuit: ground; front contact and armature $b$ of each of inter-group cut-off relays II–55 and I–55; series connected to the by-passing "off" contact of gang $c$ of selector I–A–19 in parallel with the front contact and armature $b$ of intra-group cut-off relay I–A–54 connecting the "on" contact of gang $c$ of selector I–A–19; series connections to gang $c$ of each of selectors I–B–19, I–C–19, II–C–19, and II–B–19 not shown, each connected to corresponding means similarly to selector I–A–19; similar connections to selector II–A–19; conductor 134; coil $a$ of program index relay 60; and battery.

When relay 60 is operated, its armature and back contact $b$ will disconnect the lock-ups of the coils $a$ of all operated cut-off relays 54 and 55, connected by circuits heretofore described. Master sampler 45 then will start the second in its continuous series of programs of comparisons.

If the examiner should desire to stop the continuous series of programs, he manually may set program disconnect switch 85 in its "off" position, to operate master cut-off relay 73 at position G of sampler 45, by the circuit heretofore described.

When relay 73 operates, this circuit energizing motor M of sampler 45 will be disconnected: battery, motor M of sampler 45, conductor 179, back contact and armature $b$ of relay 73, and ground.

The duration of the contact of position G of sampler 45 is timed to permit continuous contact with its rotor while its disconnected motor M is braked to a stop. It is apparent that the circuit operating relay 73 alternatively may be connected in series to other means, such as an additional armature and front contact not shown of relay 60, if it is desired to stop motor M of sampler 45 only at the end of a program.

If the subject at dial 1–12 should desire to reset his response means to their normal positions, for example to erase a mistake, he manually may press channel reset switch 1–13, operating channel reset relay 1–84 by this circuit: battery, coil $a$ of relay 1–84, conductor 158, switch 1–13, and ground. Connected means heretofore described associated with armature and back contact $d$ of operated relay 1–84 will disconnect any lock-ups of tens switching relay 1–59 and comparator recorder relays 1–52, 1–53, and additional similar relays not shown. The reset coil $b$ of relay 1–50 will be operated by this circuit: battery, front contact and armature $b$ of relay 1–84, reset coil $b$ of switch 1–50, and ground. Connections heretofore described of contacts $f$ and $g$ of the armature of energized coil $b$ of relay 1–50 will disconnect the arm of each associated gang of switch 1–50. The reset coil $b$ of relay 1–51 will be operated by this circuit: battery, front contact and armature $c$ of relay 1–84, reset coil $b$ of switch 1–51, and ground. Connections heretofore described of contacts $g$, $h$, and $i$ of the armature of energized coil $b$ of relay 1–50 will disconnect the arm of each associated gang of switch 1–51. If it is desired to prevent transient item indications by circuits connected by the gangs of stepping switches 1–50 or 1–51 during the period of delay in energization of their respective reset coils $b$, each such gang may comprise delay means for such period.

If it is desired to provide means in master analyzer 29 to inactivate selected channel resetting means 13, a conductor not shown, common to the selected channels, may be provided for the battery input of the coil $a$ of each reset relay 84, with such battery selectively connected by a manual switch not shown in analyzer 29.

If for example, when sampler 45 is stopped at the end of a continuous series of programs, the examiner may desire to reset the responses in analyzer 23 of all channels, he manually may operate master reset switch 15. Its gang $a$ then will disconnect locking ground similarly to each channel reset 13, by this circuit: ground, break contact $a$ of switch 15, and conductor 154, connected in parallel to the back contact and armature $d$ of each relay 1–84. Gang $b$ of switch 15 will operate each reset relay 48, by parallel connections to each analyzer 23 similar to this circuit of analyzer 1–23: battery, make contact $b$ of switch 15, conductor 155, coil $a$ of relay 1–48, and ground. Operated relay 1–48 will connect battery to the back contact and armature $b$ of relay 1–84 by the front contact and armature $b$ of relay 1–48, and will connect battery to the back contact and armature $c$ of relay 1–84 by the front contact and armature $c$ of relay 1–48. Thus all means associated with operated switch 1–15 will be reset to their normal positions. Transient connection of gang $c$ of switch 1–50 may be disconnected by an armature and back contact not shown, associated with relay 1–48.

If it is desired to eliminate relays 48, the back contact of each of armatures $b$ and $c$ of relay 1–84 may be connected to parallel means similar to conductor 155 and gang $b$ of switch 15.

Methods of weighting any net score or its components, are described for example in the book Electronic Instruments by Greenwood, et al.; New York, McGraw-Hill Book Co., Inc., 1948; a report under the auspices of the Office of Scientific Research and Development, National Defense Research Committee; particularly in chapter 3, "Arithmetic Operations," including its "Change of Scale" section on p. 61.

The scoring relationships among "correct," "incorrect," and "unanswered" items may be preset. For example, all unanswered items may be scored as "zero." Change of scale means to multiply or divide the scores may be provided to preset the ratio among the respective scoring factors; for example, correct scaler 20–*a* and incorrect scaler 20–*b*. Similar means may be provided in association with any arithmetic means, e.g. at the integer input of divider 46, or at the input of net score temporary recorder 80.

Preset constants comprising master variable resistances may be provided, similarly to means for change of scale, so that all scores will be positive, and to provide impedance when associated means are by-passed.

If it is desired to vary any of the scoring factors according to response function preset by switches 16, or according to combinations connected by scanner 43, such scoring variables may be connected by additional gangs, not shown, for the respective means.

Recording of outputs

In a continuous program of comparisons, leading indications and associated analyzer output data may be recorded temporarily, for the time interval of each program; or may be recorded permanently by one of four conditions, (1) time, (2) speed, (3) accuracy, or (4) manual operation.

Means for such recorded leading indications are shown in FIGS. 14, 15, and 16. Analyzers comprising such recording means are designated by the suffix Z. FIG. 14 shows analyzers 1–23–Z and 2–23–Z, and associated means in analyzers 1–23 and 2–23. FIG. 15 shows analyzer 28–Z which also comprises analyzers A–28–Z, B–28–Z, and C–28–Z, associated with means in analyzer 28. FIG. 16 shows analyzer 29–Z, and associated means in analyzer 29.

When FIGS. 14, 15, and 16 are positioned according to the diagram shown in FIG. 18, the respective means are connected by these conductors. Conductors 170, 171, 300, 301, and 302 are common to analyzers in each of FIGS. 14, 15, and 16. Conductors 303 and 311 connect analyzer 29–Z to the common means and to the means of each group in analyzer 28–Z. Conductor 314 connects analyzer 29–Z to the means of group A in analyzers 28–Z and 1–23–Z. Conductor 324 similarly connects the means of group B, and conductor 334 similarly connects the means of group C. Conductor 315 connects means of group A in analyzers 28–Z and 1–23–Z. Conductor 325 similarly connects the means of group B, and conductor 335 similarly connects the means of group C. Analyzers 2–23 and 2–23–Z comprise means connected similarly to the corresponding means of analyzers 1–23 and 1–23–Z.

These means of analyzer 1–23 are shown in FIG. 14: relay 1–57 comprising its coil *a* and armatures and front contacts *b*, *e* and *f*, and associated conductor 108′; and selector A–1–17 comprising its gang *b* associated with conductor 191, and similar means of selectors B–1–17 and C–1–17 respectively associated with conductors 192 and 193.

Analyzer 1–23–Z comprises these means in channel recorder A–1–98: indicator lock-up relay I–A–1–90 comprising its coil *a* and armatures and front contacts *b* and *c*; intra-group leading indicator I–A–1–39; relay I–A–1–90′ comprising its coil *a* and armatures and front contacts *b*, *c*, and *d*; and indicator I–A–1–39′. In analyzer 1–23–Z, channel recorders B–1–98 and C–1–98 each comprise means similar to corresponding means of recorder A–1–98.

These means of analyzer 28 are shown in FIG. 15: in analyzer A–28, relay A–56 comprising its coil *a* and armature and front contacts *b*, *c*, and *f*; and similar means in each of analyzer B–28 and C–28.

Analyzer 28–Z comprises these means common to all groups: recording cut-off relay I–91 comprising its coil *a*, and armature *b* with front contact and with back continuity contact; and resistor I–99. Analyzer A–28–Z comprises these means: indicator lock-up relay I–A–90 comprising its coil *a* and armature and front contact *b*; inter-group leading indicator I–A–40; relay I–A–90′ comprising its coil *a* and armatures and front contacts *b*, *c*, and *d*; and recording cut-off relay I–A–91 comprising its coil *a*, and armature *b* with front contact and with back continuity contact. Analyzers B–28–Z and C–28–Z each comprise means similar to analyzer A–28–Z.

These means of analyzer 29 are shown in FIG. 16: master reset 15 comprising its gang *a*; combination scanner 43 comprising its gang *d* associated with contacts |*g* of the armature of its coil *b*, and similar means not shown in FIG. 13 comprising its gang *i* associated with similar contacts *j*; cycle recording relay 44 comprising its coil *a* and armature and front contact *g*; master sampler 45 comprising its position F and additional position E not shown in FIG. 12; cycle index relay 61 comprising its coil *a* and armature and back contact *b*; and accuracy relay y–74 comprising its coil *a* and additional armatures and front contacts *d* and *e* not shown in FIG. 13.

Analyzer 29–Z comprises these means: response period timer I–21 comprising the coil *a* of a dashpot relay, and its armature and front contact *b*; recording switch I–33 comprising a manual switch with its ten similar gangs successively designated *a* to *j* and additional similar gangs not shown, each gang with three positions designated (1) "time," (2) "speed," and (3) "accuracy"; master recording indicators I–42–*a* and I–42–*b*; timer switch I–86 comprising a manual switch with its two positions designated "automatic" and "manual"; manual recording button I–88 comprising open contacts; recording detector relay I–89 comprising its coil *a* and armature *b* with first front contact that closes before its second front contact; recording reset button I–92 comprising a manual switch with closed contacts; time lock-up relay I–95 comprising its coil *a* and armatures and front contacts *b* and *c*; accuracy lock-up relay I–96 similar to relay I–95; and recorder reset relay I–97 comprising its coil *a* and armature and back contact *b*.

Leading indications may be reecorded temporarily, for the time interval of each program, in this manner.

In each double-cycle of sampler 45 corresponding to combination I, if leading indicator I–A–40 would be operated in the system shown in FIGS. 5 to 13 at position F of sampler 45, indicator I–A–40 temporarily will be locked operated until the next double-cycle of sampler 45, by these means of group analyzer A–28–Z in FIG. 15. Indicator lock-up relay I–A–90 will be operated by this circuit: battery, coil *a* of relay I–A–90, front contact and armature *e* of relay A–56, conductor 171 comprising the impedance of resistor I–99, position I of gang *d* of scanner 43 and contacts *g* of the armature of its coil *b*, conductor 174, position F of sampler 45, and ground. Inter-group leading indicator I–A–40 then will be energized by this circuit locking up relay I–A–90: battery, coil *a* of relay I–A–90, its armature and front contact *b*, indicator I–A–40, coductor 300, armature and back contact *b* of recorder reset relay I–97, and ground. The by-pass of such lock-up by conductor 171 is prevented by resistor I–99.

Each means in group analyzers B–28–Z and C–28–Z is connected to corresponding means similarly to means in analyzer A–28–Z.

In channel recorder A–1–98 in FIG. 14, if leading indicator I–A–1–39 would be operated in the system shown in FIGS. 5 to 13, indicator lock-up relay I–A–1–90 will be operated by its connections to conductor 171 similarly to relay I–A–90, by this circuit: battery connected through the "on" position of switch *b* of selector A–1–17 and conductor 191, coil *a* of relay I–A–1–90, conductor 351, and front contact and armature *e* of relay 1–57 grounded through conductor 171 comprising resistor I–99. Indicator I–A–1–39 then will be energized by this circuit locking up relay I–A–1–90: front contact and armature *b* of relay I–A–1–90, its coil *a* and its armature and front contact *c*, indicator I–A–1–39, and conductor 300 grounded as heretofore described.

In channel recorders B–1–98 and C–1–98, conductors 192 and 193 each respectively corresponds to conductor 191 in recorder A–1–98.

The locking ground of all relays 90 will be disconnected at position E of sampler 45, by armature and back contact b of recorder reset relay I–97 operated by this circuit: battery, coil a of relay I–97, position I of gang i of scanner 43 and contact j of the armature of its boil b, position E of samples 45, and ground.

These temporarily recorded indications may be recorded permanently by corresponding indicators designated ('), in this manner. For automatic recording, recording selector I–87 will be preset in its position designated "automatic."

If the examiner should desire permanently to record indications in combination I at the end of a determinable time interval, he will preset these means: selector I–33 in its position 1 designated "time"; response period timer I–21, comprising a dash-pot relay, in its adjustable position corresponding to the desired interval of delay; and timer switch I–86 in its "on" position to start the time interval.

Relay I–21 will be operated at the end of the preset time interval, by this circuit: battery, coil a of relay I–21, switch I–86 in its "on" position, and ground.

Recording detector relay I–89 then will be operated at position F of sampler 45, in its second cycle, by this circuit: battery, front contact and armature g of relay 44, selector I–87 in its "automatic" position, gang a of selector I–33 in its position 1, armature and front contact b of relay I–21, coil a of time lock-up relay I–95, position 1 of bang b of selector I–33, and coil a of relay I–89, grounded by conductor 171 as heretofore described.

Operated relay I–95 will lock up, and energize master recording indicator I–42–a, in this manner: battery connected by the armature and front contact b of relay I–95; and locking ground connected by its armature and front contact c, indicator I–42–a, the closed contact of recording reset button I–92, and the closed contact a of master reset switch 15.

If recording cut-off relay I–91 is unoperated, indicator lock-up relay I–A–90' will be operated by the first front contact b of relay I–89, by this circuit: battery, armature and first front contact b of relay I–89, conductor 301, armature and back contact b of relay I–91, conductor 310, indicator I–A–40', coil a of relay I–A–90', front contact and armature f of relay A–56, conductor 171 in series with resistor I–99, and ground connected as heretofore described.

When relay I–A–90' has operated, resistor I–99 will prevent any by-pass of relay I–91 which then will be operated by this circuit: continuity contact b of relay I–91 connecting conductor 301 to conductor 310, to connect battery as heretofore described to coil a of relay I–A–90', its armature and front contact b, conductor 311, coil a of relay I–91, conductor 303, position 1 of gang c of selector I–33, and recording reset button I–92 grounded as heretofore described. Operated relays I–A–90' and I–91 will be connected to locking battery by this circuit after continuity contact b of relay I–91 has opened: battery, front contact and armature b of relay I–91, conductor 301, front contact and armature c of relay I–A–90', indicator I–A–40', and coil a of relay I–A–90' grounded as heretofore described.

The second front contact b of relay I–89, which will close after its first front contact b, then will operate each unoperated recording cut-off relay in this manner. Relays I–A–91, I–B–91, and I–C–91 each comprise means similar to relay I–91, similarly connected to corresponding means. Relay I–A–91 will be operated by this circuit: battery, second front contact b of relay I–89, gang e of selector I–33 at its first position, conductor 314, and coil a of relay I–A–91, grounded by conductor 303 as heretofore described. In the similar circuits operating relays I–B–91 and I–C–91, conductors 324 and 334 respectively correspond to conductor 314, and gangs f, and g not shown, respectively correspond to gang c of selector I–33. Corresponding means associated with relay I–91 comprise conductor 311 and gang d of selector I–33.

For permanent recording of intra-group leading indications, each means of channel analyzer 1–23–Z is connected to corresponding means similarly to the inter-group recording means of group analyzer 28–Z. Such corresponding means comprise indicator I–A–1–39' to I–A–90', relay I–A–1–90' to I–A–90', conductor 315 to 310, conductor 314 to 311, and asociated relay 1–57 to A–56.

Each means of channel recorders B–1–98 and C–1–98 is connected to corresponding means similarly to the means of channel recorder A–1–98. Each corresponding means comprise indicators I–B–1–39' and I–C–1–39', to I–A–1–39'; conductors 325 and 335, to 315; and conductors 324 and 334, to 314.

The disconnected back contact b of each recording cut-off relay, similar to relay I–91, will disconnect the coil a of each associated indicator lock-up relay 90' in each subsequent double-cycle of combination I.

Thus, when relay I–21 operates at the end of the preset time interval, each permanent recording indicator I–40' and I–39' corresponding to an energized temporary recording indicator will be energized permanently, and all deenergized permanent recording indicators I–40' and I–39' will be disconnected, without affecting temporary recording indicators I–40 and I–39.

If the examiner later should desire to reset the permanent recording indicators by releasing the lock-up of each associated relay 90' of combination I, he will disconnect locking ground by means of recording reset button I–92.

If the examiner should desire permanently to record indications in combination I of each response in each inter-group and intra-group comparison which is first to achieve the preset standard of accuracy represented by resistor y–22 shown in FIG. 13, the examiner will preset selector I–33 in its position 2 designated "speed."

Relay y–74 in analyzer 29 will be operated in any double-cycle of combination I in which the preset standard of accuracy is achieved. Recording detector I–89 then will be operated, with ground connected similary to a "time" comparison, and with battery connected by this circuit to coil a of relay I–89: gang b of selector I–33 at its position 2, armature and front contact d of relay y–74, coil a of accuracy lock-up relay I–96, front contact and armature e of relay y–74, and gang a of selector I–33 at its position 2 connecting battery as heretofore described.

Relay I–96 then locked up, and master recording indicator I–42–b then energized, comprise means similar to relay I–95 and indicator I–42–a, similarly connected to corresponding means.

In each group and channel in combination I with an average response equalling or exceeding standard of accuracy y–22, all permanent recording means will function similarly to a "time" position 1 of selector I–33.

If each inter-group average response is less than standard of accuracy y–22, the coil a of recording cut-off relay I–91 will be disconnected from the second front contact b of relay I–89, by gang d of selector I–33 at its position 2. Thus, if any inter-group average response equals y–22 in a subsequent double-cycle of combination I, the group's corresponding indicator lock-up relay I–90' will be operated as usual by back contact b of released relay I–91.

If each intra-group response in a group is less than standard of accuray y–22, similar relays I–91 in analyzers A–28–Z, B–28–Z, and C–28–Z similarly will be disconnected by each gang of selector X–33 corresponding to its gang d associated with relay I–91.

Thus, when relay y–74 operates in any double-cycle of combination I, each permanent recording indicator I–40' and I–39' corresponding to an energized temporary recording indicator will be energized permanently unless a leader in the respective inter-group or intra-group comparison has been determined in a previous double-cycle of combination I. Temporary recording indicators I–40 and I–39 will be unaffected by the permanent recordings.

If the examiner should desire permanently to record indications of all responses in combination I to achieve preset standard of accuracy y–22, irrespective of the speed of each response, the examiner will preset selector I–33 in its position 3 designated "accuracy." The system will function similarly to a "speed" comparison with these exceptions.

Position 3 of gang c of selector I–33 will disconnect ground from conductor 303 which connects the coil a of each recording cut-off relay I–91, each coil thus disconnected in its released position. Thus each lock-up relay I–90' and its associated indicator will be connected to battery by back contact b of each recording cut-off relay I–91, irrespective of the number of responses which previously may have achieved the desired accuracy.

All operated lock-up relays I–90' will be locked operated by these circuits. Locking battery will be connected to front contact c of each lock-up relay I–90' by its front contact and armature d, conductor 302, position 3 of gang j of selector I–33, and battery. Locking ground will be connected to coil a of relay I–A–90' by this circuit: its armature and front contact b, conductor 311, and position 3 of gang g of selector I–33, grounded by gang a of master reset switch 15. Locking ground similarly will be connected to coil a of relay I–A–1–90' by corresponding means comprising conductor 314 and position 3 of gang h of selector I–33; and similarly to coil a of relays I–B–1–90' and I–C–1–90' not shown, respectively by conductors 324 and 334, and gangs i and an additional gang not shown of selector I–33.

Thus, when selector I–33 is preset in its position 3 designated "accuracy," and relay y–74 operates in any double-cycle of combination I, each permanent recording indicator I–40' and I–39' corresponding to an energized temporary recording indicator I–40 or I–39 will be energized permanently, without affecting the temporary recording indicators.

For manual recording, recording selector I–87 will be preset in its position designated "manual." When the open contact of manual recording button I–88 is closed, gangs a and b of selector I–33 will be by-passed by this circuit between armature g of relay 44 and coil a of relay I–89: selector I–87 in its "manual" position, and the closed contact of button I–88. Manual recording may be selected by the examiner at the time of any condition, including the operation either of relay I–21 or relay y–74.

*Remote stations*

FIG. 19 comprises response station 1–11, certain associated means of item analyzer 1–23, and item analyzer 1–23R.

Response station 1–11 in FIG. 19 comprises usual dial 1–12 which may be associated remotely. Channel reset 1–13 is not shown; if it is desired to provide for channel resetting by a remote station, means not shown may operate relay 1–84 in FIG. 8 when the subject dials the digit "ten," or other similar selected code. Alternatively, channel reset 1–13 may be connected in the usual manner.

In the relay system shown in FIGS. 5 to 18, if it is desired that station 1 be situated "remotely," selector 1–71 in item analyzer 1–23R in FIG. 19 will be preset in its position designated "remote," connecting dial 1–12 to its associated means as whom. Alternatively, selector 1–71 may be by-passed.

The means of analyzer 1–23 shown in FIG. 19 comprise response function switch 1–16 comprising its gangs c and f; interdigital detector relay 1–25 comprising its slow-operating, fast-releasing coil a, and armature and first and second front contacts b; and pulsing relay 1–72 comprising its coil a, armature and back contact b reversed from its showing in FIG. 5 and additionally comprising its front contact b, armature and front contact c, and "attention" means d.

Item analyzer 1–23R in FIG. 19 comprises these means: selector 1–71 comprising gangs a, b, c, d and e, each gang with two positions designated "local" and "remote"; transmitter 1–67; receiver 1–68 comprising its amplifier a, threshold detector b, and pulse shaper c; subtractor 1–70 comprising a stepping switch shown connecting its step designated "one" at its normal position prior to the first pulse of a digit and also comprising its stepping coil a which advances the switch each time that such coil is operated, slow-operating reset coil b, gang c shown with its negative steps designated "minus one" and "minus two" disconnected, and its positive steps "one," "two," and "three" connected to the remote "remote" position of gang a of selector 1–71; and subtrahend means 1–69 associated with the negative steps of gang c of subtractor 1–70, and comprising means to preset the reset position of such gang at any of such negative steps, or at its normal step "one" as shown. Such gang may comprise additional negative and positive steps not shown. With station 1–11 situated remotely, transmitter 1–67 situated centrally may be connected to station 1–11 for example by a telephone line comprising conductors 156 and 157 as heretofore described, transmitter 1–67 comprising a usual telephone headset, with its earpiece in inductive relationship with a coil associated with amplfier a of receiver 1–68. Or transmitter 1–67 situated distantly may comprise a usual means to generate a radio broadcast or television signal, carrier wave, "reactor" wave as described in Patent No. 2,096,109, issued Oct. 19, 1937, to H. M. Hopkins for a "Radio Electric Survey and Voting System," or similar means; with receiver 1–68 comprising means usually associated with the respective transmitter to respond to its signal, such means comprising amplifier a, threshold detector b, and pulse shaper c of receiver 1–68, adapted in the usual manner to emit a measurable unit comprising an electrical pulse in response to an input with characteristics within a predetermined electrical range.

With subtrahend means 1–69 preset as shown, the means in FIG. 19 will be connected in this manner. In the first alternative circuit, for a "remote" system only, each break of the vibrator of dial 1–12 will transmit a measurable signal to transmitter 1–67 by these direct connections: transmitter 1–67, conductor 156 represented by a broken line in the first alternative, the vibrator of dial 1–12, conductor 157 represented by a broken line in the first alternative, and transmitter 1–67. In the second alternative circuit with selectivity between "local" and "remote" systems, such signal will be transmitted by this circuit: transmitter 1–67, gangs d and e of selector 1–71 in its "remote" position, conductor 156, dial 1–12, conductor 157, gangs b and c of selector 1–71, and transmitter 1–67.

Each signal of transmitter 1–67 will release relays 1–25 and 1–72 as usual, by pulse spacing means in receiver 1–68 corresponding to the vibrator of dial 1–12, such spacing means disconnecting this circuit: battery, the fast-releasing and slow-operating coil a of relay 1–25, first connector to the spacing means of receiver 1–68, such receiver in inductive relationship with transmitter 1–67, with usual connection to coil a of pulsing relay 1–72, and ground.

In the first alternative shown, released relay 1–72 will pulse the means connected by gang f of switch 1–16, by this circuit: battery, armature and back contact b of relay 1–72 with the broken line in the first alternative showing the direct connection to gang c of subtractor 1–70 in its normal positive position "one," and gang f of switch 1–16. In the second alternative shown, back contact b of relay 1–72 is connected to gang c of subtractor 1–70 by gang a of selector 1–71 in its "remote" position. The stepping coil a of subtractor 1–70 simultaneously will be released by the disconnection of this circuit: battery, armature and front contact b of relay 1–72, coil a of subtractor 1–70, and ground. When the pulse spacing means of receiver 1–68 closes at the end of the first signal of the first digit, relay 1–72 will operate, connecting battery to coil *a* of subtractor 1–70, thereby advanced one step. Each additional positive step of gang *c* of subtractor 1–70 is connected to corresponding means similarly to its step "one."

During each interdigital delay, slow-operating coil *a* of detector 1–25 will operate, thereby operating reset coil *b* of subtractor 1–70 by this circuit: battery, operated "attention" means *d* associated with armature and front contact *c* of relay 1–72, such means connected as usual to armature and second front contact *b* of relay 1–25, connecting slow-operating coil *b* of subtractor 1–70, and ground.

For control purposes in a public utilities system, a telephone dial may emit excess pulses in addition to the number of pulses comprising the visible digit intended to be dialed by the subject. If the examiner desires the surplusage to be subtracted, subtrahend means 1–69 may preset the reset position of gang *c* of subtractor 1–70 at its position designated by the number of pulses to be subtracted. If means 1–69 is preset at such position designated "minus one" to subtract a single excess pulse, and then pulsing relay 1–72 is released to connect the first pulse of the digit, the "minus one" position of gang *c* of subtractor 1–70 will disconnect battery from gand *f* of switch 1–16. The end of such first pulse will cause subtractor 1–70 to be advanced to its normal position "one," where it will function in its usual manner in the second and subsequent pulses of the digit.

Thus the number of pulses represented by the designated preset position of subtrahend means 1–69, controlling the reset position of gang *c* of subtractor 1–70, will be subtracted from the response by dial 1–12, before any pulses are connected to gang *f* of switch 1–16. In an alternative mehod not shown, any stepping switch in FIG. 8 comprising dialed digit recorder 1–24 may be associated with subtrahend means 1–69 to eliminate corresponding subtractor 1–70.

FIG. 19 shows means to subtract excess dialed pulses from the dialed digit. It is apparent that alternatively such pulses may be added by means not shown to the digits preset in selector 18, if additional item comparator recording means are provided in item analyzers 23 to record such pulses, and if means are provided to prevent such item recorders from affecting the correct and incorrect resistances of the channel.

CORRESPONDING MAGNETIC DRUM MEANS

The system shown in FIGS. 5 to 19 similarly may comprise corresponding means, such as magnetic tape, a direct contact magnetic drum, or a non-contact magnetic drum, and associated auxiliary means. Magnetic drums are well known in the art as an alternative to stepping switches, relays, and similar recording means. FIGS. 20 and 21 show corresponding non-contact magnetic drum means for intra-group comparisons of the responses of channel 1D, with each associated means designated by the suffix D. Magnetic drum means for additional channels, for groups and combinations of groups, for intergroup comparisons and programs of comparisons, and for permanent recording, will comprise additional means not shown, corresponding to similar means shown in FIGS. 5 to 21.

In utilizing such a drum, a minute area in its magnetizable surface is magnetized to saturation in one of its two polarities, to record the electrical polarity of the energizing pulse. Area for a single recorded pulse is designated as a "cell." These rectangular cells may be arranged, for example, in five numbered tracks peripherally on the drum, each cell assigned 1/80 of an inch peripherally by 1/16 of an inch axially. The drum surface may be divided peripherally into a number of similar segments, each comprising a plurality of cells, one segment for each channel of the response device, with one additional master control segment. One magnetic head may be associated with each track. By causing a pulse of current to flow in the windings of such a magnetic head in a particular direction for a specific interval of time, its associated cell of its track will be magnetized in one of its two polarities. Cells thus magnetized, when moved rapidly past the same magnetic head, will induce voltages in the head windings with polarity similar to the recorded pulse, and without its impairment. The drum may rotate in relation to stationary heads at a periphery velocity of sixteen hundred inches, or one hundred and twenty-eight thousand cells, per second. At the angle of drum rotation corresponding to each cell, the corresponding cell of each track is associated simultaneously with its respective recording head adapted selectively to read or to write pulses in the cell of its associated track. Inasmuch as each pulse saturates its associated cell in one of its two polarities, no additional erasing means is necessary.

"Coincidence detectors," or "gates," and their associated circuits, will energize outputs of pulses with specific polarities, in response to a plurality of inputs of pulses with specific polarities, each pattern of inputs, outputs, and their respective polarities in accordance with predetermined logical conditions.. The circuits are connected so that each successive pulse of each input or output circuit has the same polarity as the preceding pulses in the same circuit, unless otherwise specified.

The relationship between drum 62D and its associated means, is shown schematically in FIGS. 20 and 21. Item analyzer 1–23D comprises all means in FIG. 20, except input devices 10D in Col. 3. As hereinafter described, certain means in FIG. 20 may be common to a plurality of channels. System analyzer 29D comprises all means in FIG. 21, such means common to a plurality of channels; except means 1–30D and 1–39D.

FIG. 20 normally is viewed above FIG. 21, and each figure is divided into the same twelve vertical columns. Cols. 1 and 2 comprise address means 30D, comprising 2nd "track" 62D–*b* in each column, read by cycle gate 44D in Col. 1, and address gate 30D–*a* in Col. 2. 2nd "track" 62D–*b* may comprise a plurality of tracks to provide distinctive patterns of permanently recorded pulses to represent each drum revolution, each address, and each sub-address. Such patterns alternatively may be provided by at least one spaced pulse associated with each sub-address, or by similar pulses in a plurality of tracks which may include 1st track 62D–*a*, the timing track. In Col. 1, cycle gate 44D will read 2nd tack 62D–*b* to detect each cycle comprising one drum revolution and successively designated as the first to fourth cycles, such four cycles comprising a multiple-cycle; with cycle gate 44D emitting a distinctive pattern of pulses for each cycle. In Col. 2, address gate 30D–*a* will read 2nd track 62D–*b* to detect each channel address segment comprising four sub-addresses successively designated *a* to *d*, and to detect the address of the master segment W; gate 30D–*a* emitting a distinctive pattern of pulses for each address and sub-address. The channel address of channel 1D comprises, in addition to any address identification cells, twenty-two cells in this manner; in sub-addresses *a* and *b*, ten cells each; and in sub-addresses *c* and *d*, one cell each. In the master address segment W, one cell is shown.

In FIGS. 20 and 21, means connected at each cycle, address, and sub-address of Cols. 1 and 2 are shown in the adjacent horizontal segments of Cols. 3 to 12.

Input devices 10D shown in Col. 3 comprise dial 1–12D at response station 1–11D similar to the dial in FIG. 5, and correct its selector 18D at controls 14D similar to selector 18 in FIG. 12.

In Col. 4, the dialed digit recorder 1–24D, comprises 50 millisecond (abbreviation ms.) delay means *a* and dial pulse flip-flop *b* of recorder 1–24D; and master dial response gate 24D–*d* adapted to write in recorder 1–24D–*c* comprising in Col 7 sub-address 1–*a* of 3rd track 62D–*c*, Gate 24D–d also is adapted to read 1st track 62D–a in Col. 5 and 5th track 62D–e in Col. 10. Interdigital detector 1–25D comprises its means 1–25D–a for 150 ms. delay and 1–25D–b for 300 ms. delay, and master interdigital restting gate 25D–c; each means adapted to successive dialed pulses with a frequency of 10 c.p.s., and a duration of 50 ms.; with interdigital pauses in excess of 350 ms. Each such interdigital delay means is associated with resetting means responding to a second dialed pulse during the respective interval of delay. Also shown is transmitter 1–67D and receiver 1–68D associated with selector 1–71D. Item comparator 1–26D comprises first counter 63D which resets at sub-address 1–d of the second cycle; second counter 64D which resets similarly; master item comparator gate 26D–a; preset subtrahend means 1–69D; subtractor 70D; and recorders in sub-address 1–b comprising 1–26D–b in Col. 7, in 3rd track 62D–c, and 1–26D–c in Col. 9, in 4th track 62D–d. At sub-address 1–a, substrator 70D reads 3rd track 62D–c in Col. 6. At sub-address 1–b, second counter 64D reads 1st track 62D–a in Col. 5; and item comparator gate 36D–a reads 5th track 62D–e in Col. 10. Output indicators 1–35D in Col. 12 comprise correct item indicators 1–37D and incorrect item indicators 1–38D.

System analyzer 29D comprises these means shown in FIG. 21: first counter 63D, second counter 64D, third counter 65D, and net scorer 31D each resetting at sub-address 1–d of the third cycle; net score temporary recorder 80D resetting at address W of the fourth cycle; and master comparator gate 32 D. From analyzer 1–23D is shown output indicator 1–35D in Col. 12 comprising intra-group leading indicator 1–39D. At sub-address 1–b, first counter 63d reads 3rd track 62D–c in Col. 6, and second counter 64D reads 4th track 62D–d in Col 8.

Auxiliary means comprise gating means not shown and adapted to write in 5th track 62D–e in Col. 11 at cells in which recorded pulses are read in 3rd track 62D–c in Col. 6 or in 4th track 62D–d in Col. 8. 5th track 62D–e, designated as the "last pulsed cell" track, makes it unnecessary for any head to read and write simultaneously at a single cell. At sub-address 1–a, in dialed digit recorder 1–24D, the reading and writing action of such means reverses at each cycle, thus completing two pairs of reversals in each multiple-cycle. In the first and third cycles, 5th track 62D–e is read by its associated head, while 3rd track 62D–c is written into by its head. In the second and fourth cycles, such reading and writing conditions are reversed in each head. At sub-address 1–b, in the first cycle connecting item comparator 1–26D, 5th track 62D–e is written into by its head, and 3rd track 62D–c and 4th track 62D–d each is read by its head. In the second cycle, such writing and reading conditions are reversed in each head. In the third and fourth cycles connecting system analyzer 29D, the head of 5th track 62D–e is disconnected.

In Col. 5, 1st track 62D–a, the timing track, comprises twenty-three permanently recorded timing pulses each with the same polarity, one in each cell of each address and sub-address.

With selector 1–71D preset in its "local" position, transmitter 1–67D and receiver 1–68D are disconnected. For all response functions, in the dial response pulsing circuit, flip-flop b of dialed digit recorder 1–24D corresponds to pulsing relay 1–72 in FIG. 5, and will be reversed from its normal polarity by the first and each successive pulse of a dialed digit. After 50 ms. delay by means 1–24D–a to prevent multiple recording of a single pulse, then the polarity of the first unpulsed cell (assumed to be the first cell) of recorder 1–24D–c will be reversed in its next odd-numbered cycle by the output of master dial response gate 24D–d responding to its inputs comprising the timing pulse from 1st track 62D–a and the first unpulsed cell of 5th track 62D–e, such output also resetting flip-flop 1–24D–b to its normal polarity. Thus recorder 1–24D–c corresponds to the stepping coil a of the respective switch 1–50 or 1–51 in FIG. 8 associated with gang f of switch 1–16 in FIG. 6. For all response functions, recorder 1–24D–c will be associated with subtractor 70D and first decade counter 63D in item comparator 1–26D. In the auxiliary "last pulsed cell" means, in the next even-numbered cycle of drum 62D at the same cell address, such recorded pulse will be read by its associated head in Col. 6, and thereby will write a polarity-reversing pulse into the corresponding cell of 5th track 62D–e in Col. 11. Such latter recorded pulse, read in subsequent odd-numbered cycles, will inactivate gate 24D–d until the address of the second cell of recorder 1–24D–c. By thus alternating the cycles of a drum rotating, for example, 40 revolutions per second, dialed pulses spaced at 100 ms. intervals will be recorded although a program of multiple-cycles may comprise a longer time interval.

For all response functions, at sub-address 1–b, each of ten permanent "comparator recorders" will comprise the successive one of ten pairs of cells in recorders 1–26D–b and 1–26D–c, each pair of cells corresponding to one of relays 1–52, 1–53, or additional similar relays not shown, in FIG. 8. If it is desired that each such pair of cells alternatively be replaced by a single cell comprising a single "bit," additional means not shown may be provided whereby the pulse polarity of the input and output of such single cell will respond to the correctness or incorrectness of the respective response item, such polarity corresponding to the means associated with item comparator 1–26 and shown in the system in FIGS. 5 to 19.

For this descrpition of corresponding magnetic drum means for each response function, each "cycle," "track," and "sub-address" refers to drum 62D.

If response station 1–11D is situated locally, subtrahend means 1–69D will be preset "zero," so that the output of subtractor 70D will be the same as its input.

*Sequential response function*

For the sequential response function, in item comparator 1–26D, the permanent recorder for "item number" will comprise second decade counter 64D corresponding to stepping switch 1–51 in FIG. 8. At each of the ten cells of sub-address 1–b, second counter 64D will be associated with the corresponding switch in selector 18D–SEQ. First counter 63D comprises temporary recording means for the "units" digit in the transition between sub-addresses.

The sequential response function is preset in the manner heretofore described in FIGS. 5 to 19, and in one multiple-cycle will comprise the following cycles with dial pulses comprising a digit recorded at sub-address 1–a.

In the second cycle at sub-address 1–a, first counter 63D will count the pulses in recorder 1–24D–c.

At sub-address 1–b, correct and incorrect items will be detected by these corresponding means, with the first cell unpulsed in 3rd, 4th, and 5th tracks c, d, and e. When the input from 150 ms. delay means a of interdigital detector 7–25D represents the end of a digit, the output of item comparator gate 26D–a will reverse the polarity of the corresponding cell either of "correct" item recorder 1–26D–b or "incorrect" item recorder 1–26D–c. In the first response item, such output will respond to the comparison of the polarities of first counter 63D and preset first switch a of selector 18D–SEQ.

At sub-address 1–d, first counter 63D and second counter 64D will be reset to zero.

In the third cycle at sub-address 1–b, the net score of channel 19 will be determined by these means of system analyzer 29D. The correct items in recorder 1–26D–b will be counted by first counter 63D, the total corresponding to items represented by the channel correct resistance comprising the input of scaler 20–a in FIG. 13. The incorrect items in recorder 1–26D–c will be counted by second counter 64D, the total corresponding to items represented by the channel incorrect resistance comprising the input of scaler 20–b in FIG. 13. The integer number comprising the single channel in this intra-group comparison, such number read from the pulse recorded in 2nd track 62D–b, will be counted by third counter 65D, the total of "one" corresponding to the integer input of divider 46 in FIG. 13. These totals will comprise inputs of the arithmetic means of net scorer 31D corresponding to the means comprising net scorer 31 in FIG. 13.

At sub-address 1–c, corresponding to position 1 of sampler 45 in FIG. 12, if the net score of channel 1D equals or exceeds the score of any previous channel in the cycle as recorded in net score temporary recorder 80D corresponding to recorder 80 in FIG. 13, master comparator gate 32D, corresponding to master comparator 32 in FIG. 13, will connect the net score of channel 10 to recorder 80D.

At sub-address 1–d, first counter 63D, second counter 64D, third counter 65D, and net scorer 31D, each will be reset to zero.

At the start of the four cycle, net score temporary recorder 80D will have recorded the highest net score of any channel.

At sub-address 1–b, system analyzer 29D again will determine the net score of channel 1D, similarly to the third cycle.

At sub-address 1–c, each means of system analyzer 29D will function similarly to correseponding means of analyzer 29 in FIGS. 12 and 13. If the net score of channel 1D equals the score in recorder 80D, master comparator gate 32D will operate intra-group leading indicator 1–39D. At sub-address 1–d, each means will be reset similarly to the third cycle.

At address W of the fourth cycle, corresponding to the second cycle of sampler 45 at its position J in FIG. 12, recorder 80D will be reset to zero.

In the first cycle of the second multiple-cycle, at sub-address 1–b, if either 3rd track c in Col. 6 or 4th track d in Col. 8 has previously been pulsed, the "last pulsed cell" means heretofore described will record a polarity-reversing pulse in 5th track e in Col. 11 at the corresponding cell address. Thereafter, in the second cycle, additional correct and incorrect items will rerecorded similarly to the first multiple-cycle, in the first cell of sub-address 1–b in which the corresponding cell of 5th track 62D–c is unpulsed.

When the output of delay means b of interdigital detector 1–25D represents a 300 ms. delay, the input to interdigital resetting gat 25D–c will actuate the gate to erase each dialed pulse recorded at sub-address 1–a in recorder 1–24D–c.

Thus if drum 62D rotates 40 revolutions per second, each multiple-cycle comprising four cycles will take 100 ms. Means 1–25D–a comprises a delay of 150 ms. Therefore the maximum access time to item comparator gate 26D–a will comprise 250 ms., which is less than the 300 ms. delay of means 1–25D–b actuating the erasure of the recorded dialed response after the item comparison.

Thus in FIGS. 20 and 21, all functions are accomplished by master means associated with and common to magnetic drum 62D, except dial 1–12D and its associated delaying means, transmitter 1–67D, receiver 1–68D, flip-flop 1–24D–b, subtrahend means 1–69D, and channel indicators 1–37D, 1–38D, and 1–39D. Such delaying means may comprise master gating means not shown, associated with means to count the cycles of drum 62D, provided to detect the periods of delay as alternatives to means a and b of interdigital detector 1–25D, and means a of dialed digit recorder 1–24D. Such indicators may comprise character display means common to all channels, as hereinafter described. Subtrahend means 1–69D may be common to a plurality of channels, as hereinafter described in "Remot Stations."

The further manner of connection of means shown in FIGS. 20 and 21, in accordance with the teaching of the system shown in FIGS. 5 to 19, will be apparent to persons skilled in the art; for example, by use of methods and references cited in High-Speed Computing Devices, by the staff of Engineering Research Associates, Inc., 1950, McGraw-Hill Book Co., New York, 451 pp., based upon the ERA report to the Office of Naval Research under contract N6–ONR–240, Task 1. Each recording and switching means should be selected to operate at the speed required by the means to which it respondse.

*Multiple choice response function*

In the multiple choice response function, the ten permanent "comparator recorders," and the "units" digit temporary recorder comprises the same means as in the sequential response function. The ten successive positions of second counter 64D each are associated with the corresponding switch in correct item selector 18D–MC. The multiple choice response function is preset in the manner heretofore described for the system shown in FIGS. 5 to 19. The multiple-cycle of drum 62D comprises the same cycles as the sequential response function, with similar events except as hereinafter described.

In the second cycle at sub-address 1–b, correct and incorrect items will be detected in this manner. When a specific digit is dialed by channel 1D for the first time, item comparator gate 26D–a will record the correct or incorrect item in the cell of sub-address 1–b numbered correspondingly to the digit recorded in first counter 63D, when the input to such gate from second counter 64D comprises an equal number of timing pulses from first track 62D–a. Its associated present switch in selector 18D–MC if preset "on" then will cause such gate to record a "correct" item in recorder 1–26D–b, and otherwise to record an "incorrect" item in recorder 1–26D–c. Thus the preset multiple choice items may be dialed in any sequence. In subsequent multiple-cycles, if the same digit is dialed again by channel 1D, such subsequent recorded "correct" or "incorrect" item will not affect the cell already saturated in the respective comparator recorder.

*Numerical-total response function*

In the numerical-total response function, the ten permanent "comparator recorders," and the "units" digit temporary recorder comprise the same means as in the sequential response function. The numerical-total response function is preset in the manner heretofore described for the system shown in FIGS. 5 to 19. The multiple-cycle of drum 62D comprises the same cycles as the sequential response function, with similar events except as hereinafter described.

If it is desired to increase the numerical-total counting capacity by providing a "tens" and a "units" digit to represent one hundred correct or incorrect items, additional means not shown may be provided: a "tens" decade counter similar to first counter 63D and associated with ten additional switches in selector 18D–NT similar to the "units" switches; such additional means connected to additional cells of drum 62D by switching means corresponding to tens switching relay 1–59 in FIG. 8; such additional cells comprising ten cells and usual associated means in each of recorders 1–24D–c, 1–26D–b, and 1–26D–c. Similarly in system analyzer 29D, in the third cyce at sub-addresses 1–b and 1–c, the capacities of second counter 64D, net scorer 31D, and net score temporary recorder 80D may be increased to one hundred items.

For the numerical-total response function, magnetic drum means will function similarly to corresponding means shown in FIGS. 5 to 19.

*Remote stations*

In item analyzer 1–23D, if selector 1–71D is preset in its position designated "remote," the direct connection of dial 1–12D to its associated means will be disconnected and replaced by connection to transmitter 1–67D and receiver 1–68D. Subtrahend means 1–69D will be preset with the number of any excess pulses to be subtracted from each dialed digit. Additional cells will be provided in 3rd track c at sub-address 1–a to record such pulses.

Each such means corresponds to similar means in FIG. 19.

Subtrahend means 1–69D may be common to any additional channels with response requiring the subtraction of a similar number of excess pulses.

CORRESPONDING CONDENSER AND OTHER MEANS

It is apparent that there are many alternative means corresponding to means heretofore described.

For example, measurable units in the response of station 1–11 may comprise electrical resistance variable in discrete steps, for example each of twenty-six steps representing an alphabetical symbol, and such measurable units may comprise any measurable variation of the characteristics of an electrical circuit.

The capacity of condensers to receive and to store pulses, whereby for example the condenser with the highest charge may be discharged to energize its associated relay or other means, corresponds to stepping switches, counting means, discriminators, and similar means.

As a further example, in item comparator 1–26, a station response comprising a selected, measurable amount of current charging one associated condenser may be compared with a similar preset amount of current charging a second condenser associated with correct item selector 18, with the charges of such condensers compared to determine whether equal within a predetermined tolerance, and also with the excess of either charge discharged into a channel or master scoring means.

Furthermore, arithmetic means for addition and subtraction similarly may comprise the charge or discharge of a discrete amount of current into a single condenser, or comparison among the charges into a plurality of condensers.

To the extent of the capacity of a condenser to store measurable units of current, the condenser corresponds to a similar number of discrete positions of recording means such as relays, cells of magnetic drum, or positions of stepping switches or decade counter.

Thus, for example, a condenser may correspond to similar means in dialed digit recorder 1–24; in item comparator 1–26–SEQ, for the permanent recorder of "item number"; in item comparator 1–26 and in output indicators 1–35, for comparing or recording the channel's correct score, incorrect score, or net score; in system analyzer 29 similarly for channel scoring, for recording the number of "integer" units, and for net score temporary recorder 80.

For the manner of connection of such condenser means, reference is made to Chance et al., Waveforms, 1949, McGraw-Hill Book Co., New York, 785 pp.; including pages 603 ff. This book comprises vol. 19 of the MIT Radiation Lab series, and was prepared under the auspices of the Office of Scientific Research and Development, NDRC.

Other similar corresponding means comprise transistors, crystal diodes, differential analyzers, and electrical, mechanical, and other means including such means described in the texts cited in this specification.

GENERAL

Many alternative systems are suggested by the teaching of the systems heretofore described in this specification, with the further manner of connection of each such system apparent to persons skilled in the art.

In response station 11, alternative means may select, by dialed signal, each of a plurality of problems simultaneously preset by the examiner. Each such problem may use a different response function. Selected dials may be disconnected by a switch connecting common ground.

Corresponding telephone-type inputs may comprise an instantaneous or spaced response by a plurality of preset switches, or by an audible phonetic signal, in response station 1–11.

Thus a dial telephone may be replaced by a push-button telephone. The input from such a response station may comprise audible or inaudible signals, rather than pulses. Such an audible system was well-known in long distance telephony before the dial telephone came into general use.

The input from a push-button telephone may be selected by buttons or by parallel switches. The entire response may be recorded item by item, and then fed into the analyzer instantaneously. Or a similar result may be accomplished by use of a punch card as the "human response," comprising the input to the analyzer.

The inputs of item analyzer 1–23 from response station 1–11 may comprise corresponding means described in the chapter on input devices in High-Speed Computing Devices by ERA, ch. 15, pp. 385 ff., cited supra.

Such inputs from human responses may require dexterity on the part of the subject, and may include inputs from a plurality of stations controlled by a single subject.

Binary or other systems for the representation of data may comprise an alternative to the decimal system shown; or the decimal data may be represented by binary means, whereby four stable states may correspond to each ten-position means shown. Such other systems similarly may comprise continuously variable data such as analogs, with each minimum measurable variation in such data corresponding to each "unit" in a digital system.

If it is desired to provide means for usual warning signals at intervals to notify a remote station that its response signals are being recorded, means may be provided either to delay any warning signal which is simultaneous with a response signal, or to adapt each receiving means for such signals to react only to its respective signal.

In item analyzer 1–23, alternative logical scoring methods may determine correct and incorrect items. In scoring a sequential response, for example, correct items may comprise only each correct response prior to an incorrect item; or a single incorrect item may be scored if one preset item is skipped; or any other logical scoring method may be used. In scoring misspelled words, for example, all dialed digits may be recorded until the response is completed, if the scoring of a response item may depend upon subsequent response items. Correct and incorrect indirications may be recorded temporarily for the time interval of a program by corresponding means similar to relays 90 in FIGS. 14 and 15.

If it is desired to eliminate scalers 20 comprising means to weight correct and incorrect items separately, and if each unanswered item is scored as an incorrect item, simplified means in item analyzer 1–23 may subtract the incorrect items from the correct items, in a relay system for example by a series of units of resistance comprising the bridges between transfer contacts of the armatures of successive relays, and in a magnetic drum system for example by reversible counting decades. Similarly in a numerical-total response, it is apparent that the unweighted net score may be determined in inverter 49–NT.

The chronological order of responses achieving a preset standard of accuracy may be recorded permanently by cascading a plurality of coded indicators 39' and 40' and associated means connected to position 2 of recording switch (I–33) in FIG. 16, with each coded level of the cascade actuated by the cut-off of the previous level.

In anlyzer 29, in the relative order of accuracy and leading margins of each response may be determined by cascading a plurality of net score temporary recorders 80. By providing master comparator means 32 for each temporary recorder 80, such determination may be made in the usual multiple-cycle of the system. Or by the successive cut-off of one recorder 80 in each cycle, such additional determinations may be made in corresponding additional cycles of the multiple-cycle, or in a succession of usual multiple-cycles. The discharge of the condenser with the highest charge may correspond to means shown in master comparator 32, as heretofore described.

If it is desired to control the program by its output indicators 55, for example to determine the top 10% of the responses, each relay 90′ in FIGS. 14 and 15 may be connected by its additional armature and its transfer contacts to one unit of resistance thereby connected in series, or by-passed; with analyzer 29 programmed to continue to determine the relative order of accuracy until the combined series resistance represents the desired 10% of the channels.

If it is desired to compare responses simultaneously, additional recording and cut-off means may delay each input comprising a response, until the start of the next multiple-cycle. If it is desired to compare responses instantaneously, additional parallel means not shown and associated with such responses will correspond to means shown in serial operation.

A plurality of corresponding indicators such as indicators I–A–39 may comprise a character display system such as "Character Display Signal Generator, Model DS–157," manufactured by Wang Laboratories, Boston, Mass. Such an "output device for data processing equipment" displays any selected one of forty characters on the screen of a cathode ray tube, at a frequency of 10,000 per second. Sequencing means may be provided successively to display the characters representing each of a plurality of leading responses or other indications. Each such indicator may comprise a usual televised picture of the respective subject.

Output indicators 35 may comprise means for additive or subtractive color, according to the art as described in the book An Instroduction to Color, by Ralph M. Evans, 1948, John Wiley & Sons, New York, 340 pp.

The net score of any selected response may be connected to an additional indicator I–41 by an additional gang of sampler 45 with each position connected by its respective switch to the output of divider 46.

Each of combinations I, II, and additional similar combinations may comprise means for its respective intergroup comparison of various combinations of groups; selected type of comparison such as "time," "speed," or "accuracy"; respective net score weights, or rules of scoring; respective standards of accuracy; relative order of accuracy, such as 2nd and 3rd most accurate response; and other programming factors as heretofore described. Additional cut-off means may be provided for index scanner 43 to skip combination positions unnecessary in the respective program.

With additional means provided permanently to record each response, each program may compare such responses with a series of different preset "correct" items.

If it is desired to check the accuracy of the system in continuous operation, the input of each response may be delayed until the start of an additional program, and each program may comprise two identical series of comparisons, each such series temporarily recorded by additional output indicators 35, with means provided to detect any discrepancy between corresponding indicators.

In a series of programs of comparisons, the permanently recorded outputs of one program may comprise the inputs to a subsequent program.

Additional means of polygraph 1–36 may record permanently the condition of each output indicator 35 at any point of time, including the representation of the condition of each degree of accuracy indicator 41.

SUMMARY

The specification has taught the manner in which each complexity of an expanded system, utilizing dial telephones at any remote distance, may be connected to an analyzer at a central location.

In summary, it is now possible to simplify the device, which may be centralized and compact.

A punch card may comprise the response. Thus the location of the response stations and the central analyzer may be one and the same.

By use of transistors in solid state circuitry, the entire system may be smaller than a typewriter . . . punch cards, controls, analyzer, and outputs, all compactly in a single location.

In summary, first it must be remembered that the system in question is adapted to measure the reaction of a human subject in response to a problem to which there is a known or preset answer. The kind of problem involved may be statistical, scientific, psychological, economic, etc. However, regardless of the nature of the problem, the correct answer is such that it may be represented by a pattern of significances or items, which items are in the form of letters (A, B, etc.), numbers (1, 2, etc.), symbols ($\phi$, $\chi$, etc.) or any other logical notation. The answer given by the human subject is analyzed in the system with reference to the preset answer from a selected standpoint (a) sequential order; (b) multiple-choice; (c) approximation or numerical-total. "Multiple choice" means unlimited choice, including choice of many or all, and is not limited to a single selection. The answer is then scored as to its relative correctness or incorrectness. In other words, the degree of correctness is determined.

For purpose of illustration, let us assume that there exists a problem for which the correct answer is "1240" which is to say an answer constituted by a series of four items 1–2–4–0. These items may be, as pointed out above, non-numerical in form, but we shall, for present purposes, consider only a numerical answer. Let us further assume that a first human competitor or subject S–1 selects an answer "0992" and that a second subject S–2 selects an answer "1740." The response may be by punch card, electrified markings, dialing instrument, push buttons, or other means as explained in the specification.

The following chart demonstrates the functioning of the applicant's system in a problem with the correct answer represented by a series of four items 1–2–4–0, and with answers by human subjects S–1 and S–2.

| Preset Correct Answer | "1240" | Items | "Approximation" (recall number nearest to 1240) | "Multiple Choice" (recognize 4 of 10 categories) | "Sequential" recall 4 symbols in sequence |
|---|---|---|---|---|---|
| Response S–1 | "0992" | Correct | 992 | 2 | 0 |
|  |  | Incorrect | 248 | 1 | 4 |
|  |  | Unanswered | 0 | 1 | 0 |
| Response S–2 | "1740" | Correct | 740 | 3 | 3 |
|  |  | Incorrect | 500 | 1 | 1 |
|  |  | Unanswered | 0 | 0 | 0 |

Referring to the response S–1, from the standpoint of "approximation" it will be seen that the "0992" is correct with respect to "1240" to the extent of 992 and is incorrect to the extent of 248 (i.e. 1240 minus 992). From the standpoint of "multiple-choice" the answer "0992" includes two items (0 and 2) which are found in "1240"; hence it is correct to this degree. The subject answer includes item "9" repeated twice which is not found in the correct answer and it is incorrect to this degree. Finally, the item "4" in the correct answer is not found in the subject answer, hence it is unanswered to this extent. In no instance does the sequence of items in the subject answer S-1 correspond to the sequence in the correct answer, hence there is a zero score in the "correct" line and a "4" score in the incorrect line. The method of scoring for response S-2 will also be evident from the foregoing discussion.

While there have been shown and described only several embodiments of the invention, it will be understood by those skilled in the art that numerous changes and modifications may be made therein without departing from the true spirit and scope of the invention as defined in the appended claims.

What is claimed is:

1. A system for analyzing the degree of accuracy of a response to a problem having at least one correct answer, said answer defined by a predetermined set of individual digits, comprising:
    (a) means to preset for at least one problem a correct answer constituted by a set of individual digits,
    (b) means to register said response,
    (c) means to compare said response with said answer, and
    (d) means responsive to said comparison means to determine at least one of the following score forms:
        (i) the absolute value of the difference between the quantity represented by the digits of said answer, and the quantity represented by the digits of said response,
        (ii) the number of digits appearing in said answer which appear in said response, and
        (iii) the number of digits in the respondent's answer which are both present in said correct answer and which are in the same relative position in said response as they are in said answer.

2. The system of claim 1, having means to compare said response with said answer to determine all three of said score forms.

3. The system of claim 1 having additional circuitry to display directly said corresponding ones of said score forms.

4. The system of claim 1 further characterized by signalling means controllable by a human subject at a response station for transmitting said response through a channel to said comparing means.

5. The system of claim 3, further characterized by signalling means controllable by a human subject at a response station for transmitting said response through a channel to said comparing means.

6. The system of claim 1, having a plurality of signalling means distributed among a plurality of response stations, a plurality of channels to said comparing means for transmitting responses from said stations to said comparing means, and means for comparing a series of responses from said stations substantially simultaneously.

References Cited

UNITED STATES PATENTS

| | | | |
|---|---|---|---|
| 2,738,595 | 3/1956 | John et al. | 35—48 |
| 2,793,446 | 5/1957 | Childs | 35—48 |
| 3,108,384 | 10/1963 | Jazbutis et al. | 35—11 |
| 3,100,351 | 8/1963 | Priednieks et al. | 35—9 |
| 3,121,959 | 2/1964 | Uttal | 35—9 |
| 3,121,960 | 2/1964 | Uttal et al. | 35—9 |
| 3,137,948 | 6/1964 | Wyckoff | 35—9 |
| 3,190,014 | 6/1965 | Rhoals | 35—48 |
| 3,281,959 | 11/1966 | Kobler et al. | 35—9 |
| 3,300,876 | 1/1967 | Johannsen | 35—9 |
| 3,314,165 | 4/1967 | Schreck et al. | 35—8 |

EUGENE R. CAPOZIO, *Primary Examiner.*

WALTER W. NIELSEN, *Assistant Examiner.*

U.S. Cl. X.R.

35—9

UNITED STATES PATENT OFFICE
CERTIFICATE OF CORRECTION

Patent No. 3,453,753                                                 July 8, 1969

Henry M. Farnum

It is certified that error appears in the above identified patent and that said Letters Patent are hereby corrected as shown below:

Column 1, line 34, "o" should read -- to --. Column 2, line 60, "purpoes" should read -- purposes --. Column 7, line 6, "Controls 14" should be the beginning of a new paragraph; line 18, "Group" should be the beginning of a new paragraph. Column 8, lines 20 and 31, "comparison", each occurrence, should read -- comparisons --. Column 9, line 65, "recodrer" should read -- recorder --. Column 11, line 41, "with" should read -- will --. Column 17, line 11, "821" should read -- 721 --. Column 19, line 70, "g", in italics, should read -- G --. Column 21, line 28, "46" should read -- 45 --. Column 22, line 68, "III" should read -- 111 --. Column 23, line 49, "series" should read -- series, --; line 64, "reverse" should read -- reversed --. Column 24, line 18, "present" should read -- prese --; same line 18, "ech" should read -- each --; line 51, "indica tor" should read -- indicators --. Column 28, line 33, "107'" should read -- 107', --. Column 30, line 5, "battery" should re -- battery, --. Column 33, line 69, "analyzer" should read -- analyzers --. Column 34, line 64, "connections" should read -- connection --. Column 35, line 8, "boil" should read -- coil -- same line 8, "samples" should read -- sample --; lines 11 to 13, "For automatic recording, recording selector I-87 will be preset in its position designated "automatic." should be the beginning of a new paragraph. Column 38, line 28, "amplfier" should read -- amplifier --. Column 39, line 27, "gand" should read -- gang --; line 37, "mehod" should read -- method --. Column 40, line 11, "periphery" should read -- peripheral --; line 49, "tack" should read -- track --; line 75, "Col 7" should read -- Col. 7 --; same line 75, "-c," should read -- -c. --. Column 41, line 21, "36D" should read -- 26D --. Column 43, line 39, "will" should read -- will be --; line 41, "-c" should read -- -e --; line 45, "gat" should read -- gate --; line 69, "Remot" should read -- Remote --. Column 44, line 59, "cycles" should read -- cycle --. Column 45, line 4, "response" should read -- response --; line 39, "of" should read -- of a --; line 40, "counter" should read -- counters --. Column 46, line 36, "scar" should read -- scar- --; line 65, "anlyzer" should read -- analyzer --.

3,453,753

(2)

Column 47, line 32, "Instroduction" should read -- Introduction --. Column 50, line 24, "35-9" should read -- 35-6 --; line 28, "Rhoals" should read -- Rhodes --; line 29, "35-9" should read -- 35-6 --.

Signed and sealed this 5th day of May 1970.

(SEAL)
Attest:

EDWARD M. FLETCHER, JR.
Attesting Officer

WILLIAM E. SCHUYLER, JR.
Commissioner of Patents